US010275128B2

(12) United States Patent
Brockmann et al.

(10) Patent No.: US 10,275,128 B2
(45) Date of Patent: Apr. 30, 2019

(54) MULTIPLE-MODE SYSTEM AND METHOD FOR PROVIDING USER SELECTABLE VIDEO CONTENT

(71) Applicant: ActiveVideo Networks, Inc., San Jose, CA (US)

(72) Inventors: Ronald Alexander Brockmann, Utrecht (NL); Anuj Dev, Amsterdam (NL); Gerrit Hiddink, Utrecht (NL)

(73) Assignee: ActiveVideo Networks, Inc., San Jose, CA (US)

( * ) Notice: Subject to any disclaimer, the term of this patent is extended or adjusted under 35 U.S.C. 154(b) by 0 days.

(21) Appl. No.: 14/217,108

(22) Filed: Mar. 17, 2014

(65) Prior Publication Data
US 2014/0289627 A1 Sep. 25, 2014

Related U.S. Application Data

(60) Provisional application No. 61/793,898, filed on Mar. 15, 2013.

(51) Int. Cl.
*G06F 3/0484* (2013.01)
*H04L 29/06* (2006.01)
(Continued)

(52) U.S. Cl.
CPC ........ *G06F 3/04842* (2013.01); *H04L 65/607* (2013.01); *H04N 21/236* (2013.01);
(Continued)

(58) Field of Classification Search
CPC ............................... G06F 3/0484; H04L 29/06
(Continued)

(56) References Cited

U.S. PATENT DOCUMENTS 3,889,050 A 6/1975 Thompson
3,934,079 A 1/1976 Barnhart
(Continued)

FOREIGN PATENT DOCUMENTS

AT 191599 T 4/2000
AT 198969 T 2/2001
(Continued)

OTHER PUBLICATIONS

ActiveVideo, http://www.activevideo.com/, as printed out in year 2012, 1 pg.
(Continued)

*Primary Examiner* — Tadesse Hailu
*Assistant Examiner* — Darrin Hope
(74) *Attorney, Agent, or Firm* — Morgan, Lewis & Bockius LLP

(57) ABSTRACT

The method of providing audiovisual content to a client device configured to be coupled to a display. The method detects a selection of a graphical element corresponding to a video content item. In response to detecting the selection of the graphical element, a transmission mode is determined. The transmission mode is a function of: (i) one or more decoding capabilities of the client device; (ii) a video encoding format of the video content item; (ii) whether the video content item should be displayed in a full screen or a partial screen format; and (iv) whether the client device is capable of overlaying image data into a video stream. Next, audiovisual data that includes the video content item is prepared for transmission according to the determined transmission mode. Finally, the prepared audiovisual data is transmitted from the server toward the client device, according to the determined transmission mode, for display on the display.

19 Claims, 10 Drawing Sheets

(51) Int. Cl.
  *H04N 21/234* (2011.01)
  *H04N 21/2343* (2011.01)
  *H04N 21/236* (2011.01)
  *H04N 21/258* (2011.01)

(52) U.S. Cl.
  CPC ... *H04N 21/2343* (2013.01); *H04N 21/23412* (2013.01); *H04N 21/23614* (2013.01); *H04N 21/234309* (2013.01); *H04N 21/234363* (2013.01); *H04N 21/258* (2013.01); *H04N 21/25825* (2013.01); *H04N 21/25833* (2013.01); *H04N 21/25858* (2013.01)

(58) Field of Classification Search
  USPC .......................................................... 715/719
  See application file for complete search history.

(56) References Cited

U.S. PATENT DOCUMENTS

| | | |
|---|---|---|
| 3,997,718 A | 12/1976 | Ricketts et al. |
| 4,002,843 A | 1/1977 | Rackman |
| 4,032,972 A | 6/1977 | Saylor |
| 4,077,006 A | 2/1978 | Nicholson |
| 4,081,831 A | 3/1978 | Tang et al. |
| 4,107,734 A | 8/1978 | Percy et al. |
| 4,107,735 A | 8/1978 | Frohbach |
| 4,145,720 A | 3/1979 | Weintraub et al. |
| 4,168,400 A | 9/1979 | de Couasnon et al. |
| 4,186,438 A | 1/1980 | Benson et al. |
| 4,222,068 A | 9/1980 | Thompson |
| 4,245,245 A | 1/1981 | Matsumoto et al. |
| 4,247,106 A | 1/1981 | Jeffers et al. |
| 4,253,114 A | 2/1981 | Tang et al. |
| 4,264,924 A | 4/1981 | Freeman |
| 4,264,925 A | 4/1981 | Freeman et al. |
| 4,290,142 A | 9/1981 | Schnee et al. |
| 4,302,771 A | 11/1981 | Gargini |
| 4,308,554 A | 12/1981 | Percy et al. |
| 4,350,980 A | 9/1982 | Ward |
| 4,367,557 A | 1/1983 | Stern et al. |
| 4,395,780 A | 7/1983 | Gohm et al. |
| 4,408,225 A | 10/1983 | Ensinger et al. |
| 4,450,477 A | 5/1984 | Lovett |
| 4,454,538 A | 6/1984 | Toriumi |
| 4,466,017 A | 8/1984 | Banker |
| 4,471,380 A | 9/1984 | Mobley |
| 4,475,123 A | 10/1984 | Dumbauld et al. |
| 4,484,217 A | 11/1984 | Block et al. |
| 4,491,983 A | 1/1985 | Pinnow et al. |
| 4,506,387 A | 3/1985 | Walter |
| 4,507,680 A | 3/1985 | Freeman |
| 4,509,073 A | 4/1985 | Baran et al. |
| 4,523,228 A | 6/1985 | Banker |
| 4,533,948 A | 8/1985 | McNamara et al. |
| 4,536,791 A | 8/1985 | Campbell et al. |
| 4,538,174 A | 8/1985 | Gargini et al. |
| 4,538,176 A | 8/1985 | Nakajima et al. |
| 4,553,161 A | 11/1985 | Citta |
| 4,554,581 A | 11/1985 | Tentler et al. |
| 4,555,561 A | 11/1985 | Sugimori et al. |
| 4,562,465 A | 12/1985 | Glaab |
| 4,567,517 A | 1/1986 | Mobley |
| 4,573,072 A | 2/1986 | Freeman |
| 4,591,906 A | 5/1986 | Morales-Garza et al. |
| 4,602,279 A | 7/1986 | Freeman |
| 4,614,970 A | 9/1986 | Clupper et al. |
| 4,616,263 A | 10/1986 | Eichelberger |
| 4,625,235 A | 11/1986 | Watson |
| 4,627,105 A | 12/1986 | Ohashi et al. |
| 4,633,462 A | 12/1986 | Stifle et al. |
| 4,670,904 A | 6/1987 | Rumreich |
| 4,682,360 A | 7/1987 | Frederiksen |
| 4,695,880 A | 9/1987 | Johnson et al. |
| 4,706,121 A | 11/1987 | Young |
| 4,706,285 A | 11/1987 | Rumreich |
| 4,709,418 A | 11/1987 | Fox et al. |
| 4,710,971 A | 12/1987 | Nozaki et al. |
| 4,718,086 A | 1/1988 | Rumreich et al. |
| 4,732,764 A | 3/1988 | Hemingway et al. |
| 4,734,764 A | 3/1988 | Pocock et al. |
| 4,748,689 A | 5/1988 | Mohr |
| 4,749,992 A | 6/1988 | Fitzemeyer et al. |
| 4,750,036 A | 6/1988 | Martinez |
| 4,754,426 A | 6/1988 | Rast et al. |
| 4,760,442 A | 7/1988 | O'Connell et al. |
| 4,763,317 A | 8/1988 | Lehman et al. |
| 4,769,833 A | 9/1988 | Farleigh et al. |
| 4,769,838 A | 9/1988 | Hasegawa |
| 4,789,863 A | 12/1988 | Bush |
| 4,792,849 A | 12/1988 | McCalley et al. |
| 4,801,190 A | 1/1989 | Imoto |
| 4,805,134 A | 2/1989 | Calo et al. |
| 4,807,031 A | 2/1989 | Broughton et al. |
| 4,816,905 A | 3/1989 | Tweedy et al. |
| 4,821,102 A | 4/1989 | Ichikawa et al. |
| 4,823,386 A | 4/1989 | Dumbauld et al. |
| 4,827,253 A | 5/1989 | Maltz |
| 4,827,511 A | 5/1989 | Masuko |
| 4,829,372 A | 5/1989 | McCalley et al. |
| 4,829,558 A | 5/1989 | Welsh |
| 4,847,698 A | 7/1989 | Freeman |
| 4,847,699 A | 7/1989 | Freeman |
| 4,847,700 A | 7/1989 | Freeman |
| 4,848,698 A | 7/1989 | Newell et al. |
| 4,860,379 A | 8/1989 | Schoeneberger et al. |
| 4,864,613 A | 9/1989 | Van Cleave |
| 4,876,592 A | 10/1989 | Von Kohorn |
| 4,889,369 A | 12/1989 | Albrecht |
| 4,890,320 A | 12/1989 | Monslow et al. |
| 4,891,694 A | 1/1990 | Way |
| 4,901,367 A | 2/1990 | Nicholson |
| 4,903,126 A | 2/1990 | Kassatly |
| 4,905,094 A | 2/1990 | Pocock et al. |
| 4,912,760 A | 3/1990 | West, Jr. et al. |
| 4,918,516 A | 4/1990 | Freeman |
| 4,920,566 A | 4/1990 | Robbins et al. |
| 4,922,532 A | 5/1990 | Farmer et al. |
| 4,924,303 A | 5/1990 | Brandon et al. |
| 4,924,498 A | 5/1990 | Farmer et al. |
| 4,937,821 A | 6/1990 | Boulton |
| 4,941,040 A | 7/1990 | Pocock et al. |
| 4,947,244 A | 8/1990 | Fenwick et al. |
| 4,961,211 A | 10/1990 | Tsugane et al. |
| 4,963,995 A | 10/1990 | Lang |
| 4,975,771 A | 12/1990 | Kassatly |
| 4,989,245 A | 1/1991 | Bennett |
| 4,994,909 A | 2/1991 | Graves et al. |
| 4,995,078 A | 2/1991 | Monslow et al. |
| 5,003,384 A | 3/1991 | Durden et al. |
| 5,008,934 A | 4/1991 | Endoh |
| 5,014,125 A | 5/1991 | Pocock et al. |
| 5,027,400 A | 6/1991 | Baji et al. |
| 5,051,720 A | 9/1991 | Kittirutsunetorn |
| 5,051,822 A | 9/1991 | Rhoades |
| 5,057,917 A | 10/1991 | Shalkauser et al. |
| 5,058,160 A | 10/1991 | Banker et al. |
| 5,060,262 A | 10/1991 | Bevins, Jr. et al. |
| 5,077,607 A | 12/1991 | Johnson et al. |
| 5,083,800 A | 1/1992 | Lockton |
| 5,088,111 A | 2/1992 | McNamara et al. |
| 5,093,718 A | 3/1992 | Hoarty et al. |
| 5,109,414 A | 4/1992 | Harvey et al. |
| 5,113,496 A | 5/1992 | McCalley et al. |
| 5,119,188 A | 6/1992 | McCalley et al. |
| 5,130,792 A | 7/1992 | Tindell et al. |
| 5,132,992 A | 7/1992 | Yurt et al. |
| 5,133,009 A | 7/1992 | Rumreich |
| 5,133,079 A | 7/1992 | Ballantyne et al. |
| 5,136,411 A | 8/1992 | Paik et al. |
| 5,142,575 A | 8/1992 | Farmer et al. |
| 5,144,448 A | 9/1992 | Hombaker, III et al. |
| 5,155,591 A | 10/1992 | Wachob |
| 5,172,413 A | 12/1992 | Bradley et al. |

(56) References Cited

U.S. PATENT DOCUMENTS

| | | |
|---|---|---|
| 5,191,410 A | 3/1993 | McCalley et al. |
| 5,195,092 A | 3/1993 | Wilson et al. |
| 5,208,665 A | 5/1993 | McCalley et al. |
| 5,220,420 A | 6/1993 | Hoarty et al. |
| 5,230,019 A | 7/1993 | Yanagimichi et al. |
| 5,231,494 A | 7/1993 | Wachob |
| 5,236,199 A | 8/1993 | Thompson, Jr. |
| 5,247,347 A | 9/1993 | Letteral et al. |
| 5,253,341 A | 10/1993 | Rozmanith et al. |
| 5,262,854 A | 11/1993 | Ng |
| 5,262,860 A | 11/1993 | Fitzpatrick et al. |
| 5,303,388 A | 4/1994 | Kreitman et al. |
| 5,319,455 A | 6/1994 | Hoarty et al. |
| 5,319,707 A | 6/1994 | Wasilewski et al. |
| 5,321,440 A | 6/1994 | Yanagihara et al. |
| 5,321,514 A | 6/1994 | Martinez |
| 5,351,129 A | 9/1994 | Lai |
| 5,355,162 A | 10/1994 | Yazolino et al. |
| 5,359,601 A | 10/1994 | Wasilewski et al. |
| 5,361,091 A | 11/1994 | Hoarty et al. |
| 5,371,532 A | 12/1994 | Gelman et al. |
| 5,404,393 A | 4/1995 | Remillard |
| 5,408,274 A | 4/1995 | Chang et al. |
| 5,410,343 A | 4/1995 | Coddington et al. |
| 5,410,344 A | 4/1995 | Graves et al. |
| 5,412,415 A | 5/1995 | Cook et al. |
| 5,412,720 A | 5/1995 | Hoarty |
| 5,418,559 A | 5/1995 | Blahut |
| 5,422,674 A | 6/1995 | Hooper et al. |
| 5,422,887 A | 6/1995 | Diepstraten et al. |
| 5,442,389 A | 8/1995 | Blahut et al. |
| 5,442,390 A | 8/1995 | Hooper et al. |
| 5,442,700 A | 8/1995 | Snell et al. |
| 5,446,490 A | 8/1995 | Blahut et al. |
| 5,469,283 A | 11/1995 | Vinel et al. |
| 5,469,431 A | 11/1995 | Wendorf et al. |
| 5,471,263 A | 11/1995 | Odaka |
| 5,481,542 A | 1/1996 | Logston et al. |
| 5,485,197 A | 1/1996 | Hoarty |
| 5,487,066 A | 1/1996 | McNamara et al. |
| 5,493,638 A | 2/1996 | Hooper et al. |
| 5,495,283 A | 2/1996 | Cowe |
| 5,495,295 A | 2/1996 | Long |
| 5,497,187 A | 3/1996 | Banker et al. |
| 5,517,250 A | 5/1996 | Hoogenboom et al. |
| 5,526,034 A | 6/1996 | Hoarty et al. |
| 5,528,281 A | 6/1996 | Grady et al. |
| 5,537,397 A | 7/1996 | Abramson |
| 5,537,404 A | 7/1996 | Bentley et al. |
| 5,539,449 A | 7/1996 | Blahut et al. |
| RE35,314 E | 8/1996 | Logg |
| 5,548,340 A | 8/1996 | Bertram |
| 5,550,578 A | 8/1996 | Hoarty et al. |
| 5,557,316 A | 9/1996 | Hoarty et al. |
| 5,559,549 A | 9/1996 | Hendricks et al. |
| 5,561,708 A | 10/1996 | Remillard |
| 5,570,126 A | 10/1996 | Blahut et al. |
| 5,570,363 A | 10/1996 | Holm |
| 5,579,143 A | 11/1996 | Huber |
| 5,581,653 A | 12/1996 | Todd |
| 5,583,927 A | 12/1996 | Ely et al. |
| 5,587,734 A | 12/1996 | Lauder et al. |
| 5,589,885 A | 12/1996 | Ooi |
| 5,592,470 A | 1/1997 | Rudrapatna et al. |
| 5,594,507 A | 1/1997 | Hoarty |
| 5,594,723 A | 1/1997 | Tibi |
| 5,594,938 A | 1/1997 | Engel |
| 5,596,693 A | 1/1997 | Needle et al. |
| 5,600,364 A | 2/1997 | Hendricks et al. |
| 5,600,573 A | 2/1997 | Hendricks et al. |
| 5,608,446 A | 3/1997 | Carr et al. |
| 5,617,145 A | 4/1997 | Huang et al. |
| 5,621,464 A | 4/1997 | Teo et al. |
| 5,625,404 A | 4/1997 | Grady et al. |
| 5,630,757 A | 5/1997 | Gagin et al. |
| 5,631,693 A | 5/1997 | Wunderlich et al. |
| 5,631,846 A | 5/1997 | Szurkowski |
| 5,632,003 A | 5/1997 | Davidson et al. |
| 5,642,498 A | 6/1997 | Kutner |
| 5,649,283 A | 7/1997 | Galler et al. |
| 5,668,592 A | 9/1997 | Spaulding, II |
| 5,668,599 A | 9/1997 | Cheney et al. |
| 5,708,767 A | 1/1998 | Yeo et al. |
| 5,710,815 A | 1/1998 | Ming et al. |
| 5,712,906 A | 1/1998 | Grady et al. |
| 5,740,307 A | 4/1998 | Lane |
| 5,742,289 A | 4/1998 | Naylor et al. |
| 5,748,234 A | 5/1998 | Lippincott |
| 5,754,941 A | 5/1998 | Sharpe et al. |
| 5,786,527 A | 7/1998 | Tarte |
| 5,790,174 A | 8/1998 | Richard, III et al. |
| 5,802,283 A | 9/1998 | Grady et al. |
| 5,812,665 A | 9/1998 | Hoarty et al. |
| 5,812,786 A | 9/1998 | Seazholtz et al. |
| 5,815,604 A | 9/1998 | Simons et al. |
| 5,818,438 A | 10/1998 | Howe et al. |
| 5,821,945 A | 10/1998 | Yeo et al. |
| 5,822,537 A | 10/1998 | Katseff et al. |
| 5,828,371 A | 10/1998 | Cline et al. |
| 5,844,594 A | 12/1998 | Ferguson |
| 5,845,083 A | 12/1998 | Hamadani et al. |
| 5,862,325 A | 1/1999 | Reed et al. |
| 5,864,820 A | 1/1999 | Case |
| 5,867,208 A | 2/1999 | McLaren |
| 5,883,661 A | 3/1999 | Hoarty |
| 5,903,727 A | 5/1999 | Nielsen |
| 5,903,816 A | 5/1999 | Broadwin et al. |
| 5,905,522 A | 5/1999 | Lawler |
| 5,907,681 A | 5/1999 | Bates et al. |
| 5,917,822 A | 6/1999 | Lyles et al. |
| 5,946,352 A | 8/1999 | Rowlands et al. |
| 5,952,943 A | 9/1999 | Walsh et al. |
| 5,959,690 A | 9/1999 | Toebes et al. |
| 5,961,603 A | 10/1999 | Kunkel et al. |
| 5,963,203 A | 10/1999 | Goldberg et al. |
| 5,966,163 A | 10/1999 | Lin et al. |
| 5,978,756 A | 11/1999 | Walker et al. |
| 5,982,445 A | 11/1999 | Eyer et al. |
| 5,990,862 A | 11/1999 | Lewis |
| 5,995,146 A | 11/1999 | Rasmusse |
| 5,995,488 A | 11/1999 | Kalhunte et al. |
| 5,999,970 A | 12/1999 | Krisbergh et al. |
| 6,014,416 A | 1/2000 | Shin et al. |
| 6,021,386 A | 2/2000 | Davis et al. |
| 6,031,989 A | 2/2000 | Cordell |
| 6,034,678 A | 3/2000 | Hoarty et al. |
| 6,049,539 A | 4/2000 | Lee et al. |
| 6,049,831 A | 4/2000 | Gardell et al. |
| 6,052,555 A | 4/2000 | Ferguson |
| 6,055,247 A | 4/2000 | Kubota et al. |
| 6,055,314 A | 4/2000 | Spies et al. |
| 6,055,315 A | 4/2000 | Doyle et al. |
| 6,064,377 A | 5/2000 | Hoarty et al. |
| 6,078,328 A | 6/2000 | Schumann et al. |
| 6,084,908 A | 7/2000 | Chiang et al. |
| 6,100,883 A | 8/2000 | Hoarty |
| 6,108,625 A | 8/2000 | Kim |
| 6,115,076 A | 9/2000 | Linzer |
| 6,131,182 A | 10/2000 | Beakes et al. |
| 6,141,645 A | 10/2000 | Chi-Min et al. |
| 6,141,693 A | 10/2000 | Perlman et al. |
| 6,144,698 A | 11/2000 | Poon et al. |
| 6,167,084 A | 12/2000 | Wang et al. |
| 6,169,573 B1 | 1/2001 | Sampath-Kumar et al. |
| 6,177,931 B1 | 1/2001 | Alexander et al. |
| 6,182,072 B1 | 1/2001 | Leak et al. |
| 6,184,878 B1 | 2/2001 | Alonso et al. |
| 6,192,081 B1 | 2/2001 | Chiang et al. |
| 6,198,822 B1 | 3/2001 | Doyle et al. |
| 6,205,582 B1 | 3/2001 | Hoarty |
| 6,226,041 B1 | 5/2001 | Florencio et al. |
| 6,236,730 B1 | 5/2001 | Cowieson et al. |
| 6,243,418 B1 | 6/2001 | Kim |
| 6,253,238 B1 | 6/2001 | Lauder et al. |

(56) References Cited

U.S. PATENT DOCUMENTS

| | | |
|---|---|---|
| 6,256,047 B1 | 7/2001 | Isobe et al. |
| 6,259,826 B1 | 7/2001 | Pollard et al. |
| 6,266,369 B1 | 7/2001 | Wang et al. |
| 6,266,684 B1 | 7/2001 | Kraus et al. |
| 6,268,864 B1 | 7/2001 | Chen et al. |
| 6,275,496 B1 | 8/2001 | Burns et al. |
| 6,292,194 B1 | 9/2001 | Powell, III |
| 6,305,020 B1 | 10/2001 | Hoarty et al. |
| 6,310,601 B1 | 10/2001 | Moore et al. |
| 6,317,151 B1 | 11/2001 | Ohsuga et al. |
| 6,317,885 B1 | 11/2001 | Fries |
| 6,349,284 B1 | 2/2002 | Park et al. |
| 6,385,771 B1 | 5/2002 | Gordon |
| 6,386,980 B1 | 5/2002 | Nishino et al. |
| 6,389,075 B2 | 5/2002 | Wang et al. |
| 6,389,218 B2 | 5/2002 | Gordon et al. |
| 6,415,031 B1 | 7/2002 | Colligan et al. |
| 6,415,437 B1 | 7/2002 | Ludvig et al. |
| 6,438,140 B1 | 8/2002 | Jungers et al. |
| 6,446,037 B1 | 9/2002 | Fielder et al. |
| 6,459,427 B1 | 10/2002 | Mao et al. |
| 6,477,182 B2 | 11/2002 | Calderone |
| 6,480,210 B1 | 11/2002 | Martino et al. |
| 6,481,012 B1 | 11/2002 | Gordon et al. |
| 6,512,793 B1 | 1/2003 | Maeda |
| 6,525,746 B1 | 2/2003 | Lau et al. |
| 6,536,043 B1 | 3/2003 | Guedalia |
| 6,539,545 B1 | 3/2003 | Dureau et al. |
| 6,557,041 B2 | 4/2003 | Mallart |
| 6,560,496 B1 | 5/2003 | Michnener |
| 6,564,378 B1 | 5/2003 | Satterfield et al. |
| 6,578,201 B1 | 6/2003 | LaRocca et al. |
| 6,579,184 B1 | 6/2003 | Tanskanen |
| 6,584,153 B1 | 6/2003 | Gordon et al. |
| 6,588,017 B1 | 7/2003 | Calderone |
| 6,598,229 B2 | 7/2003 | Smyth et al. |
| 6,604,224 B1 | 8/2003 | Armstrong et al. |
| 6,614,442 B1 | 9/2003 | Ouyang et al. |
| 6,621,870 B1 | 9/2003 | Gordon et al. |
| 6,625,574 B1 | 9/2003 | Taniguchi et al. |
| 6,639,896 B1 | 10/2003 | Goode et al. |
| 6,645,076 B1 | 11/2003 | Sugai |
| 6,651,252 B1 | 11/2003 | Gordon et al. |
| 6,657,647 B1 | 12/2003 | Bright |
| 6,675,385 B1 | 1/2004 | Wang |
| 6,675,387 B1 | 1/2004 | Boucher |
| 6,681,326 B2 | 1/2004 | Son et al. |
| 6,681,397 B1 | 1/2004 | Tsai et al. |
| 6,684,400 B1 | 1/2004 | Goode et al. |
| 6,687,663 B1 | 2/2004 | McGrath et al. |
| 6,691,208 B2 | 2/2004 | Dandrea et al. |
| 6,697,376 B1 | 2/2004 | Son et al. |
| 6,704,359 B1 | 3/2004 | Bayrakeri et al. |
| 6,717,600 B2 | 4/2004 | Dutta et al. |
| 6,718,552 B1 | 4/2004 | Goode |
| 6,721,794 B2 | 4/2004 | Taylor et al. |
| 6,721,956 B2 | 4/2004 | Wsilewski |
| 6,727,929 B1 | 4/2004 | Bates et al. |
| 6,731,605 B1 | 5/2004 | Deshpande |
| 6,732,370 B1 | 5/2004 | Gordon et al. |
| 6,747,991 B1 | 6/2004 | Hemy et al. |
| 6,754,271 B1 | 6/2004 | Gordon et al. |
| 6,754,905 B2 | 6/2004 | Gordon et al. |
| 6,758,540 B1 | 7/2004 | Adolph et al. |
| 6,766,407 B1 | 7/2004 | Lisitsa et al. |
| 6,771,704 B1 | 8/2004 | Hannah |
| 6,785,902 B1 | 8/2004 | Zigmond et al. |
| 6,807,528 B1 | 10/2004 | Truman et al. |
| 6,810,528 B1 | 10/2004 | Chatani |
| 6,813,690 B1 | 11/2004 | Lango et al. |
| 6,817,947 B2 | 11/2004 | Tanskanen |
| 6,850,490 B1 | 2/2005 | Woo et al. |
| 6,886,178 B1 | 4/2005 | Mao et al. |
| 6,907,574 B2 | 6/2005 | Xu et al. |
| 6,931,291 B1 | 8/2005 | Alvarez-Tinoco et al. |
| 6,941,019 B1 | 9/2005 | Mitchell et al. |
| 6,941,574 B1 | 9/2005 | Broadwin et al. |
| 6,947,509 B1 | 9/2005 | Wong |
| 6,952,221 B1 | 10/2005 | Holtz et al. |
| 6,956,899 B2 | 10/2005 | Hall et al. |
| 7,016,540 B1 | 3/2006 | Gong et al. |
| 7,030,890 B1 | 4/2006 | Jouet et al. |
| 7,031,385 B1 | 4/2006 | Inoue et al. |
| 7,050,113 B2 | 5/2006 | Campisano et al. |
| 7,089,577 B1 | 8/2006 | Rakib et al. |
| 7,093,028 B1 | 8/2006 | Shao et al. |
| 7,095,402 B2 | 8/2006 | Kunil et al. |
| 7,114,167 B2 | 9/2006 | Slemmer et al. |
| 7,146,615 B1 | 12/2006 | Hervet et al. |
| 7,151,782 B1 | 12/2006 | Oz et al. |
| 7,158,676 B1 | 1/2007 | Rainsford |
| 7,200,836 B2 | 4/2007 | Brodersen et al. |
| 7,212,573 B2 | 5/2007 | Winger |
| 7,224,731 B2 | 5/2007 | Mehrotra |
| 7,272,556 B1 | 9/2007 | Aguilar et al. |
| 7,310,619 B2 | 12/2007 | Baar et al. |
| 7,325,043 B1 | 1/2008 | Rosenberg et al. |
| 7,346,111 B2 | 3/2008 | Winger et al. |
| 7,360,230 B1 | 4/2008 | Paz et al. |
| 7,412,423 B1 | 8/2008 | Asano |
| 7,412,505 B2 | 8/2008 | Slemmer et al. |
| 7,421,082 B2 | 9/2008 | Kamiya et al. |
| 7,444,306 B2 | 10/2008 | Varble |
| 7,444,418 B2 | 10/2008 | Chou et al. |
| 7,500,235 B2 | 3/2009 | Maynard et al. |
| 7,508,941 B1 | 3/2009 | O'Toole, Jr. et al. |
| 7,512,577 B2 | 3/2009 | Slemmer et al. |
| 7,543,073 B2 | 6/2009 | Chou et al. |
| 7,596,764 B2 | 9/2009 | Vienneau et al. |
| 7,623,575 B2 | 11/2009 | Winger |
| 7,669,220 B2 | 2/2010 | Goode |
| 7,742,609 B2 | 6/2010 | Yeakel et al. |
| 7,743,400 B2 | 6/2010 | Kurauchi |
| 7,751,572 B2 | 7/2010 | Villemoes et al. |
| 7,757,157 B1 | 7/2010 | Fukuda |
| 7,830,388 B1 | 11/2010 | Lu |
| 7,840,905 B1 | 11/2010 | Weber et al. |
| 7,925,775 B2 | 4/2011 | Nishida |
| 7,936,819 B2 | 5/2011 | Craig et al. |
| 7,941,645 B1 | 5/2011 | Riach et al. |
| 7,945,616 B2 | 5/2011 | Zeng et al. |
| 7,970,263 B1 | 6/2011 | Asch |
| 7,987,489 B2 | 7/2011 | Krzyzanowski et al. |
| 8,027,353 B2 | 9/2011 | Damola et al. |
| 8,036,271 B2 | 10/2011 | Winger et al. |
| 8,046,798 B1 | 10/2011 | Schlack et al. |
| 8,074,248 B2 | 12/2011 | Sigmon et al. |
| 8,078,603 B1 | 12/2011 | Chandratillake et al. |
| 8,118,676 B2 | 2/2012 | Craig et al. |
| 8,136,033 B1 | 3/2012 | Bhargava et al. |
| 8,149,917 B2 | 4/2012 | Zhang et al. |
| 8,155,194 B2 | 4/2012 | Winger et al. |
| 8,155,202 B2 | 4/2012 | Landau |
| 8,170,107 B2 | 5/2012 | Winger |
| 8,194,862 B2 | 6/2012 | Herr et al. |
| 8,243,630 B2 | 8/2012 | Luo et al. |
| 8,270,439 B2 | 9/2012 | Herr et al. |
| 8,284,842 B2 | 10/2012 | Craig et al. |
| 8,296,424 B2 | 10/2012 | Malloy et al. |
| 8,370,869 B2 | 2/2013 | Paek et al. |
| 8,411,754 B2 | 4/2013 | Zhang et al. |
| 8,442,110 B2 | 5/2013 | Pavlovskaia et al. |
| 8,473,996 B2 | 6/2013 | Gordon et al. |
| 8,619,867 B2 | 12/2013 | Craig et al. |
| 8,621,500 B2 | 12/2013 | Weaver et al. |
| 8,656,430 B2 | 2/2014 | Doyle |
| 8,781,240 B2 | 7/2014 | Srinivasan et al. |
| 8,839,317 B1 | 9/2014 | Rieger et al. |
| 8,914,813 B1 | 12/2014 | Sigurdsson et al. |
| 9,204,113 B1 | 12/2015 | Kwok |
| 2001/0005360 A1 | 6/2001 | Lee |
| 2001/0008845 A1 | 7/2001 | Kusuda et al. |
| 2001/0027563 A1 | 10/2001 | White et al. |
| 2001/0043215 A1 | 11/2001 | Middleton, III et al. |

(56) References Cited

U.S. PATENT DOCUMENTS

| | | |
|---|---|---|
| 2001/0049301 A1 | 12/2001 | Masuda et al. |
| 2002/0007491 A1 | 1/2002 | Schiller et al. |
| 2002/0013812 A1 | 1/2002 | Krueger et al. |
| 2002/0016161 A1 | 2/2002 | Dellien et al. |
| 2002/0021353 A1 | 2/2002 | DeNies |
| 2002/0026642 A1 | 2/2002 | Augenbraun et al. |
| 2002/0027567 A1 | 3/2002 | Niamir |
| 2002/0032697 A1 | 3/2002 | French et al. |
| 2002/0040482 A1 | 4/2002 | Sextro et al. |
| 2002/0047899 A1 | 4/2002 | Son et al. |
| 2002/0049975 A1 | 4/2002 | Thomas et al. |
| 2002/0054578 A1 | 5/2002 | Zhang et al. |
| 2002/0056083 A1 | 5/2002 | Istvan |
| 2002/0056107 A1 | 5/2002 | Schlack |
| 2002/0056136 A1 | 5/2002 | Wistendahl et al. |
| 2002/0059644 A1 | 5/2002 | Andrade et al. |
| 2002/0062484 A1 | 5/2002 | De Lange et al. |
| 2002/0067766 A1 | 6/2002 | Sakamoto et al. |
| 2002/0069267 A1 | 6/2002 | Thiele |
| 2002/0072408 A1 | 6/2002 | Kumagai |
| 2002/0078171 A1 | 6/2002 | Schneider |
| 2002/0078456 A1 | 6/2002 | Hudson et al. |
| 2002/0083464 A1 | 6/2002 | Tomsen et al. |
| 2002/0091738 A1 | 7/2002 | Rohrabaugh |
| 2002/0095689 A1 | 7/2002 | Novak |
| 2002/0105531 A1 | 8/2002 | Niemi |
| 2002/0108121 A1 | 8/2002 | Alao et al. |
| 2002/0116705 A1 | 8/2002 | Perlman |
| 2002/0131511 A1 | 9/2002 | Zenoni |
| 2002/0136298 A1 | 9/2002 | Anantharamu et al. |
| 2002/0152318 A1 | 10/2002 | Menon et al. |
| 2002/0171765 A1 | 11/2002 | Waki et al. |
| 2002/0175931 A1 | 11/2002 | Holtz et al. |
| 2002/0178278 A1 | 11/2002 | Ducharme |
| 2002/0178447 A1 | 11/2002 | Plotnick et al. |
| 2002/0188628 A1 | 12/2002 | Cooper et al. |
| 2002/0191851 A1 | 12/2002 | Keinan |
| 2002/0194592 A1 | 12/2002 | Tsuchida et al. |
| 2002/0196746 A1 | 12/2002 | Allen |
| 2003/0005452 A1 | 1/2003 | Rodriguez |
| 2003/0018796 A1 | 1/2003 | Chou et al. |
| 2003/0020671 A1 | 1/2003 | Santoro et al. |
| 2003/0027517 A1 | 2/2003 | Callway et al. |
| 2003/0035486 A1 | 2/2003 | Kato et al. |
| 2003/0038893 A1 | 2/2003 | Rajamaki et al. |
| 2003/0039398 A1 | 2/2003 | McIntyre |
| 2003/0046690 A1 | 3/2003 | Miller |
| 2003/0051253 A1 | 3/2003 | Barone, Jr. |
| 2003/0058941 A1 | 3/2003 | Chen et al. |
| 2003/0061451 A1 | 3/2003 | Beyda |
| 2003/0065739 A1 | 4/2003 | Shnier |
| 2003/0066093 A1 | 4/2003 | Cruz-Rivera et al. |
| 2003/0071792 A1 | 4/2003 | Safadi |
| 2003/0072372 A1 | 4/2003 | Shen et al. |
| 2003/0076546 A1 | 4/2003 | Johnson et al. |
| 2003/0088328 A1 | 5/2003 | Nishio et al. |
| 2003/0088400 A1 | 5/2003 | Nishio et al. |
| 2003/0095790 A1 | 5/2003 | Joshi |
| 2003/0107443 A1 | 6/2003 | Clancy |
| 2003/0122836 A1 | 7/2003 | Doyle et al. |
| 2003/0123664 A1 | 7/2003 | Pedlow, Jr. et al. |
| 2003/0126608 A1 | 7/2003 | Safadi |
| 2003/0126611 A1 | 7/2003 | Kuczynski-Brown |
| 2003/0131349 A1 | 7/2003 | Kuczynski-Brown |
| 2003/0135860 A1 | 7/2003 | Dureau |
| 2003/0169373 A1 | 9/2003 | Peters et al. |
| 2003/0177199 A1 | 9/2003 | Zenoni |
| 2003/0188309 A1 | 10/2003 | Yuen |
| 2003/0189980 A1 | 10/2003 | Dvir et al. |
| 2003/0196174 A1 | 10/2003 | Pierre Cote et al. |
| 2003/0208768 A1 | 11/2003 | Urdang et al. |
| 2003/0217360 A1 | 11/2003 | Gordon et al. |
| 2003/0229719 A1 | 12/2003 | Iwata et al. |
| 2003/0229900 A1 | 12/2003 | Reisman |
| 2003/0231218 A1 | 12/2003 | Amadio |
| 2004/0016000 A1 | 1/2004 | Zhang et al. |
| 2004/0034873 A1 | 2/2004 | Zenoni |
| 2004/0040035 A1 | 2/2004 | Carlucci et al. |
| 2004/0055007 A1 | 3/2004 | Allport |
| 2004/0073924 A1 | 4/2004 | Pendakur |
| 2004/0078822 A1 | 4/2004 | Breen et al. |
| 2004/0088375 A1 | 5/2004 | Sethi et al. |
| 2004/0091171 A1 | 5/2004 | Bone |
| 2004/0111526 A1 | 6/2004 | Baldwin et al. |
| 2004/0117827 A1 | 6/2004 | Karaoguz et al. |
| 2004/0128686 A1 | 7/2004 | Boyer et al. |
| 2004/0133704 A1 | 7/2004 | Krzyzanowski et al. |
| 2004/0136698 A1 | 7/2004 | Mock |
| 2004/0139158 A1 | 7/2004 | Datta |
| 2004/0157662 A1 | 8/2004 | Tsuchiya |
| 2004/0163101 A1 | 8/2004 | Swix et al. |
| 2004/0184542 A1 | 9/2004 | Fujimoto |
| 2004/0193648 A1 | 9/2004 | Lai et al. |
| 2004/0210824 A1 | 10/2004 | Shoff et al. |
| 2004/0216045 A1 | 10/2004 | Martin et al. |
| 2004/0261106 A1 | 12/2004 | Hoffman |
| 2004/0261114 A1 | 12/2004 | Addington et al. |
| 2004/0268419 A1 | 12/2004 | Danker et al. |
| 2005/0015259 A1 | 1/2005 | Thumpudi et al. |
| 2005/0015816 A1 | 1/2005 | Christofalo et al. |
| 2005/0021830 A1 | 1/2005 | Urzaiz et al. |
| 2005/0034155 A1 | 2/2005 | Gordon et al. |
| 2005/0034162 A1 | 2/2005 | White et al. |
| 2005/0044575 A1 | 2/2005 | Der Kuyl |
| 2005/0055685 A1 | 3/2005 | Maynard et al. |
| 2005/0055721 A1 | 3/2005 | Zigmond et al. |
| 2005/0071876 A1 | 3/2005 | van Beek |
| 2005/0076134 A1 | 4/2005 | Bialik et al. |
| 2005/0089091 A1 | 4/2005 | Kim et al. |
| 2005/0091690 A1 | 4/2005 | Delpuch et al. |
| 2005/0091695 A1 | 4/2005 | Paz et al. |
| 2005/0105608 A1 | 5/2005 | Coleman et al. |
| 2005/0114906 A1 | 5/2005 | Hoarty et al. |
| 2005/0132305 A1 | 6/2005 | Guichard et al. |
| 2005/0135385 A1 | 6/2005 | Jenkins et al. |
| 2005/0141613 A1 | 6/2005 | Kelly et al. |
| 2005/0149988 A1 | 7/2005 | Grannan |
| 2005/0155063 A1 | 7/2005 | Bayrakeri |
| 2005/0160088 A1 | 7/2005 | Scallan et al. |
| 2005/0166257 A1 | 7/2005 | Feinleib et al. |
| 2005/0177853 A1 | 8/2005 | Williams et al. |
| 2005/0180502 A1 | 8/2005 | Puri |
| 2005/0198682 A1 | 9/2005 | Wright |
| 2005/0213586 A1 | 9/2005 | Cyganski et al. |
| 2005/0216933 A1 | 9/2005 | Black |
| 2005/0216940 A1 | 9/2005 | Black |
| 2005/0226426 A1 | 10/2005 | Oomen et al. |
| 2005/0232309 A1 | 10/2005 | Kavaler |
| 2005/0273832 A1 | 12/2005 | Zigmond et al. |
| 2005/0283741 A1 | 12/2005 | Balabanovic et al. |
| 2006/0001737 A1 | 1/2006 | Dawson et al. |
| 2006/0020960 A1 | 1/2006 | Relan et al. |
| 2006/0020994 A1 | 1/2006 | Crane et al. |
| 2006/0026663 A1 | 2/2006 | Kortum et al. |
| 2006/0031906 A1 | 2/2006 | Kaneda |
| 2006/0039481 A1 | 2/2006 | Shen et al. |
| 2006/0041910 A1 | 2/2006 | Hatanaka et al. |
| 2006/0064716 A1 | 3/2006 | Sull et al. |
| 2006/0088105 A1 | 4/2006 | Shen et al. |
| 2006/0095944 A1 | 5/2006 | Demircin et al. |
| 2006/0112338 A1 | 5/2006 | Joung et al. |
| 2006/0117340 A1 | 6/2006 | Pavlovskaia et al. |
| 2006/0143678 A1 | 6/2006 | Cho et al. |
| 2006/0161538 A1 | 7/2006 | Kiilerich |
| 2006/0173985 A1 | 8/2006 | Moore |
| 2006/0174021 A1* | 8/2006 | Osborne ............... H04L 65/608 709/230 |
| 2006/0174026 A1 | 8/2006 | Robinson et al. |
| 2006/0174289 A1 | 8/2006 | Theberge |
| 2006/0184614 A1 | 8/2006 | Baratto et al. |
| 2006/0195884 A1 | 8/2006 | van Zoest et al. |
| 2006/0203913 A1 | 9/2006 | Kim et al. |
| 2006/0212203 A1 | 9/2006 | Furuno |
| 2006/0218601 A1 | 9/2006 | Michel |

(56) References Cited

U.S. PATENT DOCUMENTS

| | | |
|---|---|---|
| 2006/0230428 A1 | 10/2006 | Craig et al. |
| 2006/0242570 A1 | 10/2006 | Croft et al. |
| 2006/0256865 A1 | 11/2006 | Westerman |
| 2006/0267995 A1 | 11/2006 | Radloff |
| 2006/0269086 A1 | 11/2006 | Page et al. |
| 2006/0271985 A1 | 11/2006 | Hoffman et al. |
| 2006/0285586 A1 | 12/2006 | Westerman |
| 2006/0285819 A1 | 12/2006 | Kelly et al. |
| 2007/0009035 A1 | 1/2007 | Craig et al. |
| 2007/0009036 A1 | 1/2007 | Craig et al. |
| 2007/0009042 A1 | 1/2007 | Craig |
| 2007/0011702 A1 | 1/2007 | Vaysman |
| 2007/0025639 A1 | 2/2007 | Zhou et al. |
| 2007/0033528 A1 | 2/2007 | Merrit et al. |
| 2007/0033631 A1 | 2/2007 | Gordon et al. |
| 2007/0043667 A1 | 2/2007 | Qawami et al. |
| 2007/0074251 A1 | 3/2007 | Oguz et al. |
| 2007/0079325 A1 | 4/2007 | de Heer |
| 2007/0115941 A1 | 5/2007 | Patel et al. |
| 2007/0124282 A1 | 5/2007 | Wittkotter |
| 2007/0124795 A1 | 5/2007 | McKissick et al. |
| 2007/0130446 A1 | 6/2007 | Minakami |
| 2007/0130592 A1 | 6/2007 | Haeusel |
| 2007/0152984 A1 | 7/2007 | Ording et al. |
| 2007/0162953 A1 | 7/2007 | Bollinger et al. |
| 2007/0172061 A1 | 7/2007 | Pinder |
| 2007/0174790 A1 | 7/2007 | Jing et al. |
| 2007/0178243 A1 | 8/2007 | Dong et al. |
| 2007/0192798 A1 | 8/2007 | Morgan |
| 2007/0234220 A1 | 10/2007 | Khan et al. |
| 2007/0237232 A1 | 10/2007 | Chang et al. |
| 2007/0266412 A1 | 11/2007 | Trowbridge et al. |
| 2007/0300280 A1 | 12/2007 | Turner et al. |
| 2008/0034306 A1 | 2/2008 | Ording |
| 2008/0046373 A1 | 2/2008 | Kim |
| 2008/0046928 A1 | 2/2008 | Poling et al. |
| 2008/0052742 A1 | 2/2008 | Kopf |
| 2008/0060034 A1 | 3/2008 | Egnal et al. |
| 2008/0066135 A1 | 3/2008 | Brodersen et al. |
| 2008/0084503 A1 | 4/2008 | Kondo |
| 2008/0086688 A1 | 4/2008 | Chandratillake et al. |
| 2008/0086747 A1 | 4/2008 | Rasanen et al. |
| 2008/0094368 A1 | 4/2008 | Ording et al. |
| 2008/0097953 A1 | 4/2008 | Levy et al. |
| 2008/0098212 A1 | 4/2008 | Helms et al. |
| 2008/0098450 A1 | 4/2008 | Wu et al. |
| 2008/0104520 A1 | 5/2008 | Swenson et al. |
| 2008/0127255 A1 | 5/2008 | Ress et al. |
| 2008/0144711 A1 | 6/2008 | Chui et al. |
| 2008/0154583 A1 | 6/2008 | Goto et al. |
| 2008/0163059 A1 | 7/2008 | Craner |
| 2008/0163286 A1 | 7/2008 | Rudolph et al. |
| 2008/0170619 A1 | 7/2008 | Landau |
| 2008/0170622 A1* | 7/2008 | Gordon ............ H04N 21/23412 375/240.18 |
| 2008/0172441 A1 | 7/2008 | Speicher et al. |
| 2008/0178125 A1 | 7/2008 | Elsbree et al. |
| 2008/0178243 A1 | 7/2008 | Dong et al. |
| 2008/0178249 A1 | 7/2008 | Gordon et al. |
| 2008/0181221 A1 | 7/2008 | Kampmann et al. |
| 2008/0184120 A1 | 7/2008 | O-Brien-Strain et al. |
| 2008/0189740 A1 | 8/2008 | Carpenter et al. |
| 2008/0195573 A1 | 8/2008 | Onoda et al. |
| 2008/0201736 A1 | 8/2008 | Gordon et al. |
| 2008/0212942 A1 | 9/2008 | Gordon et al. |
| 2008/0222199 A1 | 9/2008 | Tiu et al. |
| 2008/0232243 A1 | 9/2008 | Oren et al. |
| 2008/0232452 A1 | 9/2008 | Sullivan et al. |
| 2008/0243918 A1 | 10/2008 | Holtman |
| 2008/0243998 A1 | 10/2008 | Oh et al. |
| 2008/0244681 A1 | 10/2008 | Gossweiler et al. |
| 2008/0246759 A1 | 10/2008 | Summers |
| 2008/0253440 A1 | 10/2008 | Srinivasan et al. |
| 2008/0253685 A1 | 10/2008 | Kuranov et al. |
| 2008/0271080 A1 | 10/2008 | Grossweiler et al. |
| 2009/0003446 A1 | 1/2009 | Wu et al. |
| 2009/0003705 A1 | 1/2009 | Zou et al. |
| 2009/0007199 A1 | 1/2009 | La Joie |
| 2009/0025027 A1 | 1/2009 | Craner |
| 2009/0031341 A1 | 1/2009 | Schlack et al. |
| 2009/0041118 A1 | 2/2009 | Pavlovskaia et al. |
| 2009/0083781 A1 | 3/2009 | Yang et al. |
| 2009/0083813 A1 | 3/2009 | Dolce et al. |
| 2009/0083824 A1 | 3/2009 | McCarthy et al. |
| 2009/0089188 A1 | 4/2009 | Ku et al. |
| 2009/0094113 A1 | 4/2009 | Berry et al. |
| 2009/0094646 A1 | 4/2009 | Walter et al. |
| 2009/0100465 A1 | 4/2009 | Kulakowski |
| 2009/0100489 A1 | 4/2009 | Strothmann |
| 2009/0106269 A1 | 4/2009 | Zuckerman et al. |
| 2009/0106386 A1 | 4/2009 | Zuckerman et al. |
| 2009/0106392 A1 | 4/2009 | Zuckerman et al. |
| 2009/0106425 A1 | 4/2009 | Zuckerman et al. |
| 2009/0106441 A1 | 4/2009 | Zuckerman et al. |
| 2009/0106451 A1 | 4/2009 | Zuckerman et al. |
| 2009/0106511 A1 | 4/2009 | Zuckerman et al. |
| 2009/0113009 A1 | 4/2009 | Slemmer et al. |
| 2009/0132942 A1 | 5/2009 | Santoro et al. |
| 2009/0138966 A1 | 5/2009 | Krause et al. |
| 2009/0144781 A1 | 6/2009 | Glaser et al. |
| 2009/0146779 A1 | 6/2009 | Kumar et al. |
| 2009/0157868 A1 | 6/2009 | Chaudhry |
| 2009/0158369 A1 | 6/2009 | Van Vleck et al. |
| 2009/0160694 A1 | 6/2009 | Di Flora |
| 2009/0172431 A1 | 7/2009 | Gupta et al. |
| 2009/0172726 A1 | 7/2009 | Vantalon et al. |
| 2009/0172757 A1 | 7/2009 | Aldrey et al. |
| 2009/0178098 A1 | 7/2009 | Westbrook et al. |
| 2009/0183197 A1 | 7/2009 | Matthews |
| 2009/0183219 A1 | 7/2009 | Maynard et al. |
| 2009/0189890 A1 | 7/2009 | Corbett et al. |
| 2009/0193452 A1 | 7/2009 | Russ et al. |
| 2009/0196346 A1 | 8/2009 | Zhang et al. |
| 2009/0204920 A1 | 8/2009 | Beverly et al. |
| 2009/0210899 A1 | 8/2009 | Lawrence-Apfelbaum et al. |
| 2009/0225790 A1 | 9/2009 | Shay et al. |
| 2009/0228620 A1 | 9/2009 | Thomas et al. |
| 2009/0228922 A1 | 9/2009 | Haj-khalil et al. |
| 2009/0233593 A1 | 9/2009 | Ergen et al. |
| 2009/0251478 A1 | 10/2009 | Maillot et al. |
| 2009/0254960 A1 | 10/2009 | Yarom et al. |
| 2009/0265617 A1 | 10/2009 | Randall et al. |
| 2009/0271512 A1 | 10/2009 | Jorgensen |
| 2009/0271818 A1 | 10/2009 | Schlack |
| 2009/0298535 A1 | 12/2009 | Klein et al. |
| 2009/0313674 A1 | 12/2009 | Ludvig et al. |
| 2009/0316709 A1 | 12/2009 | Polcha et al. |
| 2009/0328109 A1 | 12/2009 | Pavlovskaia et al. |
| 2010/0009623 A1 | 1/2010 | Hennenhoefer et al. |
| 2010/0033638 A1 | 2/2010 | O'Donnell et al. |
| 2010/0035682 A1 | 2/2010 | Gentile et al. |
| 2010/0054268 A1 | 3/2010 | Divivier |
| 2010/0058404 A1 | 3/2010 | Rouse |
| 2010/0067571 A1 | 3/2010 | White et al. |
| 2010/0073371 A1 | 3/2010 | Ernst et al. |
| 2010/0077441 A1 | 3/2010 | Thomas et al. |
| 2010/0104021 A1 | 4/2010 | Schmit |
| 2010/0115573 A1 | 5/2010 | Srinivasan et al. |
| 2010/0118972 A1 | 5/2010 | Zhang et al. |
| 2010/0131411 A1 | 5/2010 | Jogand-Coulomb et al. |
| 2010/0131996 A1 | 5/2010 | Gauld |
| 2010/0146139 A1 | 6/2010 | Brockmann |
| 2010/0153885 A1 | 6/2010 | Yates |
| 2010/0158109 A1 | 6/2010 | Dahlby et al. |
| 2010/0161825 A1 | 6/2010 | Ronca et al. |
| 2010/0166071 A1 | 7/2010 | Wu et al. |
| 2010/0174776 A1 | 7/2010 | Westberg et al. |
| 2010/0175080 A1 | 7/2010 | Yuen et al. |
| 2010/0180307 A1 | 7/2010 | Hayes et al. |
| 2010/0211983 A1 | 8/2010 | Chou |
| 2010/0226428 A1 | 9/2010 | Thevathasan et al. |
| 2010/0235861 A1 | 9/2010 | Schein et al. |
| 2010/0242073 A1 | 9/2010 | Gordon et al. |
| 2010/0251167 A1 | 9/2010 | DeLuca et al. |

(56) References Cited

U.S. PATENT DOCUMENTS

| | | |
|---|---|---|
| 2010/0254370 A1 | 10/2010 | Jana et al. |
| 2010/0265344 A1 | 10/2010 | Velarde et al. |
| 2010/0325655 A1 | 12/2010 | Perez |
| 2010/0325668 A1 | 12/2010 | Young et al. |
| 2011/0002376 A1 | 1/2011 | Ahmed et al. |
| 2011/0002470 A1 | 1/2011 | Purnhagen et al. |
| 2011/0023069 A1 | 1/2011 | Dowens |
| 2011/0035227 A1 | 2/2011 | Lee et al. |
| 2011/0067061 A1 | 3/2011 | Karaoguz et al. |
| 2011/0072474 A1 | 3/2011 | Springer et al. |
| 2011/0096828 A1 | 4/2011 | Chen et al. |
| 2011/0099594 A1 | 4/2011 | Chen et al. |
| 2011/0107375 A1 | 5/2011 | Stahl et al. |
| 2011/0110433 A1 | 5/2011 | Bjontegaard |
| 2011/0110642 A1 | 5/2011 | Salomons et al. |
| 2011/0150421 A1 | 6/2011 | Sasaki et al. |
| 2011/0153776 A1 | 6/2011 | Opala et al. |
| 2011/0161517 A1 | 6/2011 | Ferguson |
| 2011/0167468 A1 | 7/2011 | Lee et al. |
| 2011/0173590 A1 | 7/2011 | Yanes |
| 2011/0191684 A1 | 8/2011 | Greenberg |
| 2011/0202948 A1 | 8/2011 | Bildgen et al. |
| 2011/0211591 A1 | 9/2011 | Traub et al. |
| 2011/0231878 A1 | 9/2011 | Hunter et al. |
| 2011/0243024 A1 | 10/2011 | Osterling et al. |
| 2011/0258584 A1 | 10/2011 | Williams et al. |
| 2011/0261889 A1 | 10/2011 | Francisco |
| 2011/0283304 A1 | 11/2011 | Roberts |
| 2011/0289536 A1 | 11/2011 | Poder et al. |
| 2011/0296312 A1 | 12/2011 | Boyer et al. |
| 2011/0317982 A1 | 12/2011 | Xu et al. |
| 2012/0008786 A1 | 1/2012 | Cronk et al. |
| 2012/0023126 A1 | 1/2012 | Jin et al. |
| 2012/0023250 A1 | 1/2012 | Chen et al. |
| 2012/0030212 A1 | 2/2012 | Koopmans et al. |
| 2012/0030706 A1 | 2/2012 | Hulse et al. |
| 2012/0137337 A1 | 5/2012 | Sigmon et al. |
| 2012/0204217 A1 | 8/2012 | Regis et al. |
| 2012/0209815 A1 | 8/2012 | Carson et al. |
| 2012/0216232 A1 | 8/2012 | Chen et al. |
| 2012/0221853 A1 | 8/2012 | Wingert et al. |
| 2012/0224641 A1 | 9/2012 | Haberman et al. |
| 2012/0257671 A1 | 10/2012 | Brockmann et al. |
| 2012/0271920 A1 | 10/2012 | Isaksson |
| 2012/0284753 A1 | 11/2012 | Roberts et al. |
| 2012/0297081 A1 | 11/2012 | Karlsson et al. |
| 2013/0003826 A1 | 1/2013 | Craig et al. |
| 2013/0042271 A1 | 2/2013 | Yellin et al. |
| 2013/0047074 A1 | 2/2013 | Vestergaard et al. |
| 2013/0071095 A1 | 3/2013 | Chauvier et al. |
| 2013/0086610 A1 | 4/2013 | Brockmann |
| 2013/0179787 A1* | 7/2013 | Brockmann ........ G06F 3/04815 715/719 |
| 2013/0198776 A1 | 8/2013 | Brockmann |
| 2013/0254308 A1 | 9/2013 | Rose et al. |
| 2013/0254675 A1 | 9/2013 | de Andrade et al. |
| 2013/0272394 A1 | 10/2013 | Brockmann et al. |
| 2013/0276015 A1 | 10/2013 | Rothschild |
| 2013/0283318 A1 | 10/2013 | Wannamaker |
| 2013/0297887 A1 | 11/2013 | Woodward et al. |
| 2013/0304818 A1 | 11/2013 | Brumleve et al. |
| 2013/0305051 A1 | 11/2013 | Fu et al. |
| 2014/0032635 A1 | 1/2014 | Pimmel et al. |
| 2014/0033036 A1 | 1/2014 | Gaur et al. |
| 2014/0081954 A1 | 3/2014 | Elizarov |
| 2014/0089469 A1 | 3/2014 | Ramamurthy et al. |
| 2014/0123169 A1 | 5/2014 | Koukarine et al. |
| 2014/0157298 A1 | 6/2014 | Murphy |
| 2014/0168515 A1 | 6/2014 | Sagliocco |
| 2014/0223307 A1 | 8/2014 | McIntosh et al. |
| 2014/0223482 A1 | 8/2014 | McIntosh et al. |
| 2014/0267074 A1 | 9/2014 | Balci |
| 2014/0269930 A1* | 9/2014 | Robinson ........... H04N 21/2365 375/240.24 |
| 2014/0289627 A1 | 9/2014 | Brockmann et al. |
| 2014/0317532 A1 | 10/2014 | Ma et al. |
| 2014/0344861 A1 | 11/2014 | Berner et al. |
| 2015/0023372 A1 | 1/2015 | Boatright |
| 2015/0037011 A1 | 2/2015 | Hubner et al. |
| 2015/0103880 A1 | 4/2015 | Diard |
| 2015/0135209 A1 | 5/2015 | LaBosco et al. |
| 2015/0139603 A1 | 5/2015 | Silverstein et al. |
| 2015/0195525 A1 | 7/2015 | Sullivan et al. |
| 2016/0119624 A1 | 4/2016 | Frishman |
| 2016/0142468 A1 | 5/2016 | Song |
| 2016/0357583 A1 | 12/2016 | Decker et al. |
| 2017/0078721 A1 | 3/2017 | Brockmann et al. |

FOREIGN PATENT DOCUMENTS

| | | |
|---|---|---|
| AT | 250313 T | 10/2003 |
| AT | 472152 T | 7/2010 |
| AT | 475266 T | 8/2010 |
| AU | 550086 B2 | 2/1986 |
| AU | 199060189 | 11/1990 |
| AU | 620735 B2 | 2/1992 |
| AU | 199184838 | 4/1992 |
| AU | 643828 B2 | 11/1993 |
| AU | 2004253127 A1 | 1/2005 |
| AU | 2005278122 A1 | 3/2006 |
| AU | 2010339376 A1 | 8/2012 |
| AU | 2011249132 A1 | 11/2012 |
| AU | 2011258972 A1 | 11/2012 |
| AU | 2011315950 A1 | 5/2013 |
| CA | 682776 A | 3/1964 |
| CA | 2052477 | 3/1992 |
| CA | 1302554 | 6/1992 |
| CA | 2163500 | 5/1996 |
| CA | 2231391 A1 | 5/1997 |
| CA | 2273365 A1 | 6/1998 |
| CA | 2313133 A1 | 6/1999 |
| CA | 2313161 A1 | 6/1999 |
| CA | 2528499 A1 | 1/2005 |
| CA | 2569407 A1 | 3/2006 |
| CA | 2728797 A1 | 4/2010 |
| CA | 2787913 A1 | 7/2011 |
| CA | 2798541 A1 | 12/2011 |
| CA | 2814070 A1 | 4/2012 |
| CN | 1507751 A | 6/2004 |
| CN | 1969555 A | 5/2007 |
| CN | 101180109 A | 5/2008 |
| CN | 101627424 A | 1/2010 |
| CN | 101637023 A | 1/2010 |
| CN | 102007773 A | 4/2011 |
| CN | 103647980 A | 3/2014 |
| DE | 4408355 A1 | 10/1994 |
| DE | 69516139 | 12/2000 |
| DE | 69132518 | 9/2001 |
| DE | 69333207 | 7/2004 |
| DE | 98961961 T1 | 8/2007 |
| DE | 602008001596 | 8/2010 |
| DE | 602006015650 | 9/2010 |
| EP | 0093549 A2 | 11/1983 |
| EP | 0128771 A2 | 12/1984 |
| EP | 0419137 A2 | 3/1991 |
| EP | 0449633 A1 | 10/1991 |
| EP | 0477786 A2 | 4/1992 |
| EP | 0523618 A2 | 1/1993 |
| EP | 0534139 A2 | 3/1993 |
| EP | 0568453 A1 | 11/1993 |
| EP | 0588653 A2 | 3/1994 |
| EP | 0594350 A1 | 4/1994 |
| EP | 0612916 A2 | 8/1994 |
| EP | 0624039 A2 | 11/1994 |
| EP | 0638219 A1 | 2/1995 |
| EP | 0643523 A1 | 3/1995 |
| EP | 0661888 A2 | 7/1995 |
| EP | 0714684 A1 | 6/1996 |
| EP | 0746158 A2 | 12/1996 |
| EP | 0761066 A1 | 3/1997 |
| EP | 0789972 A1 | 8/1997 |
| EP | 0830786 A1 | 3/1998 |
| EP | 0861560 A1 | 9/1998 |
| EP | 0 881 808 A2 | 12/1998 |

(56) References Cited

FOREIGN PATENT DOCUMENTS

| | | |
|---|---|---|
| EP | 0933966 | 8/1999 |
| EP | 0933966 A1 | 8/1999 |
| EP | 1026872 A1 | 8/2000 |
| EP | 1038397 A1 | 9/2000 |
| EP | 1038399 A1 | 9/2000 |
| EP | 1038400 A1 | 9/2000 |
| EP | 1038401 A1 | 9/2000 |
| EP | 1051039 A2 | 11/2000 |
| EP | 1055331 A1 | 11/2000 |
| EP | 1120968 A1 | 8/2001 |
| EP | 1345446 A1 | 9/2003 |
| EP | 1422929 A2 | 5/2004 |
| EP | 1428562 A2 | 6/2004 |
| EP | 1521476 A1 | 4/2005 |
| EP | 1645115 A1 | 4/2006 |
| EP | 1725044 A2 | 11/2006 |
| EP | 1767708 A2 | 3/2007 |
| EP | 1771003 A1 | 4/2007 |
| EP | 1772014 A1 | 4/2007 |
| EP | 1877150 A1 | 1/2008 |
| EP | 1887148 A2 | 2/2008 |
| EP | 1900200 A1 | 3/2008 |
| EP | 1902583 A1 | 3/2008 |
| EP | 1908293 A1 | 4/2008 |
| EP | 1911288 A2 | 4/2008 |
| EP | 1918802 A1 | 5/2008 |
| EP | 2100296 A1 | 9/2009 |
| EP | 2105019 A2 | 9/2009 |
| EP | 2106665 A2 | 10/2009 |
| EP | 2116051 A2 | 11/2009 |
| EP | 2124440 A1 | 11/2009 |
| EP | 2248341 A1 | 11/2010 |
| EP | 2269377 A2 | 1/2011 |
| EP | 2271098 A1 | 1/2011 |
| EP | 2304953 A2 | 4/2011 |
| EP | 2357555 A1 | 8/2011 |
| EP | 2364019 A2 | 9/2011 |
| EP | 2384001 A1 | 11/2011 |
| EP | 2409493 A2 | 1/2012 |
| EP | 2477414 A2 | 7/2012 |
| EP | 2487919 A2 | 8/2012 |
| EP | 2520090 A2 | 11/2012 |
| EP | 2567545 A1 | 3/2013 |
| EP | 2577437 A1 | 4/2013 |
| EP | 2628306 A2 | 8/2013 |
| EP | 2632164 A2 | 8/2013 |
| EP | 2632165 A2 | 8/2013 |
| EP | 2695388 A2 | 2/2014 |
| ES | 2207635 T3 | 6/2004 |
| FR | 8211463 A | 6/1982 |
| FR | 2529739 | 1/1984 |
| FR | 2891098 | 3/2007 |
| GB | 2207838 A | 2/1989 |
| GB | 2248955 A | 4/1992 |
| GB | 2290204 A | 12/1995 |
| GB | 2365649 A | 2/2002 |
| GB | 2378345 | 2/2003 |
| GB | 2479164 A | 10/2011 |
| HK | 1134855 A1 | 10/2010 |
| HK | 1116323 A1 | 12/2010 |
| IE | 19913397 A1 | 4/1992 |
| IL | 99586 A | 2/1998 |
| IL | 215133 | 12/2011 |
| IL | 222829 | 12/2012 |
| IL | 222830 | 12/2012 |
| IL | 225525 | 6/2013 |
| IN | 180215 B | 1/1998 |
| IN | 200701744 P3 | 11/2007 |
| IN | 200900856 P3 | 5/2009 |
| IN | 200800214 P3 | 6/2009 |
| IS | 3759 A7 | 3/1992 |
| JP | 60-054324 A | 3/1985 |
| JP | 63-033988 | 2/1988 |
| JP | 63-263985 A | 10/1988 |
| JP | 2001-241993 A | 9/1989 |
| JP | 04-373286 A | 12/1992 |
| JP | 06-054324 | 2/1994 |
| JP | 7015720 | 1/1995 |
| JP | 7-160292 A | 6/1995 |
| JP | 7160292 A | 6/1995 |
| JP | 8095599 A | 4/1996 |
| JP | 8-265704 A | 10/1996 |
| JP | 8265704 A | 10/1996 |
| JP | 10-228437 A | 8/1998 |
| JP | 10-510131 | 9/1998 |
| JP | 11-134273 A | 5/1999 |
| JP | H11-261966 | 9/1999 |
| JP | 2000-152234 | 5/2000 |
| JP | 2001-145112 A | 5/2001 |
| JP | 2001-203995 A | 7/2001 |
| JP | 2001-245271 | 9/2001 |
| JP | 2001-245291 | 9/2001 |
| JP | 2001-514471 | 9/2001 |
| JP | 2002-016920 | 1/2002 |
| JP | 2002-057952 A | 2/2002 |
| JP | 2002-112220 A | 4/2002 |
| JP | 2002-141810 A | 5/2002 |
| JP | 2002-208027 | 7/2002 |
| JP | 2002-300556 A | 10/2002 |
| JP | 2002-319991 | 10/2002 |
| JP | 2003-506763 A | 2/2003 |
| JP | 2003-087673 | 3/2003 |
| JP | 2003-087785 | 3/2003 |
| JP | 2003-529234 | 9/2003 |
| JP | 2004-501445 A | 1/2004 |
| JP | 2004-056777 A | 2/2004 |
| JP | 2004-110850 | 4/2004 |
| JP | 2004-112441 | 4/2004 |
| JP | 2004-135932 A | 5/2004 |
| JP | 2004-264812 A | 9/2004 |
| JP | 2004-312283 | 11/2004 |
| JP | 2004-533736 A | 11/2004 |
| JP | 2004-536381 A | 12/2004 |
| JP | 2004-536681 | 12/2004 |
| JP | 2005-033741 | 2/2005 |
| JP | 2005-084987 A | 3/2005 |
| JP | 2005-095599 | 3/2005 |
| JP | 8-095599 A | 4/2005 |
| JP | 2005-123981 A | 5/2005 |
| JP | 2005-156996 | 6/2005 |
| JP | 2005-519382 | 6/2005 |
| JP | 2005-523479 A | 8/2005 |
| JP | 2005-260289 | 9/2005 |
| JP | 2005-309752 | 11/2005 |
| JP | 2006-067280 | 3/2006 |
| JP | 2006-512838 | 4/2006 |
| JP | 2006-246358 A | 9/2006 |
| JP | 2007-129296 | 5/2007 |
| JP | 2007-522727 | 8/2007 |
| JP | 11-88419 | 9/2007 |
| JP | 2007-264440 A | 10/2007 |
| JP | 2008-523880 | 7/2008 |
| JP | 2008-535622 A | 9/2008 |
| JP | 04252727 B2 | 4/2009 |
| JP | 2009-159188 A | 7/2009 |
| JP | 2009-543386 A | 12/2009 |
| JP | 2011-108155 A | 6/2011 |
| JP | 2012-080593 A | 4/2012 |
| JP | 04996603 B2 | 8/2012 |
| JP | 05121711 B2 | 1/2013 |
| JP | 53-004612 A | 10/2013 |
| JP | 05331008 B2 | 10/2013 |
| JP | 05405819 B2 | 2/2014 |
| KR | 10-2005-0001362 | 1/2005 |
| KR | 10-2005-0085827 | 8/2005 |
| KR | 2006067924 A | 6/2006 |
| KR | 10-2006-0095821 | 9/2006 |
| KR | 2007038111 A | 4/2007 |
| KR | 20080001298 A | 1/2008 |
| KR | 2008024189 A | 3/2008 |
| KR | 2010111739 A | 10/2010 |
| KR | 2010120187 A | 11/2010 |
| KR | 2010127240 A | 12/2010 |
| KR | 2011030640 A | 3/2011 |

(56) References Cited

FOREIGN PATENT DOCUMENTS

| | | |
|---|---|---|
| KR | 2011129477 A | 12/2011 |
| KR | 20120112683 A | 10/2012 |
| KR | 2013061149 A | 6/2013 |
| KR | 2013113925 A | 10/2013 |
| KR | 1333200 B1 | 11/2013 |
| KR | 2008045154 A | 11/2013 |
| KR | 2013138263 A | 12/2013 |
| NL | 1032594 C2 | 4/2008 |
| NL | 1033929 C1 | 4/2008 |
| NL | 2004670 A | 11/2011 |
| NL | 2004780 A | 1/2012 |
| NZ | 239969 A | 12/1994 |
| PT | 99110 A | 12/1993 |
| WO | WO 1982002303 A1 | 7/1982 |
| WO | WO 1989008967 A1 | 9/1989 |
| WO | WO 90/13972 A1 | 11/1990 |
| WO | WO 93/22877 A2 | 11/1993 |
| WO | WO 1994016534 A2 | 7/1994 |
| WO | WO 1994019910 A1 | 9/1994 |
| WO | WO 1994021079 A1 | 9/1994 |
| WO | WO 95/15658 A1 | 6/1995 |
| WO | WO 1995032587 A1 | 11/1995 |
| WO | WO 1995033342 A1 | 12/1995 |
| WO | WO 1996014712 A1 | 5/1996 |
| WO | WO 1996027843 A1 | 9/1996 |
| WO | WO 1996031826 A1 | 10/1996 |
| WO | WO 1996037074 A2 | 11/1996 |
| WO | WO 1996042168 A1 | 12/1996 |
| WO | WO 1997016925 A1 | 5/1997 |
| WO | WO 1997033434 A1 | 9/1997 |
| WO | WO 1997039583 A1 | 10/1997 |
| WO | WO 1998026595 A1 | 6/1998 |
| WO | WO 99/00735 A1 | 1/1999 |
| WO | WO 99/04568 | 1/1999 |
| WO | WO 1999000735 A1 | 1/1999 |
| WO | WO 1999030496 A1 | 6/1999 |
| WO | WO 1999030497 A1 | 6/1999 |
| WO | WO 1999030500 A1 | 6/1999 |
| WO | WO 1999030501 A1 | 6/1999 |
| WO | WO 1999035840 A1 | 7/1999 |
| WO | WO 1999041911 A1 | 8/1999 |
| WO | WO 1999056468 A1 | 11/1999 |
| WO | WO 99/65232 A1 | 12/1999 |
| WO | WO 99/65243 A1 | 12/1999 |
| WO | WO 1999066732 A1 | 12/1999 |
| WO | WO 2000002303 A1 | 1/2000 |
| WO | WO 00/07372 A1 | 2/2000 |
| WO | WO 00/08967 A1 | 2/2000 |
| WO | WO 00/19910 A1 | 4/2000 |
| WO | WO 00/38430 A1 | 6/2000 |
| WO | WO 00/41397 A1 | 7/2000 |
| WO | WO 01/39494 A1 | 5/2001 |
| WO | WO 01/41447 A1 | 6/2001 |
| WO | WO01/56293 A1 | 8/2001 |
| WO | WO 01/82614 A1 | 11/2001 |
| WO | WO 01/92973 | 12/2001 |
| WO | WO 02/089487 A2 | 7/2002 |
| WO | WO 02/076097 A1 | 9/2002 |
| WO | WO 02/076099 A1 | 9/2002 |
| WO | WO 03/026232 A1 | 3/2003 |
| WO | WO 03/026275 A2 | 3/2003 |
| WO | WO 03/047710 A2 | 6/2003 |
| WO | WO 03/065683 A1 | 8/2003 |
| WO | WO 03/071727 A2 | 8/2003 |
| WO | WO 03/091832 A2 | 11/2003 |
| WO | WO 2004/012437 A2 | 2/2004 |
| WO | WO 2004/018060 A2 | 3/2004 |
| WO | WO2004/057609 A1 | 7/2004 |
| WO | WO 2004/073310 A1 | 8/2004 |
| WO | WO 2005/002215 A1 | 1/2005 |
| WO | WO 2005/041122 A2 | 5/2005 |
| WO | WO 2005/053301 A2 | 6/2005 |
| WO | WO2005/076575 | 8/2005 |
| WO | WO 05/120067 A2 | 12/2005 |
| WO | WO 2006/014362 A1 | 2/2006 |
| WO | WO 2006/022881 A1 | 3/2006 |
| WO | WO 2006/053305 | 5/2006 |
| WO | WO 2006/067697 A2 | 6/2006 |
| WO | WO 2006/081634 A2 | 8/2006 |
| WO | WO 2006/105480 | 10/2006 |
| WO | WO 2006/110268 A1 | 10/2006 |
| WO | WO 2007/001797 A1 | 1/2007 |
| WO | WO 2007/008319 A1 | 1/2007 |
| WO | WO 2007/008355 A2 | 1/2007 |
| WO | WO 2007/008356 A1 | 1/2007 |
| WO | WO 2007/008357 A1 | 1/2007 |
| WO | WO 2007/008358 A1 | 1/2007 |
| WO | WO 2007/018722 A2 | 2/2007 |
| WO | WO 2007/018726 A2 | 2/2007 |
| WO | WO2008/044916 A1 | 4/2008 |
| WO | WO 2008/044916 A1 | 4/2008 |
| WO | WO 2008/086170 A1 | 7/2008 |
| WO | WO 2008/088741 A2 | 7/2008 |
| WO | WO 2008/088752 A2 | 7/2008 |
| WO | WO 2008/088772 A2 | 7/2008 |
| WO | WO 2008/100205 A1 | 8/2008 |
| WO | WO2009/038596 | 3/2009 |
| WO | WO 2009/038596 A1 | 3/2009 |
| WO | WO 2009/099893 A1 | 8/2009 |
| WO | WO 2009/099895 A1 | 8/2009 |
| WO | WO 2009/105465 A2 | 8/2009 |
| WO | WO 2009/110897 A1 | 9/2009 |
| WO | WO 2009/114247 A2 | 9/2009 |
| WO | WO 2009/155214 A2 | 12/2009 |
| WO | WO 2010/044926 A3 | 4/2010 |
| WO | WO 2010/054136 A2 | 5/2010 |
| WO | WO 2010/107954 A2 | 9/2010 |
| WO | WO 2011/014336 A1 | 9/2010 |
| WO | WO 2011/082364 A2 | 7/2011 |
| WO | WO 2011/139155 A1 | 11/2011 |
| WO | WO 2011/149357 A1 | 12/2011 |
| WO | WO 2012/051528 A2 | 4/2012 |
| WO | WO 2012/138660 A2 | 10/2012 |
| WO | WO 2013/106390 A1 | 7/2013 |
| WO | WO 2013/155310 A1 | 7/2013 |
| WO | WO2013/184604 A1 | 12/2013 |

OTHER PUBLICATIONS

ActiveVideo Networks Inc., International Preliminary Report on Patentability, PCT/US2013/020769, dated Jul. 24, 2014, 6 pgs.
ActiveVideo Networks Inc., International Search Report and Written Opinion, PCT/US2014/030773, dated Jul. 25, 2014, 8 pgs.
ActiveVideo Networks Inc., International Search Report and Written Opinion, PCT/US2014/041416, dated Aug. 27, 2014, 8 pgs.
ActiveVideo Networks Inc., Extended EP Search Rpt, Application No. 13168509.1, 10 pgs.
ActiveVideo Networks Inc., Extended EP Search Rpt, Application No. 13168376-5, 8 pgs.
ActiveVideo Networks Inc., Extended EP Search Rpt, Application No. 12767642-7, 12 pgs.
ActiveVideo Networks Inc., Communication Pursuant to Rules 70(2) and 70a(2), EP10841764.3, dated Jun. 6, 2014, 1 pg.
ActiveVideo Networks Inc., Communication Pursuant to Rules 70(2) and 70a(2), EP11833486.1, dated Apr. 24, 2014, 1 pg.
ActiveVideo Networks Inc., Communication Pursuant to Article 94(3) EPC, EP08713106.6-1908, dated Jun. 26, 2014, 5 pgs.
ActiveVideo Networks Inc., Communication Pursuant to Article 94(3) EPC, EP08713106.6-2223, dated May 10, 2011, 7 pgs.
ActiveVideo Networks Inc., Communication Pursuant to Article 94(3) EPC, EP09713486.0, dated Apr. 14, 2014, 6 pgS.
ActiveVideo Networks Inc., Examination Report No. 1, AU2011258972, dated Apr. 4, 2013, 5 pgs.
ActiveVideo Networks Inc., Examination Report No. 1, AU2010339376, dated Apr. 30, 2014, 4 pgs.
ActiveVideo Networks Inc., Examination Report, App. No. EP11749946.7, dated Oct. 8, 2013, 6 pgs.
ActiveVideo Networks Inc., Summons to attend oral-proceeding, Application No. EP09820936-4, Aug. 19, 2014, 4 pgs.
ActiveVideo Networks Inc., International Searching Authority, International Search Report—International application No. PCT/US2010/

(56) References Cited

OTHER PUBLICATIONS 027724, dated Oct. 28, 2010, together with the Written Opinion of the International Searching Authority, 7 pages.

ActiveVideo Networks, Inc., International Search Report and Written Opinion, PCT/US2014/041430, dated Oct. 9, 2014, 9 pgs.

Active Video Networks, Inc., Notice of Reasons for Rejection, JP2012-547318, dated Sep. 26, 2014, 7 pgs.

Adams, Jerry, NTZ Nachrichtechnische Zeitschrift. vol. 40, No. 7, Jul. 1987, Berlin DE pp. 534-536; Jerry Adams: 'Glasfasernetz für Breitbanddienste in London', 5 pgs. No English Translation Found.

Avinity Systems B.V., Communication pursuant to Article 94(3) EPC, EP 07834561.8, dated Jan. 31, 2014, 10 pgs.

Avinity Systems B.V., Communication pursuant to Article 94(3) EPC, EP 07834561.8, dated Apr. 8, 2010, 5 pgs.

Avinity Systems B.V., International Preliminary Report on Patentability, PCT/NL2007/000245, dated Mar. 31, 2009, 12 pgs.

Avinity Systems B.V., International Search Report and Written Opinion, PCT/NL2007/000245, dated Feb. 19, 2009, 18 pgs.

Avinity Systems B.V., Notice of Grounds of Rejection for Patent, JP 2009-530298, dated Sep. 3, 2013, 4 pgs.

Avinity Systems B.V., Notice of Grounds of Rejection for Patent, JP 2009-530298, dated Sep. 25, 2012, 6 pgs.

Avinity Systems B. V., Final Office Action, JP-2009-530298, dated Oct. 7, 2014, 8 pgs.

Bird et al., "Customer Access to Broadband Services," ISSLS 86—The International Symposium on Subrscriber Loops and Services Sep. 29, 1986, Tokyo,JP 6 pgs.

Brockmann, Final Office Action, U.S. Appl. No. 12/443,571, dated Mar. 7, 2014, 21 pgs.

Brockmann, Final Office Action, U.S. Appl. No. 13/668,004, dated Jul. 16, 2014, 20 pgs.

Brockmann, Final Office Action, U.S. Appl. No. 13/686,548, dated Sep. 24, 2014, 13 pgs.

Brockmann, Final Office Action, U.S. Appl. No. 13/438,617, dated Oct. 3, 2014, 19 pgs.

Brockmann, Office Action, U.S. Appl. No. 13/686,548, dated Mar. 10, 2014, 11 pgs.

Brockmann, Office Action, U.S. Appl. No. 13/668,004, dated Dec. 23, 2013, 9 pgs.

Brockmann, Office Action, U.S. Appl. No. 13/438,617, dated May 12, 2014, 17 pgs.

Brockmann, Office Action, U.S. Appl. No. 12/443,571, dated Jun. 5, 2013, 18 pgs.

Brockmann, Office Action, U.S. Appl. No. 12/443,571, dated Nov. 5, 2014, 26 pgs.

Chang, Shih-Fu, et al., "Manipulation and Compositing of MC-DOT Compressed Video," IEEE Journal on Selected Areas of Communications, Jan. 1995, vol. 13, No. 1, 11 pgs.

Dahlby, Office Action, U.S. Appl. No. 12/651,203, dated Jun. 5, 2014, 18 pgs.

Dahlby, Final Office Action, U.S. Appl. No. 12/651,203, dated Feb. 4, 2013, 18 pgs.

Dahlby, Office Action, U.S. Appl. No. 12/651,203, dated Aug. 16, 2012, 18 pgs.

Dukes, Stephen D., "Photonics for cable television system design, Migrating to regional hubs and passive networks," Communications Engineering and Design, May 1992, 4 pgs.

Ellis, et al., "INDAX: An Operation Interactive Cabletext System", IEEE Journal on Selected Areas in Communications, vol. sac-1, No. 2, Feb. 1983, pp. 285-294.

European Patent Office, Supplementary European Search Report, Application No. EP 09 70 8211, dated Jan. 5, 2011, 6 pgs.

Frezza, W., "The Broadband Solution—Metropolitan CATV Networks," Proceedings of Videotex '84, Apr. 1984, 15 pgs.

Gecsei, J., "Topology of Videotex Networks," The Architecture of Videotex Systems, Chapter 6, 1983 by Prentice-Hall, Inc.

Gobl, et al., "ARIDEM—a multi-service broadband access demonstrator," Ericsson Review No. 3, 1996, 7 pgs.

Gordon, Notice of Allowance, U.S. Appl. No. 12/008,697, dated Mar. 20, 2014, 10 pgs.

Gordon, Final Office Action, U.S. Appl. No. 12/008,722, dated Mar. 30, 2012, 16 pgs.

Gordon, Final Office Action, U.S. Appl. No. 12/035,236, dated Jun. 11, 2014, 14 pgs.

Gordon, Final Office Action, U.S. Appl. No. 12/035,236, dated Jul. 22, 2013, 7 pgs.

Gordon, Final Office Action, U.S. Appl. No. 12/035,236, dated Sep. 20, 2011, 8 pgs.

Gordon, Final Office Action, U.S. Appl. No. 12/035,236, dated Sep. 21, 2012, 9 pgs.

Gordon, Final Office Action, U.S. Appl. No. 12/008,697, dated Mar. 6, 2012, 48 pgs.

Gordon, Office Action, U.S. Appl. No. 12/035,236, dated Mar. 13, 2013, 9 pgs.

Gordon, Office Action, U.S. Appl. No. 12/035,236, dated Mar. 22, 2011, 8 pgs.

Gordon, Office Action, U.S. Appl. No. 12/035,236, dated Mar. 28, 2012, 8 pgs.

Gordon, Office Action, U.S. Appl. No. 12/035,236, dated Dec. 16, 2013, 11 pgs.

Gordon, Office Action, U.S. Appl. No. 12/008,697, dated Aug. 1, 2013, 43 pgs.

Gordon, Office Action, U.S. Appl. No. 12/008,697, dated Aug. 4, 2011, 39 pgs.

Gordon, Office Action, U.S. Appl. No. 12/008,722, dated Oct. 11, 2011, 16 pgs.

Handley et al, "TCP Congestion Window Validation," RFC 2861, Jun. 2000, Network Working Group, 22 pgs.

Henry et al. "Multidimensional Icons" ACM Transactions on Graphics, vol. 9, No. 1 Jan. 1990, 5 pgs.

Insight advertisement, "In two years this is going to be the most watched program on TV" On touch VCR programming, published not later than 2000, 10 pgs.

Isensee et al., "Focus Highlight for World Wide Web Frames," Nov. 1, 1997, IBM Technical Disclosure Bulletin, vol. 40, No. 11, pp. 89-90.

ICTV, Inc., International Search Report / Written Opinion, PCT/US2008/000400, dated Jul. 14, 2009, 10 pgs.

ICTV, Inc., International Search Report / Written Opinion, PCT/US2008/000450, dated Jan. 26, 2009, 9 pgs.

Kato, Y., et al., "A Coding Control algorithm for Motion Picture Coding Accomplishing Optimal Assignment of Coding Distortion to Time and Space Domains," Electronics and Communications in Japan, Part 1, vol. 72, No. 9, 1989, 11 pgs.

Koenen, Rob,"MPEG-4 Overview—Overview of the MPEG-4 Standard" Internet Citation, Mar. 2001 (Mar. 2001), http://mpeg.telecomitalialab.com/standards/mpeg-4/mpeg-4.htm, May 9, 2002, 74 pgs.

Konaka, M. et al., "Development of Sleeper Cabin Cold Storage Type Cooling System," SAE International, The Engineering Society for Advancing Mobility Land Sea Air and Space, SAE 2000 World Congress, Detroit, Michigan, Mar. 6-9, 2000, 7 pgs.

Le Gall, Didier, "MPEG: A Video Compression Standard for Multimedia Applications", Communication of the ACM, vol. 34, No. 4, Apr. 1991, New York, NY, 13 pgs.

Langenberg, E, et al., "Integrating Entertainment and Voice on the Cable Network," SCTE , Conference on Emerging Technologies, Jan. 6-7, 1993, New Orleans, Louisiana, 9 pgs.

Large, D., "Tapped Fiber vs. Fiber-Reinforced Coaxial CATV Systems", IEEE LCS Magazine, Feb. 1990, 7 pgs.

Mesiya, M.F, "A Passive Optical/Coax Hybrid Network Architecture for Delivery of CATV, Telephony and Data Services," 1993 NCTA Technical Papers, 7 pgs.

"MSDL Specification Version 1.1" International Organisation for Standardisation Organisation Internationale EE Normalisation, ISO/IEC JTC1/SC29/WG11 Coding of Moving Pictures and Autdio, N1246, MPEG96/Mar. 1996, 101 pgs.

Noguchi, Yoshihiro, et al., "MPEG Video Compositing in the Compressed Domain," IEEE International Symposium on Circuits and Systems, vol. 2, May 1, 1996, 4 pgs.

Regis, Notice of Allowance U.S. Appl. No. 13/273,803, dated Sep. 2, 2014, 8 pgs.

(56) References Cited

OTHER PUBLICATIONS

Regis, Notice of Allowance U.S. Appl. No. 13/273,803, dated May 14, 2014, 8 pgs.
Regis, Final Office Action U.S. Appl. No. 13/273,803, dated Oct. 11, 2013, 23 pgs.
Regis, Office Action U.S. Appl. No. 13/273,803, dated Mar. 27, 2013, 32 pgs.
Richardson, Ian E.G., "H.264 and MPEG-4 Video Compression, Video Coding for Next-Genertion Multimedia," Johm Wiley & Sons, US, 2003, ISBN: 0-470-84837-5, pp. 103-105, 149-152, and 164.
Rose, K., "Design of a Switched Broad-Band Communications Network for Interactive Services," IEEE Transactions on Communications, vol. com-23, No. 1, Jan. 1975, 7 pgs.
Saadawi, Tarek N., "Distributed Switching for Data Transmission over Two-Way CATV", IEEE Journal on Selected Areas in Communications, vol. Sac-3, No. 2, Mar. 1985, 7 pgs.
Schrock, "Proposal for a Hub Controlled Cable Television System Using Optical Fiber," IEEE Transactions on Cable Television, vol. CATV-4, No. 2, Apr. 1979, 8 pgs.
Sigmon, Notice of Allowance, U.S. Appl. No. 13/311,203, dated Sep. 22, 2014, 5 pgs.
Sigmon, Notice of Allowance, U.S. Appl. No. 13/311,203, dated Feb. 27, 2014, 14 pgs.
Sigmon, Final Office Action, U.S. Appl. No. 13/311,203, dated Sep. 13, 2013, 20 pgs.
Sigmon, Office Action, U.S. Appl. No. 13/311,203, dated May 10, 2013, 21 pgs.
Smith, Brian C., et al., "Algorithms for Manipulating Compressed Images," IEEE Computer Graphics and Applications, vol. 13, No. 5, Sep. 1, 1993, 9 pgs.
Smith, J. et al., "Transcoding Internet Content for Heterogeneous Client Devices" Circuits and Systems, 1998. ISCAS '98. Proceedings of the 1998 IEEE International Symposium on Monterey, CA, USA May 31-Jun. 3, 1998, New York, NY, USA,IEEE, US, May 31, 1998 (May 31, 1998), 4 pgs.
Stoll, G. et al., "GMF4iTV: Neue Wege zur-Interaktivitaet Mit Bewegten Objekten Beim Digitalen Fernsehen," Fkt Fernseh Und Kinotechnik, Fachverlag Schiele & Schon GmbH, Berlin, DE, vol. 60, No. 4, Jan. 1, 2006, ISSN: 1430-9947, 9 pgs. No English Translation Found.
Tamitani et al., "An Encoder/Decoder Chip Set for the MPEG Video Standard," 1992 IEEE International Conference on Acoustics, vol. 5, Mar. 1992, San Francisco, CA, 4 pgs.
Terry, Jack, "Alternative Technologies and Delivery Systems for Broadband ISDN Access", IEEE Communications Magazine, Aug. 1992, 7 pgs.
Thompson, Jack, "DTMF-TV, The Most Economical Approach to Interactive TV," GNOSTECH Incorporated, NCF'95 Session T-38-C, 8 pgs.
Thompson, John W. Jr., "The Awakening 3.0: PCs, TSBs, or DTMF-TV—Which Telecomputer Architecture is Right for the Next Generations's Public Network?," GNOSTECH Incorporated, 1995 The National Academy of Sciences, downloaded from the Unpredictable Certainty: White Papers, http://www.nap.edu/catalog/6062.html, pp. 546-552.
Tobagi, Fouad A., "Multiaccess Protocols in Packet Communication Systems," IEEE Transactions on Communications, vol. Com-28, No. 4, Apr. 1980, 21 pgs.
Toms, N., "An Integrated Network Using Fiber Optics (Info) for the Distribution of Video, Data, and Telephone in Rural Areas," IEEE Transactions on Communication, vol. Com-26, No. 7, Jul. 1978, 9 pgs.
Trott, A., et al."An Enhanced Cost Effective Line Shuffle Scrambling System with Secure Conditional Access Authorization," 1993 NCTA Technical Papers, 11 pgs.
Jurgen_Two-way applications for cable television systems in the '70s, IEEE Spectrum, Nov. 1971, 16 pgs.
Va Beek, P., "Delay-Constrained Rate Adaptation for Robust Video Transmission over Home Networks," Image Processing, 2005, ICIP 2005, IEEE International Conference, Sep. 2005, vol. 2, No. 11, 4 pgs.
Van der Star, Jack A. M., "Video on Demand Without Compression: A Review of the Business Model, Regulations and Future Implication," Proceedings of PTC'93, 15th Annual Conference, 12 pgs.
Welzenbach et al., "The Application of Optical Systems for Cable TV," AEG-Telefunken, Backnang, Federal Republic of Germany, ISSLS Sep. 15-19, 1980, Proceedings IEEE Cat. No. 80 CH1565-1, 7 pgs.
Yum, TS P., "Hierarchical Distribution of Video with Dynamic Port Allocation," IEEE Transactions on Communications, vol. 39, No. 8, Aug. 1, 1991, XP000264287, 7 pgs.
ActiveVideo Networks, Inc., Certificate of Grant, EP08713106.6-1908, dated Aug. 5, 2015, 2 pgs.
ActiveVideo Networks, Inc., Certificate of Grant, AU2011258972, dated Nov. 19, 2015, 2 pgs.
ActiveVideo Networks, Inc., Certificate of Grant, AU2011315950, dated Dec. 17, 2015, 2 pgs.
ActiveVideo Networks, Inc., Certificate of Grant, AU2011249132, dated Jan. 7, 2016, 2 pgs.
ActiveVideo Networks, Inc., Certificate of Grant , EP13168509.11908, dated Sep. 30, 2015, 2 pgs.
ActiveVideo Networks, Inc., Certificate of Patent, JP2013534034, dated Jan. 8, 2016, 4 pgs.
ActiveVideo Networks, Inc., Communication Pursuant to Rules 161(1) and 162 EPC, EP14722897.7, dated Oct. 28, 2015, 2 pgs.
ActiveVideo Networks, Inc., Communication Pursuant to Rules 161(1) and 162 EPC, EP14740004.8, dated Jan. 26, 2016, 2 pgs.
ActiveVideo Networks, Inc., Decision to Grant, EP08713106.6-1908, dated Jul. 9, 2015, 2 pgs.
ActiveVideo Networks, Inc., Decision to Grant, EP13168509.1-1908, dated Sep. 3, 2015, 2 pgs.
ActiveVideo Networks, Inc., Decision to Grant, JP2014100460, dated Jul. 24, 2015, 5 pgs.
ActiveVideo Networks, Inc., Decision to Refuse a European Patent Application, EP08705578.6, dated Nov. 26, 2015, 10 pgs.
ActiveVideo Networks Inc., Examination Report No. 2, AU2011249132, dated May 29, 2015, 4 pgs.
Activevideo Networks Inc., Examination Report No. 2, AU2011315950, dated Jun. 25, 2015, 3 pgs.
ActiveVideo Networks, Inc., Extended European Search Report, EP13735906.3, dated Nov. 11, 2015, 10 pgs.
ActiveVideo Networks, Inc., KIPO's Notice of Preliminary Rejection, KR10-2010-7019512, dated Jul. 15, 2015, 15 pgs.
ActiveVideo Networks, Inc., KIPO's 2nd-Notice of Preliminary Rejection, KR10-2010-7019512, dated Feb. 12, 2016, 5 pgs.
ActiveVideo Networks, Inc., KIPO's Notice of Preliminary Rejection, KR10-20107021116, dated Jul. 13, 2015, 19 pgs.
ActiveVideo Networks, Inc., KIPO's Notice of Preliminary Rejection, KR10-2011-7024417, dated Feb. 18, 2016, 16 pgs.
ActiveVideo Networks, Inc., International Search Report and Written Opinion, PCT-US2015028072, dated Aug. 7, 2015, 9 pgs.
ActiveVideo Networks, Inc., International Preliminary Report on Patentability, PCT-US2014030773, dated Sep. 15, 2015, 6 pgs.
ActiveVideo Networks, Inc., International Preliminary Report on Patentability, PCT/US2014041430, dated Dec. 8, 2015, 6 pgs.
ActiveVideo Networks, Inc., International Preliminary Report on Patentability, PCT-US2014041416, dated Dec. 8, 2015, 6 pgs.
ActiveVideo, International Search Report and Written Opinion, PCT/US2015/027803, dated Jun. 24, 2015, 18 pgs.
ActiveVideo, International Search Report and Written Opinion, PCT/US2015/027804, dated Jun. 25, 2015, 10 pgs.
ActiveVideo, Communication Pursuant to Article-94(3) EPC, EP12767642.7, dated Sep. 4, 2015, 4 pgs.
AcriveVideo, Communication Pursuant to Article 94(3) EPC, EP10841764.3, dated Dec. 18, 2015, 6 pgs.
ActiveVideo Networks, Inc., Communication Pursuant to Rules 70(2) abd 70a(2) EP13735906.3, dated Nov. 27, 2015, 1 pg.
ActiveVideo Networks, Inc., Office Action, JP2013534034, dated Jun. 16, 2015, 6 pgs.

(56) References Cited

OTHER PUBLICATIONS

ActiveVideo, Notice of German Patent, EP602008040474-9, dated Jan. 6, 2016, 4 pgs.
ActiveVideo Networks B.V., Office Action, IL222830, dated Jun. 28, 2015, 7 pgs.
Brockmann, Notice of Allowance, U.S. Appl. No. 14/262,674, dated Sep. 30, 2015, 7 pgs.
Brockmann, Notice of Allowance, U.S. Appl. No. 13/911,948, dated Aug. 21, 2015, 6 pgs.
Brockmann, Notice of Allowance, U.S. Appl. No. 13/911,948, dated Aug. 5, 2015, 5 pgs.
Brockmann, Final Office Action, U.S. Appl. No. 13/668,004, dated Aug. 3, 2015, 18 pgs.
Brockmann, Final Office Action, U.S. Appl. No. 13/686,548, dated Aug. 12, 2015, 13 pgs.
Brockmann, Notice of Allowance, U.S. Appl. No. 13/911,948, dated Jul. 10, 2015, 5 pgs.
Brockmann, Final Office Action, U.S. Appl. No. 12/443,571, dated Jul. 9, 2015, 28 pgs.
Brockmann, Final Office Action, U.S. Appl. No. 13/737,097, dated Aug. 14, 2015, 17 pgs.
Brockmann, Office Action, U.S. Appl. No. 14/298,796, dated Sep. 11, 2015, 11 pgs.
Brockmann, Notice of Alowance, U.S. Appl. No. 14/298,796, dated Mar. 17, 2016, 9 pgs.
Brockmann, Office Action, U.S. Appl. No. 12/443,571, dated Dec. 4, 2015, 30 pgs.
Dahlby, Final Office Action, U.S. Appl. No. 12/651,203, dated Dec. 11, 2015, 25 pgs.
Dahlby, Office Action U.S. Appl. No. 12/651,203, dated Jul. 2, 2015, 25 pgs.
Gecsei, J., "Adaptation in Distributed Multimedia Systems," IEEE Multimedia, IEEE Service Center, New York, NY, vol. 4, No. 2, Apr. 1, 1997, 10 pgs.
Gordon, Notice of Allowance, U.S. Appl. No. 12/008,722, dated Feb. 17, 2016, 10 pgs.
Gordon, Final Office Action, U.S. Appl. No. 12/008,722, dated Jul. 2, 2015, 20 pgs.
Jacob, Bruce, "Memory Systems: Cache, DRAM, Disk," Oct. 19, 2007, The Cache Layer, Chapter 22, p. 739.
McElhatten, Office Action, U.S. Appl. No. 14/698,633, dated Feb. 22, 2016, 14 pgs.
Ohta, K., et al., "Selective Multimedia Access Protocol for Wireless Multimedia Communication," Communications, Computers and Signal Processing, 1997, IEEE Pacific Rim Conference NCE Victoria, BC, Canada, Aug. 1997, vol. 1, 4 pgs.
Wei, S., "QoS Tradeoffs Using an Application-Oriented Transport Protocol (AOTP) for Multimedia Applications Over IP." Sep. 23-26, 1999, Proceedings of the Third International Conference on Computational Intelligence and Multimedia Applications, New Delhi, India, 5 pgs.
AC-3 digital audio compression standard, Extract, Dec. 20, 1995, 11 pgs.
ActiveVideo Networks BV, International Preliminary Report on Patentability, PCT/NL2011/050308, dated Sep. 6, 2011, 8 pgs.
ActiveVideo Networks BV, International Search Report and Written Opinion, PCT/NL2011/050308, dated Sep. 6, 2011, 8 pgs.
Activevideo Networks Inc., International Preliminary Report on Patentability, PCT/US2011/056355, dated Apr. 16, 2013, 4 pgs.
ActiveVideo Networks Inc., International Preliminary Report on Patentability, PCT/US2012/032010, dated Oct. 8, 2013, 4 pgs.
ActiveVideo Networks Inc., International Search Report and Written Opinion, PCT/US2011/056355, dated Apr. 13, 2012, 6 pgs.
ActiveVideo Networks Inc., International Search Report and Written Opinion, PCT/US2012/032010, dated Oct. 10, 2012, 6 pgs.
ActiveVideo Networks Inc., International Search Report and Written Opinion, PCT/US2013/020769, dated May 9, 2013, 9 pgs.
ActiveVideo Networks Inc., International Search Report and Written Opinion, PCT/US2013/036182, dated Jul. 29, 2013, 12 pgs.
ActiveVideo Networks, Inc., International Search Report and Written Opinion, PCT/US2009/032457, dated Jul. 22, 2009, 7 pgs.
ActiveVideo Networks Inc., Extended EP Search Rpt, Application No. 09820936-4, 11 pgs.
ActiveVideo Networks Inc., Extended EP Search Rpt, Application No. 10754084-1, 11 pgs.
ActiveVideo Networks Inc., Extended EP Search Rpt, Application No. 10841764.3, 16 pgs.
ActiveVideo Networks Inc., Extended EP Search Rpt, Application No. 11833486.1, 6 pgs.
AcitveVideo Networks Inc., Korean Intellectual Property Office, International Search Report; PCT/US2009/032457, dated Jul. 22, 2009, 7 pgs.
Annex C—Video buffering verifier, information technology—generic coding of moving pictures and associated audio information: video, Feb. 2000, 6 pgs.
Antonoff, Michael, "Interactive Television," Popular Science, Nov. 1992, 12 pages.
Avinity Systems B.V., Extended European Search Report, Application No. 12163713.6, 10 pgs.
Avinity Systems B.V., Extended European Search Report, Application No. 12163712-8, 10 pgs.
Benjelloun, A summation algorithm for MPEG-1 coded audio signals: a first step towards audio processed domain, 2000, 9 pgs.
Broadhead, Direct manipulation of MPEG compressed digital audio, Nov. 5-9, 1995, 41 pgs.
Cable Television Laboratories, Inc., "CableLabs Asset Distribution Interface Specification, Version 1.1", May 5, 2006, 33 pgs.
CD 11172-3, Coding of moving pictures and associated audio for digital storage media at up to about 1.5 MBIT, Jan. 1, 1992, 39 pgs.
Craig, Notice of Allowance, U.S. Appl. No. 11/178,176, dated Dec. 23, 2010, 8 pgs.
Craig, Notice of Allowance, U.S. Appl. No. 11/178,183, dated Jan. 12, 2012, 7 pgs.
Craig, Notice of Allowance, U.S. Appl. No. 11/178,183, dated Jul. 19, 2012, 8 pgs.
Craig, Notice of Allowance, U.S. Appl. No. 11/178,189, dated Oct. 12, 2011, 7 pgs.
Craig, Notice of Allowance, U.S. Appl. No. 11/178,176, dated Mar. 23, 2011, 8 pgs.
Craig, Notice of Allowance, U.S. Appl. No. 13/609,183, dated Aug. 26, 2013, 8 pgs.
Craig, Final Office Action, U.S. Appl. No. 11/103,838, dated Feb. 5, 2009, 30 pgs.
Craig, Final Office Action, U.S. Appl. No. 11/178,181, dated Aug. 25, 2010, 17 pgs.
Craig, Final Office Action, U.S. Appl. No. 11/103,838, dated Jul. 6, 2010, 35 pgs.
Craig, Final Office Action, U.S. Appl. No. 11/178,176, dated Oct. 1, 2010, 8 pgs.
Craig, Final Office Action, U.S. Appl. No. 11/178,183, dated Apr. 13, 2011, 16 pgs.
Craig, Final Office Action, U.S. Appl. No. 11/178,177, dated Oct. 26, 2010, 12 pgs.
Craig, Final Office Action, U.S. Appl. No. 11/178,181, dated Jun. 20, 2011, 21 pgs.
Craig, Office Action, U.S. Appl. No. 11/103,838, dated May 12, 2009, 32 pgs.
Craig, Office Action, U.S. Appl. No. 11/103,838, dated Aug. 19, 2008, 17 pgs.
Craig, Office Action, U.S. Appl. No. 11/103,838, dated Nov. 19, 2009, 34 pgs.
Craig, Office Action, U.S. Appl. No. 11/178,176, dated May 6, 2010, 7 pgs.
Craig, Office-Action U.S. Appl. No. 11/178,177, dated Mar. 29, 2011, 15 pgs.
Craig, Office Action, U.S. Appl. No. 11/178,177, dated Aug. 3, 2011, 26 pgs.
Craig, Office Action, U.S. Appl. No. 11/178,177, dated Mar. 29, 2010, 11 pgs.
Craig, Office Action, U.S. Appl. No. 11/178,181, dated Feb. 11, 2011, 19 pgs.

(56) References Cited

OTHER PUBLICATIONS

Craig, Office Action, U.S. Appl. No. 11/178,181, dated Mar. 29, 2010, 10 pgs.
Craig, Office Action, U.S. Appl. No. 11/178,182, dated Feb. 23, 2010, 15 pgs.
Craig, Office Action, U.S. Appl. No. 11/178,183, dated Dec. 6, 2010, 12 pgs.
Craig, Office Action, U.S. Appl. No. 11/178,183, dated Sep. 15, 2011, 12 pgs.
Craig, Office Action, U.S. Appl. No. 11/178,183, dated Feb. 19, 2010, 17 pgs.
Craig, Office Action, U.S. Appl. No. 11/178,183, dated Jul. 20, 2010, 13 pgs.
Craig, Office Action, U.S. Appl. No. 11/178,189, dated Nov. 9, 2010, 13 pgs.
Craig, Office Action, U.S. Appl. No. 11/178,189, dated Mar. 15, 2010, 11 pgs.
Craig, Office Action, U.S. Appl. No. 11/178,189, dated Jul. 23, 2009, 10 pgs.
Craig, Office Action, U.S. Appl. No. 11/178,189, dated May 26, 2011, 14 pgs.
Craig, Office Action, U.S. Appl. No. 13/609,183, dated May 9, 2013, 7 pgs.
Pavlovskaia, Office Action, JP 2011-516499, dated Feb. 14, 2014, 19 pgs.
Digital Audio Compression Standard(AC-3, E-AC-3), Advanced Television Systems Committee, Jun. 14, 2005, 236 pgs.
European Patent Office, Extended European Search Report for International Application No. PCT/US2010/027724, dated Jul. 24, 2012, 11 pages.
FFMPEG, http://www.ffmpeg.org, downloaded Apr. 8, 2010, 8 pgs.
FFMEG-0.4.9 Audio Layer 2 Tables Including Fixed Psycho Acoustic Model, 2001, 2 pgs.
Herr, Notice of Allowance, U.S. Appl. No. 11/620,593, dated May 23, 2012, 5 pgs.
Herr, Notice of Allowance, U.S. Appl. No. 12/534,016, dated Feb. 7, 2012, 5 pgs.
Herr, Notice of Allowance, U.S. Appl. No. 12/534,016, dated Sep. 28, 2011, 15 pgs.
Herr, Final Office Action, U.S. Appl. No. 11/620,593, dated Sep. 15, 2011, 104 pgs.
Herr, Office Action, U.S. Appl. No. 11/620,593, dated Mar. 19, 2010, 58 pgs.
Herr, Office Action, U.S. Appl. No. 11/620,593, dated Apr. 21, 2009 27 pgs.
Herr, Office Action, U.S. Appl. No. 11/620,593, dated Dec. 23, 2009, 58 pgs.
Herr, Office Action, U.S. Appl. No. 11/620,593, dated Jan. 24, 2011, 96 pgs.
Herr, Office Action, U.S. Appl. No. 11/620,593, dated Aug. 27, 2010, 41 pgs.
Herre, Thoughts on an SAOC Architecture, Oct. 2006, 9 pgs.
Hoarty, The Smart Headend—A Novel Approach to Interactive Television, Montreux Int'l TV Symposium, Jun. 9, 1995, 21 pgs.
ICTV, Inc., International Preliminary Report on Patentability, PCT/US2006/022585, dated Jan. 29, 2008, 9 pgs.
ICTV, Inc., International Search Report / Written Opinion, PCT/US2006/022585, dated Oct. 12, 2007, 15 pgs.
ICTV, Inc., International Search Report / Written Opinion, PCT/US2008/000419, dated May 15, 2009, 20 pgs.
ICTV, Inc., International Search Report / Written Opinion; PCT/US2006/022533, dated Nov. 20, 2006; 8 pgs.
Isovic, Timing constraints of MPEG-2 decoding for high quality video: misconceptions and realistic assumptions, Jul. 2-4, 2003, 10 pgs.
MPEG-2 Video elementary stream supplemental information, Dec. 1999, 12 pgs.
Ozer, Video Compositing 101. available from http://www.emedialive.com, Jun. 2, 2004, 5pgs.
Porter, Compositing Digital Images, 18 Computer Graphics (No. 3), Jul. 1984, pp. 253-259.
RSS Advisory Board, "RSS 2.0 Specification", published Oct. 15, 2007. Not Found.
SAOC use cases, draft requirements and architecture, Oct. 2006, 16 pgs.
Sigmon, Final Office Action, U.S. Appl. No. 11/258,602, dated Feb. 23, 2009, 15 pgs.
Sigmon, Office Action, U.S. Appl. No. 11/258,602, dated Sep. 2, 2008, 12 pgs.
TAG Networks, Inc., Communication pursuant to Article 94(3) EPC, European Patent Application, 06773714.8, dated May 6, 2009, 3 pgs.
TAG Networks Inc, Decision to Grant a Patent, JP 209-544985, dated Jun. 28, 2013, 1 pg.
TAG Networks Inc., IPRP, PCT/US2006/010080, Oct. 16, 2007, 6 pgs.
TAG Networks Inc., IPRP, PCT/US2006/024194, Jan. 10, 2008, 7 pgs.
TAG Networks Inc., IPRP, PCT/US2006/024195, Apr. 1, 2009, 11 pgs.
TAG Networks Inc., IPRP, PCT/US2006/024196, Jan. 10, 2008, 6 pgs.
TAG Networks Inc., International Search Report, PCT/US2008/050221, dated Jun. 12, 2008, 9 pgs.
TAG Networks Inc., Office Action, CN 200680017662.3, dated Apr. 26, 2010, 4 pgs.
TAG Networks Inc., Office Action, EP 06739032.8, dated Aug. 14, 2009, 4 pgs.
TAG Networks Inc., Office Action, EP 06773714.8, dated May 6, 2009, 3 pgs.
TAG Networks Inc., Office Action, EP 06773714.8, dated Jan. 12, 2010, 4 pgs.
TAG Networks Inc., Office Action, JP 2008-506474, dated Oct. 1, 2012, 5 pgs.
TAG Networks Inc., Office Action, JP 2008-506474, dated Aug. 8, 2011, 5 pgs.
TAG Networks Inc., Office Action, JP 2008-520254, dated Oct. 20, 2011, 2 pgs.
TAG Networks, IPRP, PCT/US2008/050221, Jul. 7, 2009, 6 pgs.
TAG Networks, International Search Report, PCT/US2010/041133, dated Oct. 19, 2010, 13 pgs.
TAG Networks, Office Action, CN 200880001325.4, dated Jun. 22, 2011, 4 pgs.
TAG Networks, Office Action, JP 2009-544985, dated Feb. 25, 2013, 3 pgs.
Talley, A general framework for continuous media transmission control, Oct. 13-16, 1997, 10 pgs.
The Toolame Project, Psych_nl.c, 1999, 1 pg.
Todd, AC-3: flexible perceptual coding for audio transmission and storage, Feb. 26-Mar. 1, 1994, 16 pgs.
Tudor, MPEG-2 Video Compression, Dec. 1995, 15 pgs.
TVHEAD, Inc., First Examination Report, IN 1744/MUMNP/2007, dated Dec. 30, 2013, 6 pgs.
TVHEAD, Inc., International Search Report, PCT/US2006/010080, dated Jun. 20, 2006, 3 pgs.
TVHEAD, Inc., International Search Report, PCT/US2006/024194, dated Dec. 15, 2006, 4 pgs.
TVHEAD, Inc., International Search Report, PCT/US2006/024195, dated Nov. 29, 2006, 9 pgs.
TVHEAD, Inc., International Search Report, PCT/US2006/024196, dated Dec. 11, 2006, 4 pgs.
TVHEAD, Inc., International Search Report, PCT/US2006/024197, dated Nov. 28, 2006, 9 pgs.
Vernon, Dolby digital: audio coding for digital television and storage applications, Aug. 1999, 18 pgs.
Wang, A beat-pattern based error concealment scheme for music delivery with burst packet loss, Aug. 22-25, 2001, 4 pgs.
Wang, A compressed domain beat detector using MP3 audio bitstream, Sep. 30-Oct. 5, 2001, 9 pgs.
Wang, A multichannel audio coding algorithm for inter-channel redundancy removal, May 12-15, 2001, 6 pgs.

(56) References Cited

OTHER PUBLICATIONS

Wang, An excitation level based psychoacoustic model for audio compression, Oct. 30-Nov. 4, 1999, 4 pgs.
Wang, Energy compaction property of the MDCT in comparison with other transforms, Sep. 22-25, 2000, 23 pgs.
Wang, Exploiting excess masking for audio compression, Sep. 2-5, 1999, 4 pgs.
Wang, schemes for re-compressing mp3 audio bitstreams,Nov. 30-Dec. 3, 2001, 5 pgs.
Wang, Selected advances in audio compression and compressed domain processing, Aug. 2001, 68 pgs.
Wang, The impact of the relationship between MDCT and DFT on audio compression, Dec. 13-15, 2000, 9 pgs.
ActiveVideo Networks, Inc., International Preliminary Report on Patentablity, PCT/US2013/036182, dated Oct. 14, 2014, 9 pgs.
ActiveVideo Networks Inc., Communication Pursuant to Rule 94(3), EP08713106-6, dated Jun. 25, 2014, 5 pgs.
ActiveVideo Networks Inc., Communication Pursuant to Rules 161(2) & 162 EPC, EP13775121.0, dated Jan. 20, 2015, 3 pgs.
ActiveVideo Networks Inc., Examination Report No. 1, AU2011258972, dated Jul. 21, 2014, 3 pgs.
ActiveVideo Networks Inc., Certificate of Patent JP5675765, dated Jan. 9, 2015, 3 pgs.
Brockmann, Notice of Allowance, U.S. Appl. No. 13/445,104, dated Dec. 24, 2014, 14 pgs.
Brockmann, Office Action, U.S. Appl. No. 13/668,004, dated Feb. 26, 2015, 17 pgs.
Brockmann, Office Action, U.S. Appl. No. 13/686,548, dated Jan. 5, 2015, 12 pgs.
Brockmann, Office Action, U.S. Appl. No. 13/911,948, dated Dec. 26, 2014, 12 pgs.
Brockmann, Office Action, U.S. Appl. No. 13/911,948, dated Jan. 29, 2015, 11 pgs.
Dahlby, Office Action, U.S. Appl. No. 12/651,203, dated Dec. 3, 2014, 19 pgs.
Gordon, Notice of Allowance, U.S. Appl. No. 12/008,697, dated Dec. 8, 2014, 10 pgs.
Gordon, Office Action, U.S. Appl. No. 12/008,722, dated Nov. 28, 2014, 18 pgs.
Regis, Notice of Allowance, U.S. Appl. No. 13/273,803, dated Nov. 18, 2014, 9 pgs.
Regis, Notice of Allowance, U.S. Appl. No. 13/273,803, dated Mar. 2, 2015, 8 pgs.
Sigmon, Notice of Allowance, U.S. Appl. No. 13/311,203, dated Dec. 19, 2014, 5 pgs.
TAG Networks Inc, Decision to Grant a Patent, JP 2008-506474, dated Oct. 4, 2013, 5 pgs.
Brockmann, Notice of Allowance, U.S. Appl. No. 13/438,617, dated May 22, 2015, 18 pgs.
Brockmann, Notice of Allowance, U.S. Appl. No. 13/445,104, dated Apr. 23, 2015, 8 pgs.
Brockmann, Office Action, U.S. Appl. No. 14/262,674, dated May 21, 2015, 7 pgs.
Gordon, Notice of Allowance, U.S. Appl. No. 12/008,697, dated Apr. 1, 2015, 10 pgs.
Sigmon, Notice of Allowance, U.S. Appl. No. 13/311,203, dated Apr. 14, 2015, 5 pgs.
Avinity-Systems-BV, PreTrial-Reexam-Report-JP2009530298, dated Apr. 24, 2015, 6 pgs.
ActiveVideo Networks Inc., Decision to refuse a European patent application (Art. 97(2) EPC, EP09820936.4, dated Feb. 20, 2015, 4 pgs.
ActiveVideo Networks Inc., Communication Pursuant to Article 94(3) EPC, 10754084.1, dated Feb. 10, 2015, 12 pgs.
ActiveVideo Networks Inc., Communication under Rule 71(3) EPC, Intention to Grant, EP08713106.6, dated Feb. 19, 2015, 12 pgs.
ActiveVideo Networks Inc., Notice of Reasons for Rejection, JP2014-100460, dated Jan. 15, 2015, 6 pgs.
ActiveVideo Networks Inc., Notice of Reasons for Rejection, JP2013-509016, dated Dec. 24, 2014, 11 pgs.
Brockmann, Office Action, U.S. Appl. No. 13/737,097, dated Mar. 16, 2015, 18 pgs.
Brockmann, Notice of Allowance, U.S. Appl. No. 14/298,796, dated Mar. 18, 2015, 11 pgs.
Craig, Decision on Appeal—Reversed—, U.S. Appl. No. 11/178,177, dated Feb. 25, 2015, 7 pgs.
Craig, Notice of Allowance, U.S. Appl. No. 11/178,177, dated Mar. 5, 2015, 7 pgs.
Craig, Notice of Allowance, U.S. Appl. No. 11/178,181, dated Feb. 13, 2015, 8 pgs.
ActiveVideo Networks, Inc., Certificate of Grant, HK10102800.4, dated Jun. 10, 2016, 3 pgs.
ActiveVideo Networks, Inc., Certificate of Patent, IL215133, dated Mar. 31, 2016, 1 pg.
ActiveVideo Networks, Inc., Communication Pursuant to Article 94(3) EPC, EP14722897.7, dated Jun. 29, 2016, 6 pgs.
ActiveVideo Networks, Inc., Communication Pursuant to Article 94(3) EPC, EP11738835.5, dated Jun. 10, 2016, 3 pgs.
ActiveVideo Networks, Inc., Partial Supplementary Extended European Search Report, EP13775121.0, dated Jun. 14, 2016, 7 pgs.
ActiveVideo Networks, Inc., International Search Report and Written Opinion, PCT/US2015/000502, dated May 6, 2016, 8 pgs.
Avinity Systems B.V., Notice of Grant—JP2009530298, dated Apr. 12, 2016, 3 pgs.
Brockmann, Office Action, U.S. Appl. No. 13/668,004, dated Mar. 25, 2016, 17 pgs.
Brockmann, Final Office Action, U.S. Appl. No. 12/443,571, dated Aug. 1, 2016, 32 pgs.
ActiveVideo Networks, Inc., Certificate of Grant, HK14101604, dated Sep. 8, 2016, 4 pgs.
ActiveVideo Networks, Inc., Communication Pursuant to Rules 161(1) and 162 EPC, EP14736535.7, dated Jan. 26, 2016, 2 pgs.
ActiveVideo Networks, Inc., Decision to Refuse an EP Patent Application, EP 10754084.1, dated Nov. 3, 2016, 4 pgs.
ActiveVideo Networks, Inc. Notice of Reasons for Rejection, JP2015-159309, dated Aug. 29, 2016. 11 pgs.
ActiveVideo Networks, Inc. Denial of Entry of Amendment, JP2013-509016, dated Aug. 30, 2016, 7 pgs.
ActiveVideo Networks, Inc. Notice of Final Rejection, JP2013-509016, dated Aug. 30, 2016, 3 pgs.
ActiveVideo, Notice of Reasons for Rejection, JP2013-509016, dated Dec. 3, 2015, 7 pgs.
ActiveVideo Networks, Inc., International Preliminary Report on Patentability, PCT-US2015028072, dated Nov. 1, 2016, 7 pgs.
ActiveVideo Networks, Inc., International Preliminary Report on Patentability, PCT-US2015/027803, dated Oct. 25, 2016, 8 pgs.
ActiveVideo Networks, Inc., International Preliminary Report on Patentability, PCT-US2015/027804, dated Oct. 25, 2016, 6 pgs.
ActiveVideo Networks, Inc., International Search Report and Written Opinion, PCT/US2016/040547, dated Sep. 19, 2016, 6 pgs.
ActiveVideo Networks, Inc., Communication Pursuant to Article 94(3), EP13735906.3, dated Jul. 18, 2016, 5 pgs.
Avinity Systems B.V., Decision to Refuse an EP Patent Application, EP07834561.8, dated Oct. 10, 2016, 17 pgs.
Brockmann, Final Office Action, U.S. Appl. No. 13/668,004, dated Nov. 2, 2016, 20 pgs.
Brockmann, Office Action, U.S. Appl. No. 13/686,548, dated Feb. 8, 2016, 13 pgs.
Brockmann, Office Action, U.S. Appl. No. 13/737,097, dated May 16, 2016, 23 pgs.
Brockmann, Final Office Action, U.S. Appl. No. 13/737,097, dated Oct. 20, 2016, 22 pgs.
Hoeben, Office Action, U.S. Appl. No. 14/757,935, dated Sep. 23, 2016, 28 pgs.
ActiveVideo Networks, Inc., Communication Pursuant to Rules 161(1) and 162 EPC, EP15785776.4, dated Dec. 8, 2016, 2 pgs.
ActiveVideo Networks, Inc., Communication Pursuant to Rules 161(1) and 162 EPC, EP15721482.6, dated Dec. 13, 2016, 2 pgs.
ActiveVideo Networks, Inc., Communication Pursuant to Rules 161(1) and 162 EPC, EP15721483.4, dated Dec. 15, 2016, 2 pgs.
ActiveVideo Networks, Inc., Communication Under Rule 71(3), Intention to Grant, EP11833486.1, dated Apr. 21, 2017, 7 pgs.

(56) References Cited

OTHER PUBLICATIONS

ActiveVideo Networks, Inc., KIPO's Notice of Preliminary Rejection, KR10-2012-7031648, dated Mar. 27, 2017, 4 pgs.
ActiveVideo Networks, Inc., International Search Report and Written Opinion, PCT/US2016/051283, dated Nov. 29, 2016, 10 pgs.
ActiveVideo, Intent to Grant, EP12767642.7, dated Jan. 2, 2017, 15 pgs.
ActiveVideo Networks, Inc., Intent to Grant, EP06772771.9, dated Jan. 12, 2017, 5 pgs.
Brockmann, Office Action, U.S. Appl. No. 13/668,004, dated Mar. 31, 2017, 21 pgs.
Brockmann, Office Action, U.S. Appl. No. 14/217,108, dated Apr. 13, 2016, 8 pgs.
Brockmann, Office Action, U.S. Appl. No. 14/696,462, dated Feb. 8, 2017, 6 pgs.
Brockmann, Office Action, U.S. Appl. No. 15/139,166, dated Feb. 28, 2017, 10 pgs.
Brockmann, Final Office Action, U.S. Appl. No. 14/217,108, dated Dec. 1, 2016, 9 pgs.
Dahlby, Advisory Action, U.S. Appl. No. 12/651,203, dated Nov. 21, 2016, 5 pgs.
Hoeben, Office Action, U.S. Appl. No. 14/757,935, dated Apr. 12, 2017, 29 pgs.
McElhatten, Final Office Action, U.S. Appl. No. 14/698,633, dated Aug. 18, 2016, 16 pgs.
McElhatten, Office Action, U.S. Appl. No. 14/698,633, dated Feb. 10, 2017, 15 pgs.
Brockmann, Office Action, U.S. Appl. No. 12/443,571, dated May 31, 2017, 36 pgs.
Brockmann, Notice of Allowance, U.S. Appl. No. 14/696,462, dated Jul. 21, 2017, 6 pgs.
Brockmann, Office Action, U.S. Appl. No. 14/217,108, dated Aug. 10, 2017, 14 pgs.
ActiveVideo Networks, Inc., Decision to grant an European Patent, EP12767642.7, dated May 11, 2017, 2 pgs.
ActiveVideo Networks, Inc., Transmission of Certificate of Grant, EP12767642-7, dated Jun. 7, 2017, 1 pg.
ActiveVideo Networks, Inc., Intention to Grant, EP06772771.9, dated Jun. 12, 2017, 5 pgs.
ActiveVideo Networks, Inc., Communication Pursuant to Article 94(3), EP14722897.7, dated Jul. 19, 2017, 7 pgs.
ActiveVideo Networks, Inc., Communication Pursuant to Article 94(3), EP14740004.8, dated Aug. 24, 2017, 7 pgs.
ActiveVideo Networks, Inc., Extended European Search Report, EP15785776.4, dated Aug. 18, 2017, 8 pgs.
ActiveVideo Networks, Inc., International Search Report and Written Opinion, PCT/US2016/064972, dated Feb. 17, 2017, 9 pgs.
ActiveVideo Networks, Inc., Decision to Grant an European Patent, EP06772771.9, dated Oct. 26, 2017, 2 pgs.
ActiveVideo Networks, Inc., Certificate of Grant, EP06772771.9, dated Nov. 22, 2017, 1 pg.
ActiveVideo Networks, Inc., Decision to grant an European Patent, EP11833486.1, dated Oct. 26, 2017, 2 pgs.
ActiveVideo Networks, Inc., Certificate of Grant, EP11833486.1, dated Nov. 22, 2017, 1 pg.
ActiveVideo Networks, Inc., Certificate of Grant, EP12767642-7, dated Jun. 7, 2017, 1 pg.
ActiveVideo Networks, Inc., Communication Pursuant to Article 94(3), EP15721482.6, dated Nov. 20, 2017, 7 pgs.
ActiveVideo Networks, Inc., Notification of German Patent, DE602012033235.2, dated Jun. 13, 2017, 3 pgs.
Brockmann, Office Action, U.S. Appl. No. 15/139,166, dated Nov. 22, 2017, 9 pgs.
ActiveVideo Networks, Inc., Communication Pursuant to Rules 161(2) and 162,EP16818840.7, dated Feb. 20, 2018, 3 pgs.
ActiveVideo Networks, Inc., Extended European Search Report, EP15873840.1, dated May 18, 2018, 9 pgs.
ActiveVideo Networks, Inc., Communication Pursuant to Rules 70(2) and 70a(2), EP15873840.1, dated Jun. 6, 2018, 1 pg.
ActiveVideo Networks, Inc., International Preliminary Report on Patentability, PCT/US2016/040547, dated Jan. 2, 2018, 5 pgs.
ActiveVideo Networks, Inc., Extended European Search Report, EP16818840.7, dated Nov. 30, 2018, 5 pgs.
ActiveVideo Networks, Inc., International Preliminary Report on Patentability, PCT/US2016/064972, dated Jun. 14, 2018, 7 pgs.
ActiveVideo Networks, Inc., International Search Report and Written Opinion, PCT/US2017/068293, dated Mar. 19, 2018, 7 pgs.
Brockmann, Office Action, U.S. Appl. No. 15/199,503, dated Feb. 7, 2018, 12 pgs.
Brockmann, Notice of Allowance, U.S. Appl. No. 15/199,503, dated Aug. 16, 2018, 13 pgs.
Brockmann, Notice of Allowance, U.S. Appl. No. 15/199,503, dated Dec. 12, 2018, 9 pgs.
Brockmann, Office Action, U.S. Appl. No. 15/261,791, dated Feb. 21, 2018, 26 pgs.
Brockmann, Final Office Action, U.S. Appl. No. 15/261,791, dated Oct. 16, 2018, 17 pgs.
Brockmann, Notice of Allowance, U.S. Appl. No. 15/139,166, dated Oct. 1, 2018, 7 pgs.
Brockmann, Office Action, U.S. Appl. No. 15/728,430, dated Jul. 27, 2018, 6 pgs.
Brockmann, Office Action, U.S. Appl. No. 15/791,198, dated Dec. 21, 2018, 18 pgs.
Hoeben, Final Office Action, U.S. Appl. No. 14/757,935, dated Feb. 28, 2018, 33 pgs.
Hoeben, Office Action, U.S. Appl. No. 14/757,935, dated Jun. 28, 2018, 37 pgs.
Hoeben, Office Action, U.S. Appl. No. 15/851,589, dated Sep. 21, 2018, 19 pgs.
Visscher, Office Action, U.S. Appl. No. 15/368,527, dated Feb. 23, 2018, 23 pgs.
Visscher, Final Office Action, U.S. Appl. No. 15/368,527, dated Sep. 11, 2018, 25 pgs.

* cited by examiner

First container format, having video bitstream, audio bitstream, synchronization information, and header information

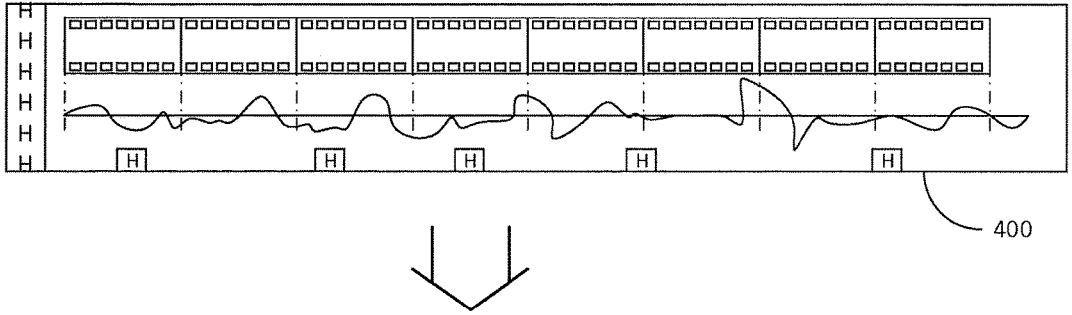

400 container is removed and A/V information is extracted including synchronization and additional information contained in headers, such as subtitles

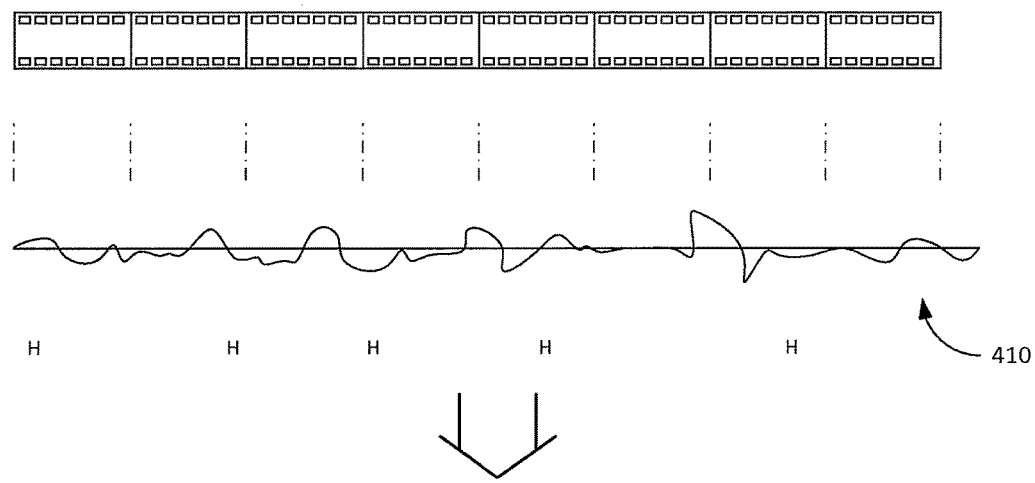

410

New container is created. Synchronization is re-done using new container's mechanism. Stream is packetized. Packets are transmitted, observing packet layer's jitter- and delay requirements

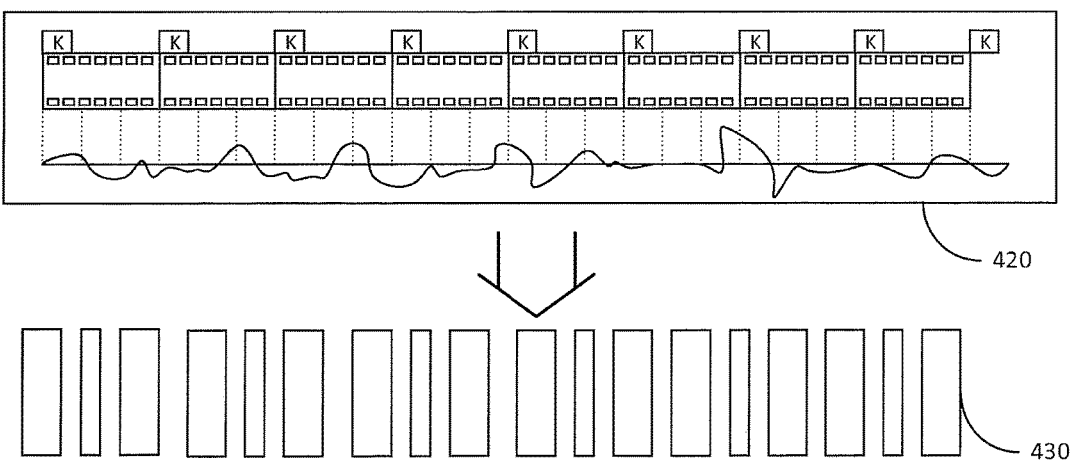

MULTIPLE-MODE SYSTEM AND METHOD FOR PROVIDING USER SELECTABLE VIDEO CONTENT

RELATED APPLICATIONS

This application claims priority to U.S. Provisional Patent Application No. 61/793,898, entitled "Multiple-Mode System for Providing User Selectable Video Content," filed Mar. 15, 2013, which is incorporated by reference herein in its entirety.

TECHNICAL FIELD

The present invention relates to providing user selectable content with a graphical user interface in a streaming multimedia system, and more particularly to a multiple mode system with automatic control logic for determining which mode to implement based upon a plurality of characteristics including capabilities of the decoding device and the selected user-selectable multimedia content.

BACKGROUND ART

It is known in the prior art to provide streaming video content to a client device and to allow a user to select the content to be streamed. In cable television systems that include legacy set-top boxes, providing a graphical user interface with full-screen streaming video content has proven to be quite challenging, since legacy set-top boxes often have disparate operating capabilities. Most legacy set-top boxes are capable of decoding MPEG-2 streams. These legacy systems have little capability with respect to providing graphic overlays and for receiving graphical user interface (GUI) data in a separate stream from the streaming video content. Thus, these legacy systems generally either provide no graphical user-interface during full screen playback or provide some rudimentary overlays that are generated by the cable-television set-top box. As technology progresses, cable television systems have become more diverse with multiple generations and even different brands of set-top boxes with widely varying capabilities. Hence, there is a need for an adaptive system that can provide advanced graphical user interface elements to all users while dynamically using the resources within the cable television network to provide a consistent user experience.

SUMMARY OF THE EMBODIMENTS

In accordance with a first embodiment of the invention, a method provides an audiovisual experience to an individual having a client device that is capable of decoding audiovisual data using a video codec, and an audiovisual display coupled to the client device for display of decoded audiovisual data. The method includes first providing the client device with a first graphical user interface (GUI) that indicates a plurality of videos and includes an input for selecting a video from the plurality of videos. Next, in response to receiving a selection of a video in the plurality of videos by the individual using the input, the method includes determining a transmission mode as a function of: 1) the decoding capabilities of the client device, 2) a video encoding format of the selected video, 3) whether the selected video should be displayed full screen or partial screen, and 4) whether the client device is capable of overlaying image data into a video stream. Then, in a server device remote from the client device, the method calls for preparing, for transmission according to the determined transmission mode, audiovisual data that include the selected video. Finally, the method requires transmitting the prepared audiovisual data, from the server device to the client device, according to the predetermined transmission mode, for display on the audiovisual device associated with said client.

In accordance with a first embodiment of the invention, several transmission modes are possible. According to a first transmission mode, the audiovisual data includes the first GUI, and when the video should be displayed in a partial area of the screen, preparation further includes: rendering the first GUI according to a previously determined screen resolution and stitching the selected video into the previously rendered first GUI where stitching is a method of combining previously encoded video streams by any of a variety of suitable processes. According to a second transmission mode, when the selected video should be displayed full screen and the client device cannot decode the video encoding format of the selected video, preparation includes transcoding the selected video where transcoding is a method of altering already encoded video by changing format or changing encoding means or both. According to a third transmission mode, when the selected video will be displayed full screen and the client device can decode the format of the selected video, and further, no image data will be overlaid on the selected video then preparation includes repackaging the selected video. According to a fourth transmission mode, when the selected video should be displayed full screen and the client device can decode the selected video, and further, the client device is capable of overlaying image data onto the selected video, and still further, the audiovisual data from the server includes a second GUI that provides various GUI elements such as video playback controls, then preparation includes rendering the second GUI according to the client overlay resolution. According to a fifth transmission mode, when the selected video will be displayed full screen and the client device can decode the selected video, and further, the client device is not capable of overlaying image data onto the selected video, then preparation includes: rendering the second GUI according to the video resolution, video size, and video frame rate compatible with the client device; decoding a portion of the selected video; blending the rendered second GUI into the decoded portion; and re-encoding the blended portion according to the video encoding format.

In accordance with a second embodiment of the invention, a computer program product provides an audiovisual experience to an individual having a client device that is capable of decoding audiovisual data using a video codec, and an audiovisual display coupled to the client device for display of decoded audiovisual data. The computer program product has a computer useable medium on which is stored non-transitory computer program code for executing the above-described method in its various transmission modes.

To implement these methods and execute their program code, there is also disclosed a third embodiment: a computer system for providing an audiovisual experience to an individual having a client device that is capable of decoding audiovisual data using a video codec, and an audiovisual display coupled to the client device for display of decoded audiovisual data. The computer system has an application engine for providing a first graphical user interface (GUI) that indicates a plurality of videos and includes an input for selecting a video from the plurality of videos, and for providing a second GUI that includes video playback controls. The computer system also has control logic for determining a transmission mode in response to receiving a selection of a video in the plurality of videos by the individual using the input. Determining the transmission mode is a function of: 1) the decoding capabilities of the client device, 2) a video encoding format of the selected video, 3) whether the selected video should be displayed full screen or partial screen, and 4) whether the client device is capable of overlaying image data into a video stream. The computer system also has a transcoder for transcoding the selected video from a second encoding format into the first encoding format, according to the determined transmission mode. The computer system also has a blender for blending the second GUI into the selected video using the first encoding format, according to the determined transmission mode. The computer system also has a stitcher for stitching the output of the application engine with the output of the transcoder and the blender, according to the determined transmission mode. The computer system also has a packager for packaging audiovisual data according to the determined transmission mode. Finally, the computer system has a transmitter for transmitting the packaged audiovisual data, toward the client device, according to the determined transmission mode, for display on the audiovisual display.

The components of the computer system may be configured according to the transmission mode. Thus, according to a first transmission mode, the audiovisual data further include the first GUI, the application engine is configured to render the first GUI according to a previously set screen resolution; the transcoder is configured to transcode the selected video; and the stitcher is configured to stitch the transcoded video into the rendered first GUI, when the video should be displayed partial screen. According to a second transmission mode, the transcoder is configured to transcode the selected video, when the selected video should be displayed full screen and the client device cannot decode the video encoding format of the selected video. According to a third transmission mode, the packager is configured to repackage the selected video, when the selected video should be displayed full screen, the client device can decode the video encoding format of the selected video, and no image data should be overlaid on the selected video. According to a fourth transmission mode, the audiovisual data further include a second GUI that includes video playback controls, and wherein the application engine is configured to render the second GUI according to a client overlay resolution, when the selected video should be displayed full screen, the client device can decode the video encoding format of the selected video, and the client device is capable of overlaying image data into the selected video. According to a fifth transmission mode, the application engine is configured to render the second GUI according to a video resolution, video size, and video frame rate; the transcoder is configured to decode a portion of the selected video; the blender is configured to blend the rendered second GUI into the decoded portion; and the transcoder is further configured to re-encode the blended portion according to the video encoding format, when the selected video should be displayed full screen, the client device can decode the video encoding format of the selected video, and the client device is not capable of overlaying image data into the selected video. It should be clear that not all of these components must be active in each transmission mode. Therefore, operation of each of the transcoder, blender, stitcher, and packager may be optional according to the determined transmission mode.

In accordance with a fourth embodiment of the invention, a method is disclosed for streaming user-selected video content encoded in a first protocol format having a protocol container. The method requires first receiving a request for streaming the user-selected video content, and obtaining the user-selected video content from a first source. Next, the method calls for removing the protocol container from the user-selected video content and repackaging the user-selected video content into an MPEG-2 transport stream. Finally, the method requires transmitting the MPEG-2 transport stream with the user-selected video content encoded in the first protocol wherein the first protocol is different than MPEG and the client device is capable of decoding the first protocol.

Variations on the fourth embodiment are contemplated. For example, the method may also include adapting the presentation and synchronization timing of the stream based upon the presentation and synchronization timing of the user-selected video content. The method may be performed within a cable television network. The first protocol container may be MP4, DASH, or HTTP, and the first protocol container and the first encoded protocol may be the same.

There is also provided a fifth embodiment of the invention: a method for adaptation of a stream for streaming a user-selected video asset. This method includes first streaming a graphical user interface from a server to a client device wherein the stream has a plurality of stream characteristics. Next, the method includes receiving a user request for playback of encoded video content encoded with one or more different streaming characteristics. Then, the method includes generating graphical user interface elements in accordance with the one or more different streaming characteristics. Finally, the method includes combining the encoded video content and the generated graphical user interface elements to form an encoded transport stream. The user requested encoded elements may have a picture size that is less than a full video frame and the generated user elements when combined with the user requested encoded video may form a complete video frame. A different streaming characteristic between the graphical user interface and the requested encoded video content may be the frame rate and the generated graphical user interface elements may have the same frame rate as the requested encoded video content. Moreover, the generated graphical user interface elements may have the same sampling rate as the requested encoded video content.

BRIEF DESCRIPTION OF THE DRAWINGS

The foregoing features of embodiments will be more readily understood by reference to the following detailed description, taken with reference to the accompanying drawings, in which:

FIG. 4 shows the steps for repackaging and resynchronizing a full-frame video sequence;

DETAILED DESCRIPTION OF SPECIFIC EMBODIMENTS

Definitions. As used in this description and the accompanying claims, the following terms shall have the meanings indicated, unless the context otherwise requires: The term "functional block" shall mean a function that may be performed by a hardware element either alone or in combination with software. The term "module" shall refer to either to hardware or a hardware and software combination wherein the software is operational on the hardware.

Embodiments of the present invention are directed to network transmission of user-selected multimedia content (video, audio, and audiovisual content). The selected multimedia content may be encoded data that may be encoded with a codec. Various embodiments also use one or more container protocols for putting encoded data into a format for transmission in a network and use transport protocols for transferring the containers of encoded video and audio data to a client device within a network. Many of the embodiments described below mention MPEG, MPEG-2 transport streams and H.264 encoding and transcoding. The descriptions are meant for exemplary purposes and one should not see the present invention as being limited to only these protocols, as other encoding, container, and transport protocols may be used without deviating from the intended scope of the invention. Additionally, embodiments of the present invention operate on multimedia content. For simplicity, disclosed embodiments in general describe video content. However, the embodiments may readily be adapted for the distribution of user-selectable audio content and user-selectable audiovisual content.

Figure 1:
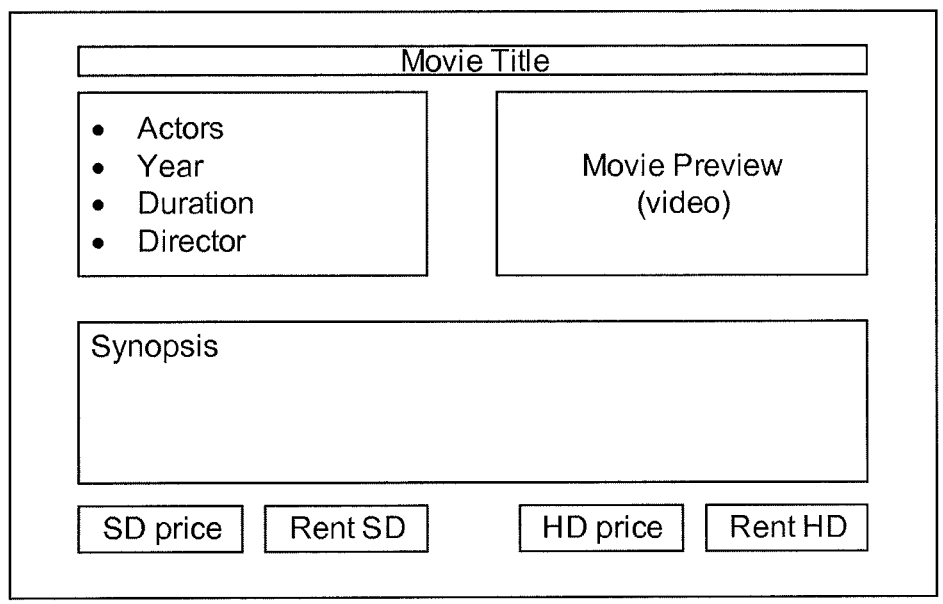
FIG. 1 is an illustration of a screen layout.

FIG. 1 is an illustration of a frame layout that includes graphical user interface elements for allowing a subscriber to select video content to be distributed to a client device in a content distribution network, such as a cable television network. The frame layout provides the location of various graphical user interface elements and video content that are to be added to the frame layout. In FIG. 1, the graphical user interface elements include buttons for the selection of SD (standard definition) and HD (high definition) content for both renting and purchasing. The video content elements to be added include a scaled movie preview which is full-motion video, along with text based video content elements such as "Movie Title", "Actor, Year, Duration, Director", and "Synopsis". It should be understood that all of these elements are video elements, since the content distribution network transmits video content in a video stream. As a result, even static elements are displayed as frames of video. In a standard content distribution network, such as a cable television network, video content is distributed via a transport protocol, using a container protocol, wherein the video content is encoded in an encoded format (e.g., MPEG-2, H.264 etc.).

As should be understood by a person with ordinary skill in the art, the content distribution network includes a multitude of components including a central platform that includes a plurality of processors for serving content. The processors generally perform the functions of providing broadcast video, user-interface guides, interactive content, and video-on-demand. The processors that are part of a content distribution platform are coupled to a number of nodes that broadcast and stream on-demand video content to a plurality of subscriber client devices. The subscriber client devices may include set-top boxes, tablets, televisions and other electronic communications devices. Each client device has certain capabilities based upon both the hardware and software that are available to the client device. For example, disparate client devices may have different processors, memory, codecs, and capabilities to download and execute programs. In a cable television environment, most, if not all, devices can access MPEG-2 Transport streams and decode MPEG-2 elementary streams. Some devices may have more advanced capabilities, including a local operating system, software components, and the ability to download and execute additional programs. Further client device may be able to receive and work with different transport protocols such as UDP, HLS, HTTP, MPEG-DASH, and smooth streaming, work with different content containers, such as MP4, MPEG-2 transport stream, MPEG-2 program stream and decode different codecs including H.264, MPEG-2.

Figure 2:
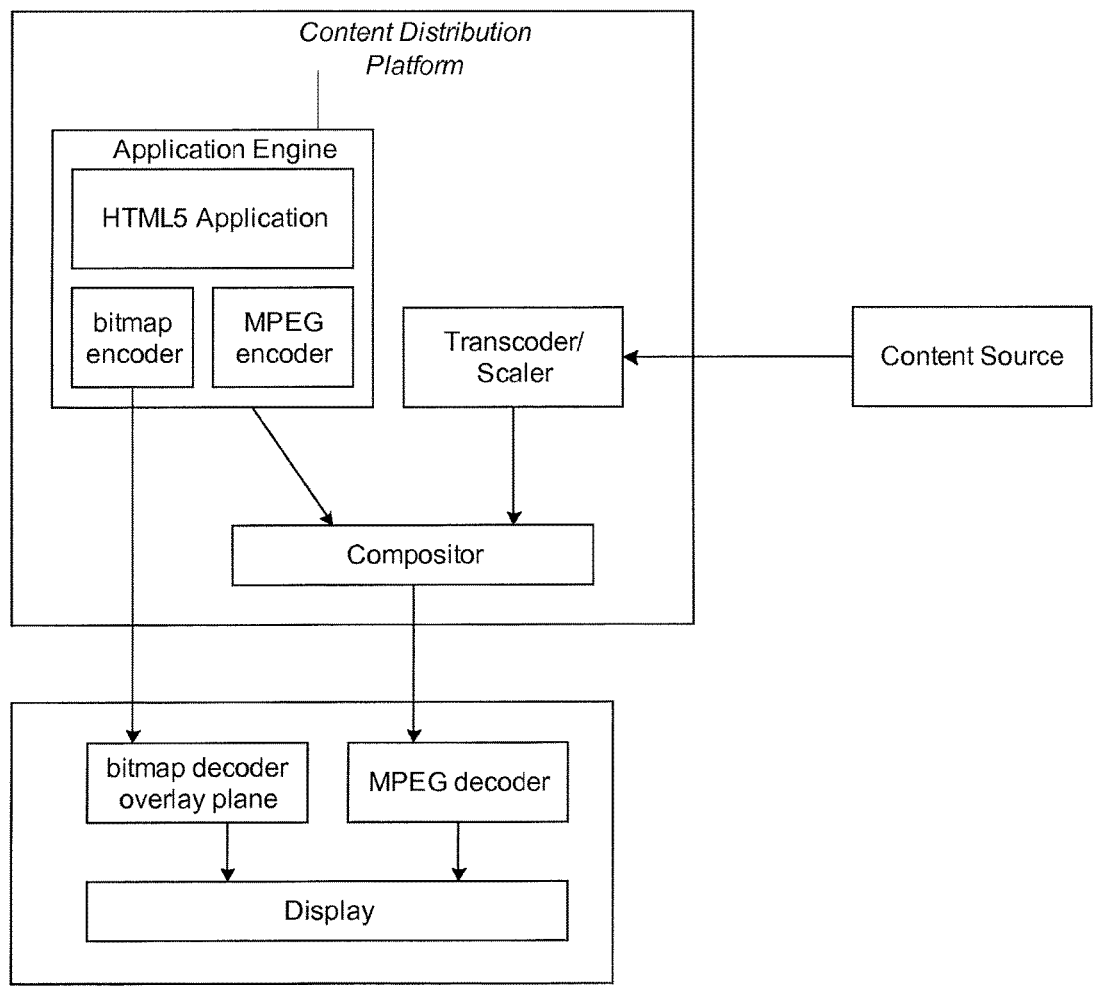
FIG. 2 is an environment for implementation of at least one embodiment of the invention.

FIG. 2 shows an exemplary environment including a content distribution platform for providing a multi-modal operation of selectable video content to be streamed to a client device. The platform is a structure that includes a plurality of components. The platform includes an application engine for selection of a graphical user interface to be provided to a client device in response to a request from the client device. The application engine responds to requests from the client device for content. For example, the application engine may include an HTML5 application that defines a graphical user interface (GUI). The GUI may include a frame layout along with position information for insertion of content, for example as shown in FIG. 1. The layout includes a plurality of blocks (movie title, movie preview (video), SD price etc.) for video elements to be inserted into the layout. Thus, encoded video elements, such as MPEG encoded fragments, may be referenced at the block locations.

The HTML5 application keeps track of state information regarding the elements of the graphical user interface. Thus, the HTML5 application can be reused for presenting different content to the user in a graphical display. The HTML5 application may access the encoded elements and may cause elements that are not already properly encoded to be encoded in an MPEG encoder. The MPEG elements of the HTML5 application may include MPEG fragments of buttons, sliders, switches, etc. that may be part of the HTML5 application. The MPEG elements may be static images and scaled versions of video content, such as movie previews.

Additionally, the HTML5 application may include encoded fragments that represent the layout. For example, the layout may be considered a background and therefore the layout may include a plurality of encoded elements to represent the layout. Similar content distribution platforms that can be used with embodiments of the present invention can be found in U.S. patent application Ser. No. 12/008,697 and U.S. patent application Ser. No. 13/445,104 both of which are incorporated herein by reference in their entirety.

The HTML5 application may also include reference to video content from an outside source or stored at a different location. As shown in FIG. 2 there is a content source, which may be on a content source server. In response to a request from the content distribution platform, content from the content source server is provided to the content distribution platform.

The platform determines if the content needs to be transcoded based upon the capabilities of the client device. If necessary, the content from the content server is provided to a transcoder. The transcoder then scales and/or transcodes the video from the content source, so that the video from the content source can be stitched together with other encoded elements in a compositor module. If the content does not require scaling or transcoding, the content will be provided directly to a compositor. Whether a source is transcoded is determined by control logic that is part of the platform and will be explained in further detail below. The compositor receives in encoded fragments, such as encoded MPEG fragments and may receive in encoded video content. The compositor takes the various encoded elements and creates an MPEG elementary stream based upon the encoded elements and the frame layout from the HTML5 application. If a request for full frame encoded video content is received, the compositor may receive in the encoded video content in its native encoded format and may package the encoded video content in an MPEG transport stream without requiring the encoded video content to be transcoded. For example, if the client device is capable of decoding an H.264 encoded file and a full screen video is requested from a source, the H.264 video will not be transcoded and will only be encapsulated into an MPEG-2 transport stream for transmission to the client device. The type of request, the content to be presented, along with the available processing resources at both the server and on the client device are used in determining the mode of operation and the format of the data to be transmitted to a requesting client device.

The client device in general includes an MPEG decoder and optionally may include a bitmap decoder for an overlay plane. The MPEG decoder receives an MPEG transport stream that contains one or more MPEG elementary streams or other encoded streams (e.g., H.264 etc.). The MPEG decoder decodes the encoded stream and presents the output to a display device. The bitmap decoder receives in a bitmap overlay stream separate from the full screen MPEG video content. The client device receives the bitmap overlay and displays the bitmap overlay on top of the decoded MPEG video content. The bitmap and the decoded MPEG video may be blended together in the spatial domain by the client device or elements of the bitmap may replace elements of the spatially decoded MPEG video content. Thus, a decoded MPEG video frame may have elements replaced wherein the bitmap represent a graphical user interface. FIG. 2 represents one version of a content distribution platform and should not be viewed as limiting the scope of the present invention.

Thus, resources at both the server-side and client-side are relevant to determining how to efficiently process requests from client devices. As can be imagined, the user can select from a plurality of different content and therefore the content distribution platform will operate in one of a plurality of different modes. A first mode provides a graphical user interface for selection of content to be displayed (e.g., movies, television shows, specials etc.) which may either be static or have less-than full frame video streaming using an HTML5 application wherein MPEG elements are stitched into a layout to form MPEG video frames. A second mode provides a full screen trick-play mode wherein full-screen video is overlaid with graphical user interface controls (e.g., fast forward, rewind, pause, stop etc.) where at least partial decoding and re-encoding of the video content and blending occurs. A third mode provides a full screen display wherein the video content is provided to the client device for full-screen playback in an encoded format compatible with the client device without transcoding. A fourth mode provides a full-screen trick play mode wherein the client device performs the blending and encoding graphical controls. A fifth mode provides a full screen transcode of the source material dependent in part on the client device's decoding capabilities. In various embodiments of the present invention, these modes of operation can be selectively and automatically switched between based upon both requests from the client device, and the capabilities of the client device wherein the control is performed on the server-side.

Figure 3:
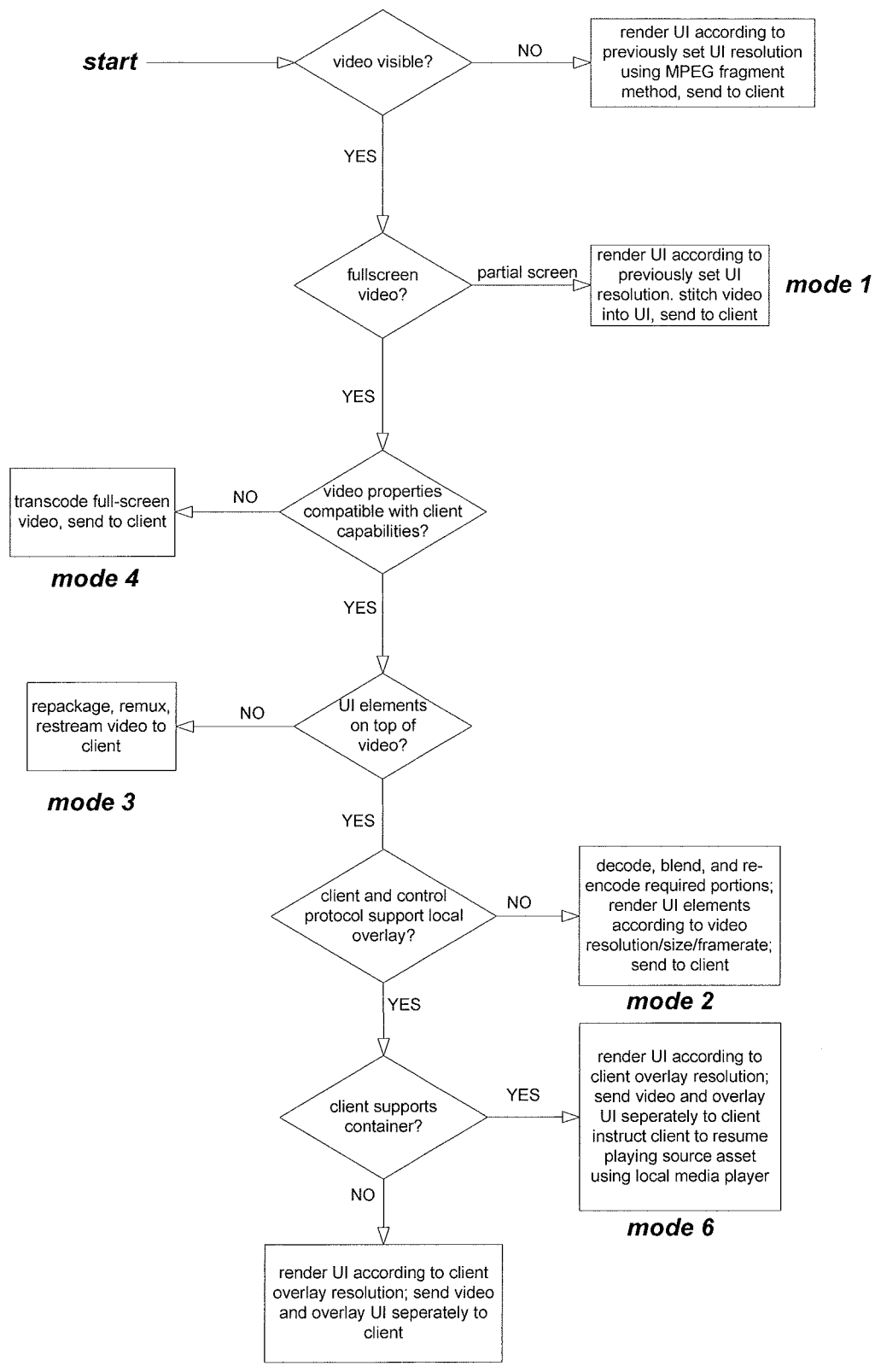
FIG. 3 is a flow chart that discloses the control logic sequence for switching between different modes of operation.

FIG. 3 is a flow chart showing the operation of a control processing logic within the content distribution platform. The control processing logic queries if the requested content by the client device contains visible video. If the answer to the query is no, the graphical user interface is processed at the server wherein a selection of encoded elements, such as MPEG elements, are selected based upon a frame layout of an HTML5 application and the MPEG elements are stitched together to form a full video frame (static) that can then be transmitted to the client device and displayed on a display device.

If video is to be presented on the screen, the logic queries if full screen video is to be shown. If there is only a partial screen of video to be shown, the server switches to mode 1 and identifies an HTML5 application and frame layout. It then accesses source content that is scaled and stitched together to form a series of MPEG encoded video frames defining an MPEG elementary stream. If, however, the video content that has been selected by the user is full screen video, for example if the user indicates a desire to view a movie, TV show, full-screen video clip, or full-screen promotional content, the logic performs further queries.

During the establishment of a network session between a requesting client device and the server, the client device identifies itself and thus, identifies its capabilities. The client capabilities may be transmitted during the communication or may be stored in a user/device profile that can be accessed by the server and the control logic. The logic thus queries whether the video properties of the selected video content are compatible with the capabilities of the client device. For example, if the client device can only decode MPEG-2 and the selected video content is encoded using H.264, the logic switches to mode 4 and a full-screen transcode is performed, so that the selected video content will be transmitted to the client device in a format that the client device can decode (e.g., MPEG-2).

If the video properties of the selected video content are compatible with the client device's capabilities, the logic determines if a graphical user interface element is required to be placed on top of the video. A graphical user interface element may be required based upon signals received from the client device. For example, a user may have a full screen video playing and may use a remote control coupled to the client device to pause or fast-forward the video content. The client device initiated signal informs the control logic that graphical user interface elements should be placed on top of the full screen video to enable trick-play features (fast forward, rewind, play, pause, skip etc.).

If user elements are not to be placed on top of the video, the logic will initiate mode 3, which provides a video pass-through capability. In said situation, the client device does not require content to be transcoded and therefore the content will remain in its native format. The video content will then be repackaged and streamed to the client device. Repackaging and streaming will be explained in further detail with respect to FIG. 4.

If the logic determines that the graphical user interface is to be placed on top of the video, the logic then queries if the client and control protocol support a local overlay. Thus, the control logic looks at the control protocol as implemented by the platform and the connecting network between the control logic (i.e. server) and the client device. Certain networks will provide for more than one channel of communication with a client device, so that control data may be transmitted separately from MPEG elementary stream data (the requested video content). The control data may be transmitted using a different signaling system or may be provided in a separate MPEG elementary stream. Similarly, the client device must be capable of receiving instructions that a local overlay should be created.

As a result, if the control logic determines that the client and the control protocol support a local overlay, either graphical or full-motion video, the control logic switches to mode 5. In mode 5, the system renders GUI elements in accordance with the overlay resolution, size, and frame rate for the video content. For example, if the full screen video is being rendered as, for example, 720 p, the GUI elements will be scaled and rendered as 720 p elements. These graphical user interface elements may be transmitted as encoded fragments. In such an embodiment, the client device is capable of receiving encoded fragments or spatially rendered fragments and includes local software for stitching the encoded fragments or spatially rendered fragments with the full screen encoded video content. The client device may have a predetermined layout using templates that define screen locations and other parameters for adding in the GUI elements for the interface or the platform may transmit a layout for the interface. The client device will then insert the GUI elements onto the full screen video. This may be performed either in the encoded domain or in the spatial domain. If the client device performs the combination in the spatial domain, blending may occur wherein the GUI elements and the video content may be blended using an alpha layer.

If the client and control protocol do not support local overlay, the control logic will cause the graphical user interface elements to be added on the server side (at the platform) in mode 2. In order to efficiently use resources, only a partial decode of the selected encoded video content may occur. For example, macroblock locations of the video content that will include GUI elements may be decoded to the spatial domain and then alpha blended together with the graphical user interface elements. The GUI elements either may be stored locally or retrieved from a remote location. The GUI elements may be saved at a high resolution and then scaled as needed to meet the requirements of the respective client. The blended elements will then be encoded and a compatible MPEG elementary stream will be formed and placed into an MPEG-2 transport stream. The platform sends the MPEG-2 transport stream to the client device and the client device decodes and displays the user-selected video content with embedded user-interface overlays.

One benefit of the present multi-modal system is that the number of transcoding steps is reduced compared to existing content distribution platforms and especially to content distribution platforms coupled to cable television networks. Rather than having to transcode encoded video content selected by a user, the content may be passed-through in its native encoding. This assumes that the client device is capable of decoding the native format. In this configuration, processor resources are conserved on the content distribution platform and therefore, more video streams can be processed simultaneously. Additionally, the present multi-modal system allows for all of the user-interface graphics to be centrally controlled by the content distribution platform. The multi-modal system passes the graphical user interface elements from the platform to the client device or incorporates the graphical user interface elements into the video that is being streamed to the client. A further advantage of the present multi-modal systems is that content providers do not need to re-author their applications (YouTube, Netflix, Amazon etc.) or transcode their content for operation within this system. The native applications (ex. YouTube, Netflix, Amazon) can be run on the content distribution platform in their native operating system and language (Java, iOS, Linux etc.) and the content will either be passed through or transcoded without intervention by the content provider. Yet another advantage of the present multi-modal system occurs because full-screen playback and control of full-screen playback can be controlled by the content distribution platform without requiring client devices to take over control. Thus, the client device becomes another processing element in load balancing and both legacy client devices and modern client devices can be serviced with comparable content and consistent graphical presentations. Further, the client devices on the content distribution network do not need to be updated before more advanced features can be presented to a user. The content distribution system will automatically adapt to the capabilities of the client devices within the network and therefore, updates can be made on a rolling basis.

As mentioned above, video content can be repackaged and re-streamed without requiring transcoding. Thus, a content source having video content for streaming in a particular container format and with audio and video synchronization information will have the source video container format, such as MP4, DASH, HTTP, Smooth Streaming and HLS removed so that only the actual encoded video and audio data remains. The encoded audio and video data are repackaged in a transport container that is compatible with the content distribution network. For example, the compressed video and audio content is repackaged into an MPEG-2 transport stream container. Additionally, the audio and video synchronization data is preserved and the video stream from the content distribution platform to the client device is adapted based upon the audio and video synchronization data so that the stream timing complies with the transport protocol specifications (e.g., MPEG transport stream specifications).

FIG. 4 shows an example of the repackaging and re-streaming process. Element 400 shows video content from a content source in its native format. The video content has a first container format having a video bit stream, an audio bit stream, synchronization information and header information. In element 410, the container is removed from the video content and the audio and video bit streams are extracted and stored to a memory location. Additionally, the synchronization data is extracted and stored to a memory location. Other information may also be extracted and saved such as subtitles for the bit stream. In element 420, a new container is created. Synchronization is re-done using the new container's format. The stream is packetized and then transmitted to the client device observing packet layer jitter and delay requirements as caused by the network infrastructure. Element 430 shows a representation of video frames that have been decoded from a compressed format and are transformed into the spatial domain for presentation on a video playback display associated with the requesting client device.

As mentioned above, a stream may be adapted for streaming a user-selected video asset. A stream may be adapted when a graphical user interface, having certain streaming characteristics, is streamed from a server to a client, and a user requests playback of video content encoded with streaming characteristics different from those of the graphical user interface. In one embodiment, a method includes first streaming a graphical user interface from a server to a client device wherein the stream has a plurality of streaming characteristics. Next, the method includes receiving a user request for playback of encoded video content encoded with one or more streaming characteristics different from the plurality of streaming characteristics of the graphical user interface stream. Then, the method includes generating graphical user interface elements in accordance with the one or more different streaming characteristics. Finally, the method includes combining the encoded video content and the generated graphical user interface elements to form an encoded transport stream. The user requested encoded video content may have a picture size that is less than a full video frame, and the generated user interface elements, when combined with the user requested encoded video content, may form a complete video frame. A different streaming characteristic between the graphical user interface and the user requested encoded video content may be the frame rate, and in one embodiment, the generated graphical user interface elements may have the same frame rate as the user requested encoded video content. Moreover, the generated graphical user interface elements may have the same sampling rate as the user requested encoded video content.

Figure 5:
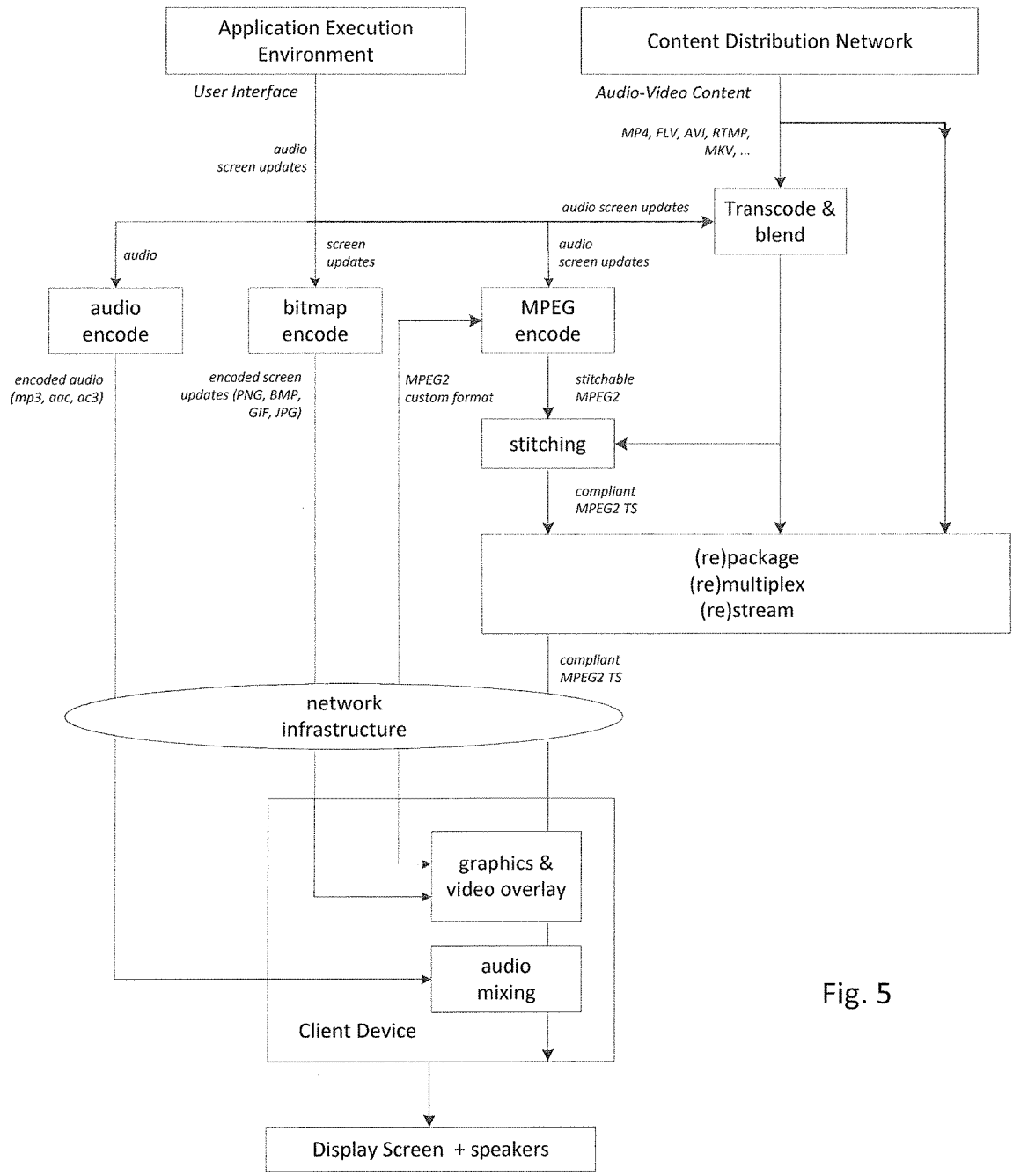
FIG. 5 shows an exemplary functional architecture for implementing a multi-modal platform for providing user-selectable video content.

FIG. 5 shows an architecture of one embodiment of the content distribution platform in a network that can support all of the modes of delivering a graphical user interface and video content to a client device. As shown, the architecture presents functional blocks and data paths for video, audio and graphical user interface elements. To support each specific mode only a subset of the possible data paths and functional blocks are required.

A user may select between various types of content and the associated screens (VOD screen, content selection screen, video content information screen, ordering screen, full screen playback etc.). In response to a user selection, control logic automatically selects an appropriate application and corresponding frame layout for presentation of the desired content/screen to the client device, selects an appropriate mode of operation, and controls the various functional blocks. The control logic of the application content distribution platform determines how to process the received request based upon capacity of the network and capabilities of the client device. The server-side architecture of FIG. 5 includes several functional blocks controlled by the control logic, including a source content network, an application execution environment, an audio encoder, a bitmap (image) encoder, an audiovisual (MPEG) encoder, a transcoder, a blender, a stitcher, and a packager/multiplexer/streamer. These functional blocks are now described in more detail.

The source content network provides various audio, video and audiovisual content to be supplied to the client device as part of an audiovisual experience. Content is provided by various content providers, each of whom may have a different storage and streaming format for their content. In particular, the content may be encoded in a variety of different formats, including MPEG-4, Flash video, AVI, RTMP, MKV, and others.

The architecture includes an application execution environment for generation of a graphical user interface in response to requests received from a client device. Based on the correct application, the application execution environment selects the appropriate graphical user interface (frame layout along with references/addresses of elements to be stitched into the frame layout) and provides audio and screen updates to data paths of the architecture. For example, state of a button may have changed in response to action by a user, and therefore the application will have a screen update for the graphics of the button and perhaps play an audible sound.

The application execution environment (AEE) requests video elements, such as encoded fragments, for example, encoded MPEG fragments, for incorporation into the frame layout from one or more sources including from a source content network and one or more source content servers. The AEE may provide actual spatial data for the screen updates or the AEE may provide pointers or addresses to content that is to be combined with a frame layout. Other examples of content that may be combined under the direction of the AEE is full-motion video such as MPEG2 or animated graphic elements which are encoded as MPEG2. As MPEG2 does not provide alpha channel information, which is useful for overlaying said information, the AEE can embed said alpha channel information either as a coded frame which is then not directly displayed or as non-displaying coded information embedded in a portion of a frame (e.g., as an MPEG custom format). In either case of a full-frame alpha channel mask or of an alpha channel mask embedded in a portion of a frame, the alpha mask information is extracted, by the client device, as illustrated in FIG. 5, from the stream upon detection of an alpha channel mask identifier and an empty frame or empty macroblocks are substituted by the receiving software of the client prior to the decoding of said video information. The application execution environment may include links to one or more graphical elements that may be either in the encoded domain (MPEG fragments i.e. groups of encoded macroblocks) or the spatial domain.

It should be recognized that a screen update may be either a full frame or part of a frame. An API can be used such as the OpenGL API, where scene information (including bitmaps) is exchanged. In other embodiments, the screen update may be in a format where an abstract scene description (application description) is passed to the modules along with references to bitmaps/encoded fragments and textures.

The audio encoder receives audio output provided by the executing application and encodes it according to an audio encoding format supported by the client device. The audio format may be, for example, MP3, AAC, AC3, or others known in the art. The audio encoder may be employed if the client device is capable of mixing audio into a video stream; if not, then the audio encoder is not employed, and all audio received by the client device from the content distribution platform occurs as an integral part of an audiovisual stream.

The image encoder receives screen updates provided by the executing application and encodes them according to an image encoding format supported by the client device. The image format may be, for example, PNG, BMP, GIF, or JPG, or others known in the art. The image encoder may be employed if the client device is capable of overlaying image graphics onto a video stream. The images are directed to the client device through the network infrastructure. The images are received by the client device, which combines them with decoded MPEG content so that the bitmap is used as an overlay, and blending may be efficiently done in the spatial domain.

In some embodiments, the method comprises the steps of adding a tag, such as a URL or other means, for identification of graphic fragments to said fragments. This enables the tracking of data relating to the frequency of use of a given fragment, and on this basis a certain priority can be given to a fragment which further determines how long said fragment will remain in said cache. Furthermore, a method is provided for associating the data related to where said fragments are used on a client display in order to reuse said fragments correctly in other parts of the respective user interface of said client display.

In some embodiments, systems for performing methods described herein include fast access memory, such as a cache memory for temporary storing of encoded fragments. By temporarily storing and re-using said graphic fragments and by combining them with other elements of the user interface, a highly efficient personalized audiovisual experience can be generated using relatively small computational power and with short reaction times.

The MPEG encoder receives both audio and screen updates provided by the executing application and encodes them according to an MPEG format into a stitchable MPEG format. The MPEG encoder may be employed if the user has selected a mode in which a selected video is displayed on a partial screen only. The architecture also includes a transcoder. The transcoder receives audio and video content from the source content network, and transcodes it when the source content is in an audio or video format that is not supported by the client device. Once transcoded if required, the audiovisual content may be blended using a blender that receives graphical user interface audio and screen updates from the application execution environment. The output of the transcoder and blender is also in a stitchable MPEG format. If the application requires blending of screen elements or transcoding, the screen elements will be retrieved from a source (application execution environment or the content distribution network) and the screen elements may be transcoded into a stitchable MPEG element or resized for the frame layout (e.g., 480 p to 200×200 pixels).

A stitching module receives stitchable MPEG from the MPEG encoder and from the transcoder and blender, and stitches them into a standards-compliant MPEG transport stream. Suppose the application changes the state of a button in response to a user input. Then the graphical element for the changed state of the button will be provided to the stitching module if the graphic is already an MPEG fragment, or if the graphical element is spatially encoded, the graphical element will be encoded as an MPEG fragment and passed to the stitching module that stitches together the frame layout. The MPEG fragments and the frame layout may be stitched together to form a complete MPEG frame in the stitching module.

The complete MPEG frames are packaged into an MPEG elementary stream and then into an MPEG transport stream container in a packaging and multiplexing stream module. More than one MPEG elementary stream may be multiplexed together and there may be multiple audio and/or video streams. It should be recognized that the graphical user interface elements that are to be placed on top of a video element (animation, scaled movie trailer, other partial video frame content) can be sent either as an overlay graphic to the client (e.g., a bitmap) or the overlay graphical user interface elements can be blended with the video element in the transcoding and blending module. The packaged MPEG transport stream (e.g., MPEG2 transport stream) is then sent through the network infrastructure to the client device. The client device will receive the MPEG transport stream and decode the MPEG elementary streams for display on a display device.

Figure 5A:
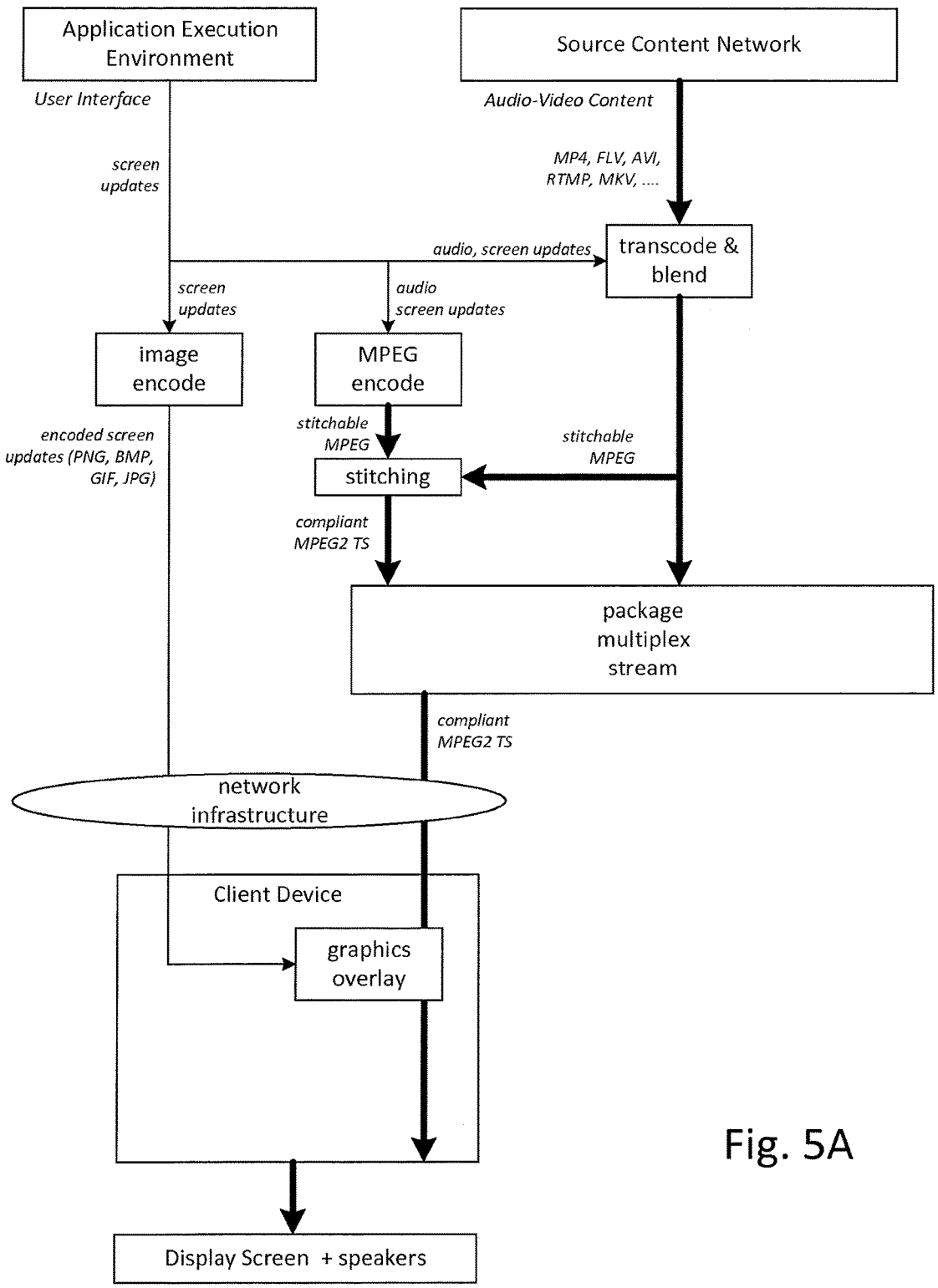
FIG. 5A shows the functional architecture for supporting mode 1, which is a partial screen video with a stitched graphical user interface.
Figure 5B:
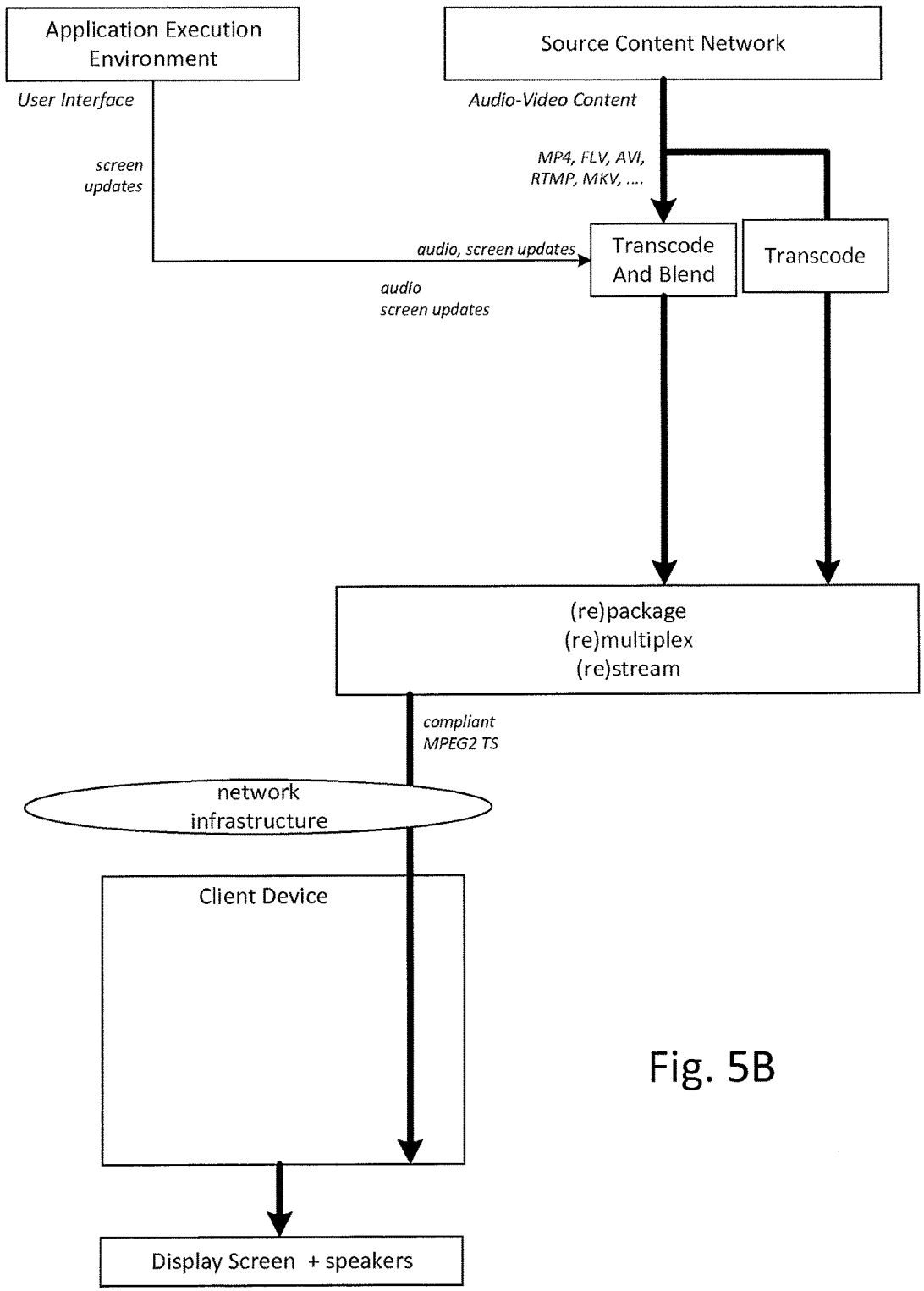
FIG. 5B shows the functional architecture to support modes 2 and 5, which are the display of full-screen video with and without blended overlays.
Figure 5C:
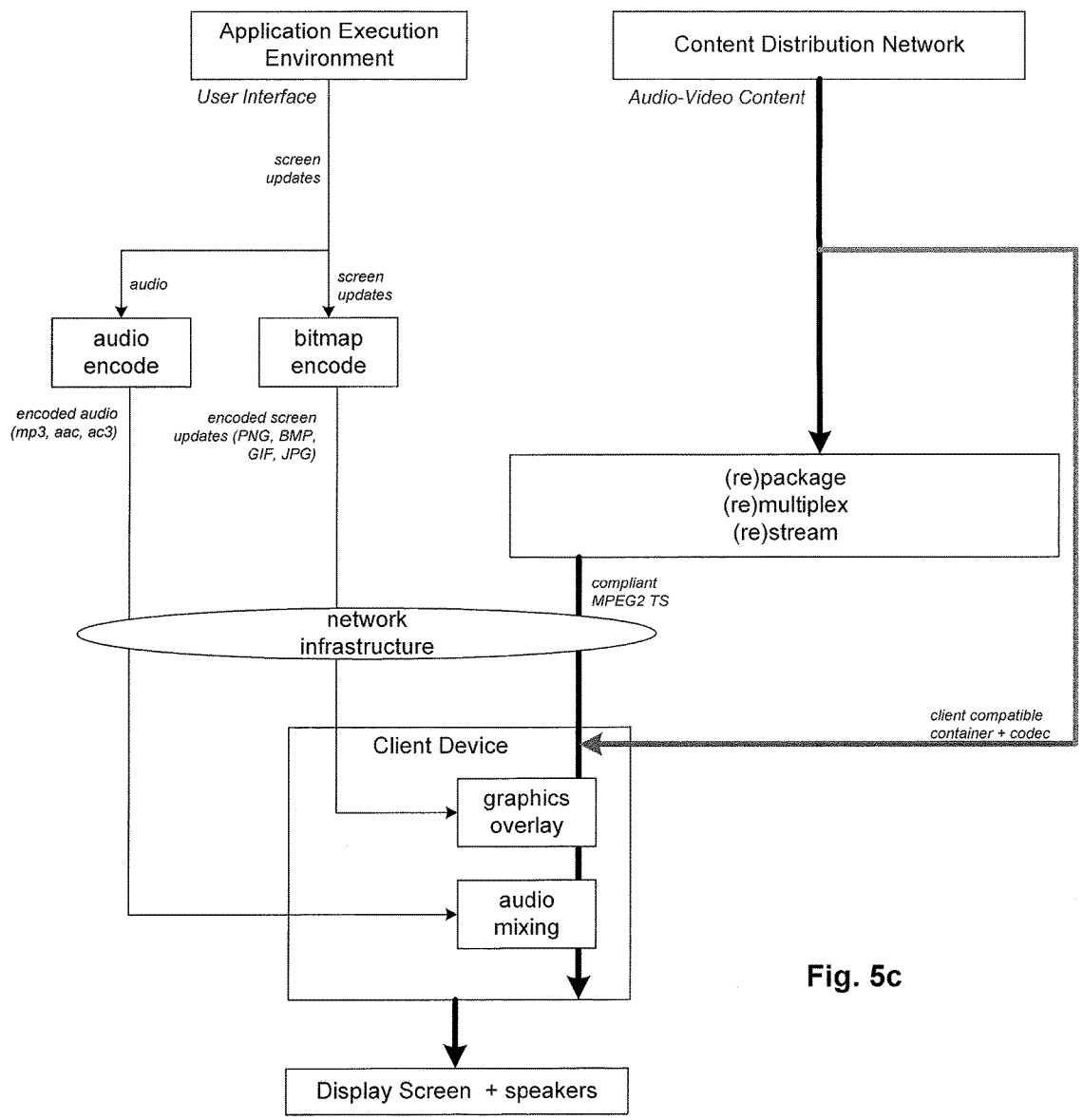
FIG. 5C shows the functional architecture for mode 3, which is a full-screen pass through where encoded video content is repackaged and re-streamed.
Figure 5D:
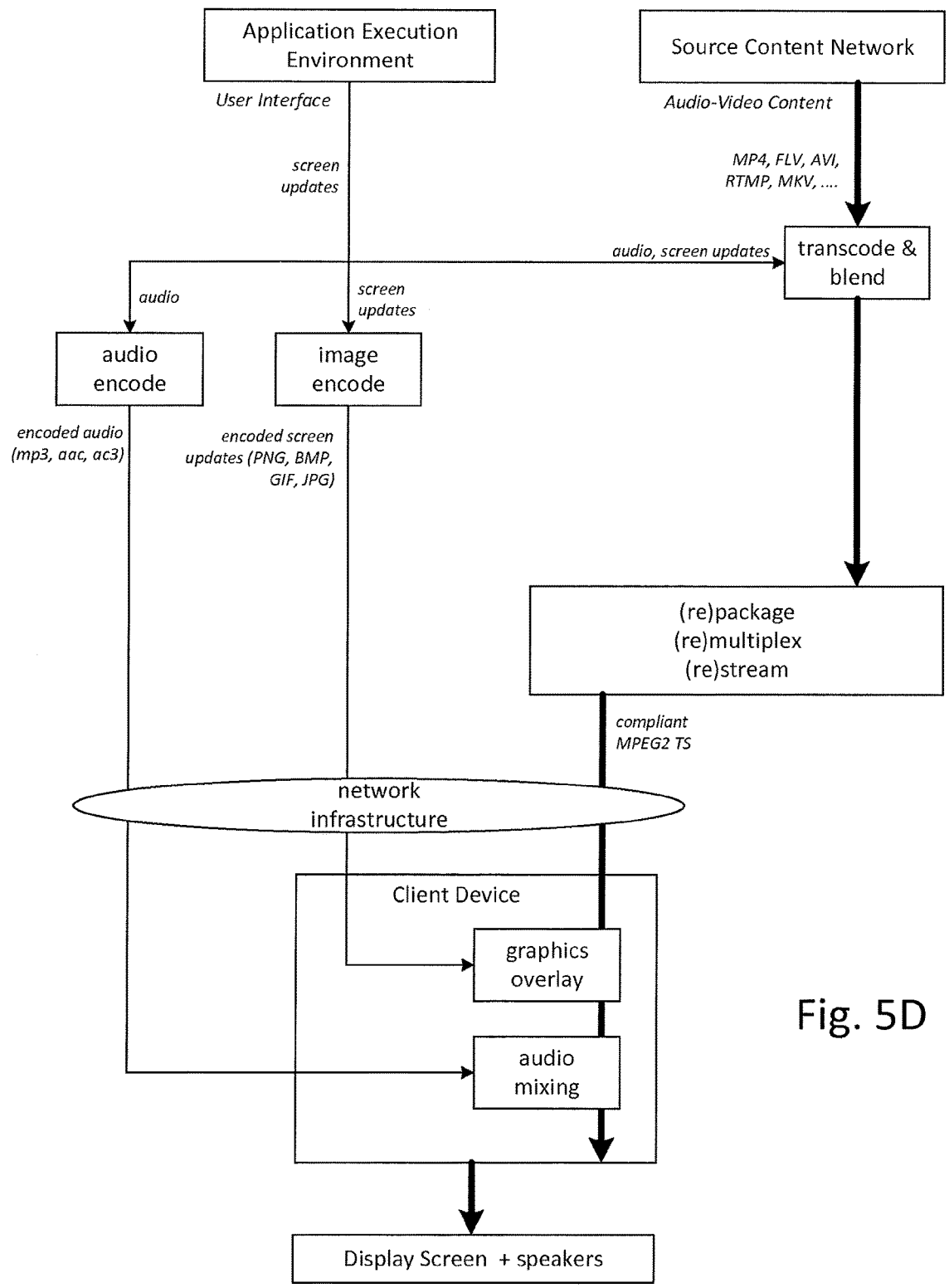
FIG. 5D shows the functional architecture for supporting mode 4, which is a full screen transcode due to decoding limitation of the client device.

FIGS. 5A-5D show the functional blocks and data paths that may be used for each of the modes of operation. FIG. 5A shows the functional architecture for supporting mode 1, which is a partial screen video with a stitched graphical user interface. FIG. 5B shows the functional architecture to support modes 2 and 5, which are the display of full-screen video with and without blended overlays. FIG. 5C shows the functional architecture for mode 3, which is a full-screen pass through where encoded video content is repackaged and re-streamed. FIG. 5D shows the functional architecture for supporting mode 4, which is a full screen transcode due to a decoding limitation of the client device.

FIG. 5A is now described in more detail with respect to mode 1 and operation of its relevant functional blocks. In mode 1, the user has requested an application that provides partial screen video with a stitched graphical user interface. In this case, the application execution environment provides the graphical user interface, including screen updates and audio updates that make up the portion of the screen not occupied by the video, while the partial screen video itself is provided by the source content network. The screen updates are either provided to the image encoder (if the client is capable of performing graphics overlay) or to the MPEG encoder (if the client is incapable of performing graphics overlay). Video controls that overlay the video itself, for example to permit a trick-play mode, may be provided by the application execution environment to the transcoder, and blended into the video received from the source content network. The encoded screen updates and the transcoded and blended video are stitched together to form MPEG video frames, which are packaged, multiplexed with audio, and streamed to the client. If the client is capable of performing a graphics overlay function, then the transcoded and blended video is provided separately from screen updates to the graphical user interface.

FIG. 5B provides the functional architecture for providing full-screen video content to a requesting client device wherein the capabilities of the client device do not permit the client device to decode the content of the selected full-screen video in its native encoding scheme. Thus, the control logic determines that either mode 2 or mode 5 is required. When full-screen video is requested by a user through a request signal from the client device, the stitching components of the functional architecture of FIG. 5 are not used. Instead, the control logic evaluates whether selected video content to be displayed on the display device through the client device of the user is in a format that is compatible with the decoder of the client device. In the scenario wherein the client device cannot decode the native format of the content retrieved from the content distribution network, the content is provided to either a blending module if the requested full screen video content is to have a graphical user overlay (e.g., trick-play, captions etc.) and then to a transcoding module, or the video content is provided directly to the transcoding module. The transcoding module transcodes the full screen video content from the native format to a format that can be decoded by the requesting client device. During display of a transcoded full screen video, a user may use a device such as a remote control to request a graphical user interface for changing a parameter of the full-motion video. In response to such a request, the application execution environment will send screen update commands to the transcode and blend module. The transcode and blend module will first decode the full-screen video into the spatial domain and will obtain the graphical elements for the graphical user interface overlay. The transcode and blend module will then alpha blend the graphical elements and the portion of the underlying full-motion video and then the transcode and blend module will take the spatially encoded full-motion video with the graphical user interface overlaid and will encode the data using an encoding format that can be decoded by the client device. The transcoded video data either with the overlay or without the overlay is presented to a repackaging, re-streaming, and re-multiplexing module. The module will encapsulate the encoded video content using a container and transport protocol that can be transmitted through the network infrastructure and be extracted and decoded by the client device.

FIG. 5C shows the functional architecture wherein selected full-screen video content is passed through the system to the client device without transcoding. In modes 5 and 6 of operation, the user selects full-screen playback content and the control logic determines that the selected video content is in an encoding format that can be decoded by the requesting client device. Thus, the full-screen video does not need to be transcoded and can simply be passed to the repackaging, re-multiplexing, and re-streaming module. The repackaging, re-multiplexing, and re-streaming module performs the functions as described with respect to FIG. 4 and can further multiplex both multiple audio and video streams together (multiple MPEG elementary streams, H.264 streams, AAC audio, AC3 audio MPEG-2 audio). The full screen pass-through can also enable overlays where the client device is capable of receiving separate bitmap encoded data, JPEG, GIF or other data in an encoded data format for a graphical user interface element. Thus, the control logic confirms whether the client device can add overlays before initiating this mode. The full-screen video content can be passed through from the content distribution network to the client device, without transcoding the full-screen video content. The client device thus receives both the full-screen video content and any required overlays, removes the video content from its container, and decodes and displays the video content on the user's display device. In certain embodiments this can be further optimized. For example, in mode 6 of operation, if the client has the capability to parse the container format of the source video, then there is no need to repackage and this step can be omitted. The client then fetches the source video directly from the source content server. The client then resumes playing the source asset using the local video player. One example of such a container format is HTTP Live Streaming (HLS). This decouples the low latency overlay path from the video playout path, allowing deeper buffering for the video, and hence, a potentially more stable video picture. With the video received and decoded separate from the GUI, the GUI decoding can be done with very shallow buffers, allowing a more responsive user interface with less latency.

FIG. 5D shows the functional architecture for supporting mode 4, which is a full-screen transcode due to a decoding limitation of the client device. In this mode, the user selects to view a source video that is encoded using a codec that cannot be decoded by the client device. The full-screen video must be transcoded, and cannot be simply passed to the repackaging, re-multiplexing, and re-streaming module. Therefore, the video is obtained from the source content network and transcoded in the transcoder. Once transcoded, the video may be blended with a graphical user interface overlay for GUI elements such as video controls (e.g., with start, stop, rewind, captions and etc.) and any associated sounds if the client is incapable of performing graphics overlay and/or audio mixing, or these may be transmitted separately to the client (if the client is capable of performing these functions). Once the transcoded video has been blended, if required, then the video is packaged in a compliant MPEG transport stream and sent to the client device for display.

Figure 6:
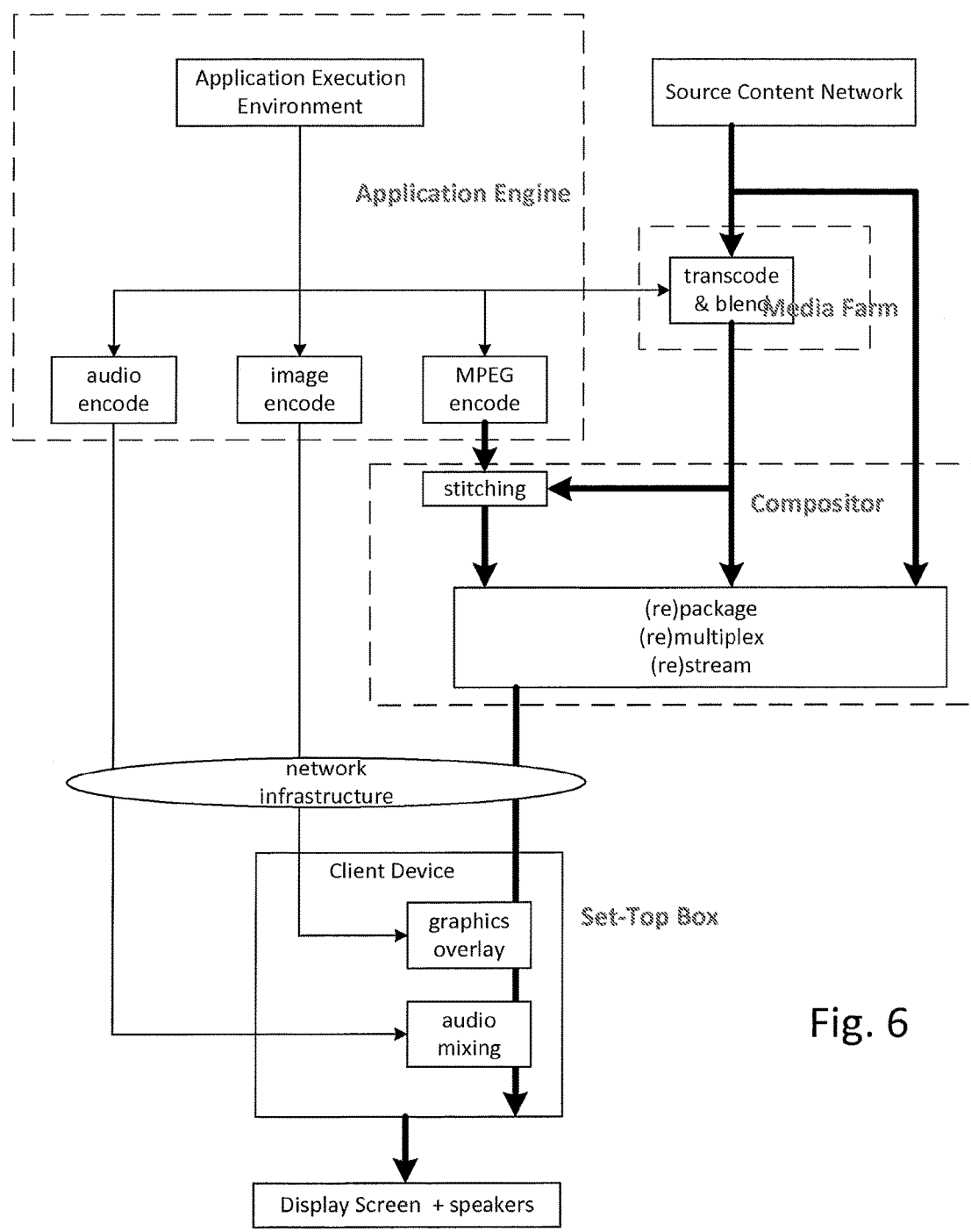
FIG. 6 shows the source architecture with overlays showing structural elements.

FIG. 6 shows the source architecture with overlays showing structural elements. Each of the structural elements may include one or more hardware processors for performing the functions of the architecture. The structural elements include an application engine, media farm, a compositor and a set-top box (i.e. a client device). The application engine is a structural element that encapsulates the application execution environment, audio encoder, image encoder, and MPEG encoder. These functions are tightly coupled in that the outputs of the encoders are all encoded data that are used by other functional components in the system. These functions may be advantageously distributed among the one or more hardware processors in a parallel fashion to improve response time and maximize the use of the processors. As executing graphical applications and encoding are CPU-intensive operations, the application engine may include a great deal of computational power, with less emphasis on storage and input/output operations.

The media farm controls bulk expensive media operations, including transcoding and blending. The media farm receives audio, video, and audiovisual content from the source content network and receives audio and screen updates from the application engine. Transcoding and blending must be performed in real time, while screen updates may be pre-encoded, and much more data passes through the media farm than is generated by the application engine. Therefore, managing operation of the media farm structural element is different from managing the application engine, and requires more storage and network bandwidth. The output of the media farm is stitchable MPEG.

The compositor receives stitchable MPEG from the application engine and the media farm, and stitches it together. Because the compositor outputs standards-compliant MPEG transport streams, it also includes the packager, multiplexer, and streamer. As with the other two structural elements, the compositor has its own unique responsibilities. All source video passes through the compositor, which must therefore have a great deal of network bandwidth available to it.

The client device, or set-top box, may or may not include graphics overlay capabilities and audio mixing capabilities. However, it can decode video content according to at least one codec, for example MPEG-2. As described above, any given client device may decode a variety of video formats, and the network infrastructure connects the content distribution framework to a wide variety of client devices in a heterogeneous network. The control logic in accordance with various embodiments of the invention is flexible enough to accommodate this variety.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM, a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above for panoramas may be applied to images that have been captured as non-panoramic images, and vice versa.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

What is claimed is:

1. A method of providing audiovisual content to a client device configured to be coupled to a display, the method comprising, at a server:
   detecting a selection of a graphical element corresponding to a video content item;
   in response to detecting the selection of the graphical element, determining a transmission mode as a function of:
   1) one or more decoding capabilities of the client device;
   2) a video encoding format of the video content item;
   3) whether the video content item is to be displayed in a full screen or a partial screen format; and
   4) whether the client device is capable of overlaying image data into a video stream;
   preparing, for transmission according to the determined transmission mode, a series of frames that includes audiovisual data including the video content item; and
   transmitting the prepared series of frames, from the server toward the client device, according to the determined transmission mode, for display on the display;
   wherein, in accordance with a determination that the video content item is to be displayed in a partial screen format, the transmission mode is a first transmission mode in which the series of frames includes the video content item and a first GUI, and the preparing includes, prior to transmitting the prepared series of frames:
   rendering the first GUI according to a previously set screen resolution; and
   stitching the video content item into the rendered first GUI, wherein the series of frames includes the video content item as stitched into the rendered first GUI, and wherein a respective frame of the series of frames combines content for the video content item and the rendered first GUI.

2. The method of claim 1, wherein, in accordance with a determination that:
   the video content item is to be displayed in a full screen format, and
   the client device is not capable of decoding the video encoding format of the video content item:
   the transmission mode is a second transmission mode in which the preparing includes transcoding the video content item.

3. The method of claim 2, wherein, in accordance with a determination that:
   the video content item is to be displayed in a full screen format,
   the client device is capable of decoding the video encoding format of the video content item, and
   no image data is to be overlaid on the video content item:
   the transmission mode is a third transmission mode in which, the preparing includes repackaging the video content item.

4. The method of claim 3, wherein, in accordance with a determination that:
   the video content item is to be displayed in a full screen format,
   the client device is capable of decoding the video encoding format of the video content item, and
   the client device is capable of overlaying image data into the video content item:
   the transmission mode is a fourth transmission mode in which:
   the overlaying image data includes a second GUI that includes various user interface elements, and the preparing includes rendering the second GUI according to a client overlay resolution.

5. The method of claim 4, wherein, in accordance with a determination that:
the video content item is to be displayed in a full screen format,
the client device is capable of decoding the video encoding format of the video content item, and
the client device is not capable of overlaying image data into the video content item, the transmission mode is a fifth transmission mode in which the preparing includes:
rendering the second GUI according to a video resolution, video size, and video frame rate;
decoding all or a portion of the video content item;
blending the rendered second GUI into the decoded portion; and
re-encoding the blended portion according to the video encoding format of the video content item.

6. The method of claim 1, wherein, in accordance with a determination that the client device is capable of receiving streaming content in a native format, the transmitting step comprises passing through content that is in the native format.

7. A computer program product for providing audiovisual content to a client device configured to be coupled to a display, the computer program product comprising a computer useable medium on which is stored non-transitory computer program code comprising program code for:
detecting a selection of a graphical element corresponding to a video content item;
in response to detecting the selection of the graphical element, determining a transmission mode as a function of:
1) one or more decoding capabilities of the client device;
2) a video encoding format of the video content item;
3) whether the video content item should is to be displayed in a full screen or a partial screen format; and
4) whether the client device is capable of overlaying image data into a video stream;
preparing, for transmission according to the determined transmission mode, a series of frames that includes audiovisual data including the video content item; and
transmitting the prepared series of frames, from the server toward the client device, according to the determined transmission mode, for display on the display;
wherein, in accordance with a determination that the video content item is to be displayed in a partial screen format, the transmission mode is a first transmission mode in which the series of frames includes the video content item and a first GUI, and the preparing includes, prior to transmitting the prepared series of frames:
rendering the first GUI according to a previously set screen resolution; and
stitching the video content item into the rendered first GUI, wherein the series of frames includes the video content item as stitched into the rendered first GUI, and wherein a respective frame of the series of frames combines content for the video content item and the rendered first GUI.

8. The computer program product of claim 7, wherein the program code for preparing further includes program code for, in accordance with a determination that
the video content item is to be displayed in a full screen format, and
the client device is not capable of decoding the video encoding format of the video content item:
transcoding the video content item according to a second transmission mode.

9. The computer program product of claim 8, wherein the program code for preparing further includes program code for, in accordance with a determination that:
the video content item is to be displayed in a full screen format,
the client device is capable of decoding the video encoding format of the video content item, and
no image data should be overlaid on the video content item:
repackaging the video content item according to a third transmission mode.

10. The computer program product of claim 9, wherein the overlaying image data includes a second GUI, the second GUI includes video playback controls, and the program code for preparing includes program code for, in accordance with a determination that:
the video content item is to be displayed in a full screen format,
the client device is capable of decoding the video encoding format of the video content item, and
the client device is capable of overlaying image data into the video content item:
rendering the second GUI according to a client overlay resolution according to a fourth transmission mode.

11. The computer program product of claim 10, wherein the program code for preparing further includes program code for, in accordance with a determination that:
the video content item is to be displayed in a full screen format,
the client device is capable of decoding the video encoding format of the video content item, and
the client device is not capable of overlaying image data into the video content item:
according to a fifth transmission mode:
rendering the second GUI according to a video resolution, video size, and video frame rate;
decoding a portion of the video content item;
blending the rendered second GUI into the decoded portion;
re-encoding the blended portion according to the video encoding format of the video content item.

12. The computer program product of claim 7, wherein, in accordance with a determination that the client device is capable of receiving streaming content in a native format, the transmitting step comprises passing through content that is in the native format.

13. A computer system for providing audiovisual content to a client device configured to be coupled to a display, the computer system comprising:
an application engine for providing a graphical user interface (GUI);
control logic for:
in response to detecting a selection of a graphical element corresponding to a video content item, determining a transmission mode as a function of:
1) one or more decoding capabilities of the client device;
2) a video encoding format of the video content item;
3) whether the video content item is to be displayed in a full screen or a partial screen format; and
4) whether the client device is capable of overlaying image data into a video stream; and preparing, for transmission according to the determined transmission mode, a series of frames that includes audiovisual data including the video content item; and a transmitter for transmitting the prepared series of frames, from the computer system toward the client device, according to the determined transmission mode, for display on the display;

wherein, in accordance with a determination that the video content item is to be displayed in a partial screen format, the transmission mode is a first transmission mode in which the series of frames includes the video content item and a first GUI, and the preparing includes, prior to transmitting the prepared series of frames:

rendering the first GUI according to a previously set screen resolution; and stitching the video content item into the rendered first GUI, wherein the series of frames includes the video content item as stitched into the rendered first GUI, and wherein a respective frame of the series of frames combines content for the video content item and the rendered first GUI.

14. The computer system of claim 13, further comprising a transcoder configured to, according to a second transmission mode, transcode the video content item, in accordance with a determination that the video content item is to be displayed in a full screen format and the client device is not capable of the video encoding format of the video content item.

15. The computer system of claim 14, further comprising a packager configured to, according to a third transmission mode, repackage the video content item, in accordance with a determination that the video content item is to be displayed in a full screen format, the client device is capable of decoding the video encoding format of the video content item, and no image data is to be overlaid on the video content item.

16. The computer system of claim 15, wherein the overlaying image data includes a second GUI, the second GUI includes interface elements, and wherein the application engine is configured to, according to a fourth transmission mode, render the second GUI according to a client overlay resolution, in accordance with a determination that the selected video is to be displayed in a full screen format, the client device is capable of decoding the video encoding format of the video content item, and the client device is capable of overlaying image data into the video content item.

17. The computer system of claim 16, wherein, in accordance with a determination that the video content item is to be displayed in a full screen format, the client device is capable of decoding the video encoding format of the video content item, and the client device is not capable of overlaying image data into the video content item, the transmission mode is a fifth transmission mode in which:

the application engine is configured to render the second GUI according to a video resolution, video size, and video frame rate;

the transcoder is configured to decode a portion of the video content item;

a blender is configured to blend the rendered second GUI into the decoded portion; and the transcoder is further configured to re-encode the blended portion according to the video encoding format.

18. The computer system of claim 13, wherein, in accordance with a determination that the client device is capable of receiving streaming content in a native format, the transmitting comprises passing through content that is in the native format.

19. The computer system of claim 13, wherein operation of a transcoder, a blender, a stitcher, and a packager is optional according to the determined transmission mode.

* * * * *

UNITED STATES PATENT AND TRADEMARK OFFICE
CERTIFICATE OF CORRECTION

PATENT NO. : 10,275,128 B2
APPLICATION NO. : 14/217108
DATED : April 30, 2019
INVENTOR(S) : Brockmann et al.

Page 1 of 1

It is certified that error appears in the above-identified patent and that said Letters Patent is hereby corrected as shown below:

In the Claims

Claim 11, Column 20, Line 43, please delete "portion;" and insert --portion; and--.

Signed and Sealed this
Twenty-third Day of July, 2019

Andrei Iancu
*Director of the United States Patent and Trademark Office*